US011222299B1

United States Patent
Baalke et al.

(10) Patent No.: US 11,222,299 B1
(45) Date of Patent: Jan. 11, 2022

(54) INDOOR DELIVERIES BY AUTONOMOUS VEHICLES

(71) Applicant: Amazon Technologies, Inc., Seattle, WA (US)

(72) Inventors: Uriah John Baalke, Seattle, WA (US); Stav Braun, Seattle, WA (US); Sonia Jin, Seattle, WA (US); Jia Hao Lim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 635 days.

(21) Appl. No.: 16/102,442

(22) Filed: Aug. 13, 2018

Related U.S. Application Data

(60) Provisional application No. 62/552,932, filed on Aug. 31, 2017, provisional application No. 62/582,153, filed on Nov. 6, 2017.

(51) Int. Cl.
| | |
|---|---|
| *G06Q 10/08* | (2012.01) |
| *G01C 21/34* | (2006.01) |
| *G05D 1/02* | (2020.01) |
| *G01C 21/36* | (2006.01) |
| *G06F 3/0481* | (2013.01) |

(52) U.S. Cl.
CPC ....... *G06Q 10/083* (2013.01); *G01C 21/3453* (2013.01); *G01C 21/3691* (2013.01); *G05D 1/0217* (2013.01); *G05D 2201/0213* (2013.01); *G05D 2201/0216* (2013.01); *G06F 3/04817* (2013.01)

(58) Field of Classification Search
None
See application file for complete search history.

(56) References Cited

U.S. PATENT DOCUMENTS

| | | |
|---|---|---|
| 4,865,248 A | 9/1989 | Barth |
| 4,954,962 A | 9/1990 | Evans, Jr. et al. |
| 5,040,116 A | 8/1991 | Evans, Jr. et al. |
| 5,386,462 A | 1/1995 | Schlamp |

(Continued)

OTHER PUBLICATIONS

Fet, Ngewi et al., An Approach for Hybrid Indoor/Outdoor Navigation, Aug. 1, 2017, International Conference on Intelligent Environments (IE), p. 36-43 (Year: 2017).*

(Continued)

*Primary Examiner* — Kelly D Williams
(74) *Attorney, Agent, or Firm* — Athorus, PLLC

(57) ABSTRACT

Customized navigation maps of an area are generated for autonomous vehicles based on a baseline map of the area, transportation systems within the area, and attributes of the autonomous vehicles. The customized navigation maps include a plurality of paths, and two or more of the paths may form an optimal route for performing a task by an autonomous vehicle. Customized navigation maps may be generated for outdoor spaces or indoor spaces, and include specific infrastructure or features on which a specific autonomous vehicle may be configured for travel. Routes may be determined based on access points at destinations such as buildings, and the access points may be manually selected by a user or automatically selected on any basis. The autonomous vehicles may be guided by GPS systems when traveling outdoors, and by imaging devices or other systems when traveling indoors.

20 Claims, 37 Drawing Sheets

(56) References Cited

U.S. PATENT DOCUMENTS

| | | | |
|---|---|---|---|
| 5,995,898 | A | 11/1999 | Tuttle |
| 6,344,796 | B1 | 2/2002 | Ogilvie et al. |
| 6,426,699 | B1 | 7/2002 | Porter |
| 6,690,997 | B2 | 2/2004 | Rivalto |
| 6,694,217 | B2 | 2/2004 | Bloom |
| 6,919,803 | B2 | 7/2005 | Breed |
| 6,961,711 | B1 | 11/2005 | Chee |
| 6,970,838 | B1 | 11/2005 | Kamath et al. |
| 7,129,817 | B2 | 10/2006 | Yamagishi |
| 7,133,743 | B2 | 11/2006 | Tilles et al. |
| 7,188,513 | B2 | 3/2007 | Wilson |
| 7,337,686 | B2 | 3/2008 | Sagi-Dolev |
| 7,337,944 | B2 | 3/2008 | Devar |
| 7,339,993 | B1 | 3/2008 | Brooks et al. |
| 9,079,587 | B1 | 7/2015 | Rupp et al. |
| 9,381,916 | B1 | 7/2016 | Zhu et al. |
| 9,718,564 | B1 | 8/2017 | Beckman et al. |
| 10,558,201 | B2 | 2/2020 | Burkhard et al. |
| 10,574,945 | B1* | 2/2020 | Seyfi .................. G05D 1/0202 |
| 2001/0045449 | A1 | 11/2001 | Shannon |
| 2002/0016726 | A1 | 2/2002 | Ross |
| 2002/0087375 | A1 | 7/2002 | Griffin et al. |
| 2002/0111914 | A1 | 8/2002 | Terada et al. |
| 2002/0116289 | A1 | 8/2002 | Yang |
| 2002/0123930 | A1 | 9/2002 | Boyd et al. |
| 2003/0040980 | A1 | 2/2003 | Nakajima et al. |
| 2003/0141411 | A1 | 7/2003 | Pandya et al. |
| 2006/0136237 | A1 | 6/2006 | Spiegel et al. |
| 2007/0016496 | A1 | 1/2007 | Bar et al. |
| 2007/0073552 | A1 | 3/2007 | Hileman |
| 2007/0112461 | A1 | 5/2007 | Zini et al. |
| 2007/0150375 | A1 | 6/2007 | Yang |
| 2007/0170237 | A1 | 7/2007 | Neff |
| 2007/0293978 | A1 | 12/2007 | Wurman et al. |
| 2008/0150679 | A1 | 6/2008 | Bloomfield |
| 2008/0154659 | A1 | 6/2008 | Bettes et al. |
| 2008/0167817 | A1 | 7/2008 | Hessler et al. |
| 2008/0301009 | A1 | 12/2008 | Plaster et al. |
| 2009/0062974 | A1 | 3/2009 | Tamamoto et al. |
| 2009/0063166 | A1 | 3/2009 | Palmer |
| 2009/0106124 | A1 | 4/2009 | Yang |
| 2009/0149985 | A1 | 6/2009 | Chirnomas |
| 2009/0236470 | A1 | 9/2009 | Goossen et al. |
| 2009/0299903 | A1 | 12/2009 | Hung et al. |
| 2009/0314883 | A1 | 12/2009 | Arlton et al. |
| 2011/0035149 | A1 | 2/2011 | McAndrew et al. |
| 2011/0264311 | A1 | 10/2011 | Lee et al. |
| 2012/0039694 | A1 | 2/2012 | Suzanne |
| 2012/0109419 | A1 | 5/2012 | Mercado |
| 2012/0219397 | A1 | 8/2012 | Baker |
| 2013/0073477 | A1 | 3/2013 | Grinberg |
| 2013/0081245 | A1 | 4/2013 | Vavrina et al. |
| 2013/0148123 | A1 | 6/2013 | Hayashi |
| 2013/0218799 | A1 | 8/2013 | Lehmann et al. |
| 2013/0261792 | A1 | 10/2013 | Gupta et al. |
| 2013/0262251 | A1 | 10/2013 | Wan et al. |
| 2013/0262252 | A1 | 10/2013 | Lakshman et al. |
| 2013/0262276 | A1 | 10/2013 | Wan et al. |
| 2013/0262336 | A1 | 10/2013 | Wan et al. |
| 2013/0264381 | A1 | 10/2013 | Kim et al. |
| 2014/0022055 | A1 | 1/2014 | Levien et al. |
| 2014/0030444 | A1 | 1/2014 | Swaminathan et al. |
| 2014/0032034 | A1 | 1/2014 | Raptopoulos et al. |
| 2014/0052661 | A1 | 2/2014 | Shakes et al. |
| 2014/0136282 | A1 | 5/2014 | Fedele |
| 2014/0136414 | A1 | 5/2014 | Abhyanker |
| 2014/0254896 | A1 | 9/2014 | Zhou et al. |
| 2015/0006005 | A1 | 1/2015 | Yu et al. |
| 2015/0069968 | A1 | 3/2015 | Pounds |
| 2015/0102154 | A1 | 4/2015 | Duncan et al. |
| 2015/0120602 | A1 | 4/2015 | Huffman et al. |
| 2015/0129716 | A1 | 5/2015 | Yoffe |
| 2015/0153175 | A1 | 6/2015 | Skaaksrud |
| 2015/0158599 | A1 | 6/2015 | Sisko |
| 2015/0175276 | A1 | 6/2015 | Koster |
| 2015/0183528 | A1 | 7/2015 | Walsh et al. |
| 2015/0185034 | A1 | 7/2015 | Abhyanker |
| 2015/0227882 | A1 | 8/2015 | Bhatt |
| 2015/0246727 | A1 | 9/2015 | Masticola et al. |
| 2015/0259078 | A1 | 9/2015 | Filipovic et al. |
| 2015/0317597 | A1 | 11/2015 | Shucker et al. |
| 2015/0332206 | A1 | 11/2015 | Trew et al. |
| 2015/0367850 | A1 | 12/2015 | Clarke et al. |
| 2015/0370251 | A1 | 12/2015 | Siegel et al. |
| 2015/0379468 | A1* | 12/2015 | Harvey ............ G06Q 10/08355 |
| | | | 705/338 |
| 2016/0009413 | A1 | 1/2016 | Lee et al. |
| 2016/0033966 | A1 | 2/2016 | Farris et al. |
| 2016/0104099 | A1 | 4/2016 | Villamar |
| 2016/0114488 | A1 | 4/2016 | Medina et al. |
| 2016/0144734 | A1 | 5/2016 | Wang et al. |
| 2016/0144982 | A1 | 5/2016 | Sugumaran |
| 2016/0207627 | A1 | 7/2016 | Hoareau et al. |
| 2016/0257401 | A1 | 9/2016 | Buchmueller et al. |
| 2016/0266578 | A1 | 9/2016 | Douglas et al. |
| 2016/0299233 | A1 | 10/2016 | Levien et al. |
| 2016/0334229 | A1 | 11/2016 | Ross et al. |
| 2016/0364989 | A1 | 12/2016 | Speasl et al. |
| 2017/0032315 | A1 | 2/2017 | Gupta et al. |
| 2017/0096222 | A1 | 4/2017 | Spinelli et al. |
| 2017/0098378 | A1 | 4/2017 | Soundararajan et al. |
| 2017/0101017 | A1 | 4/2017 | Street |
| 2017/0164319 | A1 | 6/2017 | Skaaksrud et al. |
| 2017/0167881 | A1 | 6/2017 | Rander et al. |
| 2019/0033856 | A1* | 1/2019 | Ferguson ........... G06Q 30/0631 |
| 2019/0041852 | A1 | 2/2019 | Schubert et al. |
| 2019/0042859 | A1 | 2/2019 | Schubert et al. |
| 2020/0130893 | A1 | 4/2020 | Väin |
| 2020/0326199 | A1* | 10/2020 | Hendrix .................. H04S 7/304 |

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kuckelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

URL: https://web.archive.org/web/201 60804001046/https://www.starship.xyz/, download date: Aug. 4, 2016, 21 pages.

* cited by examiner

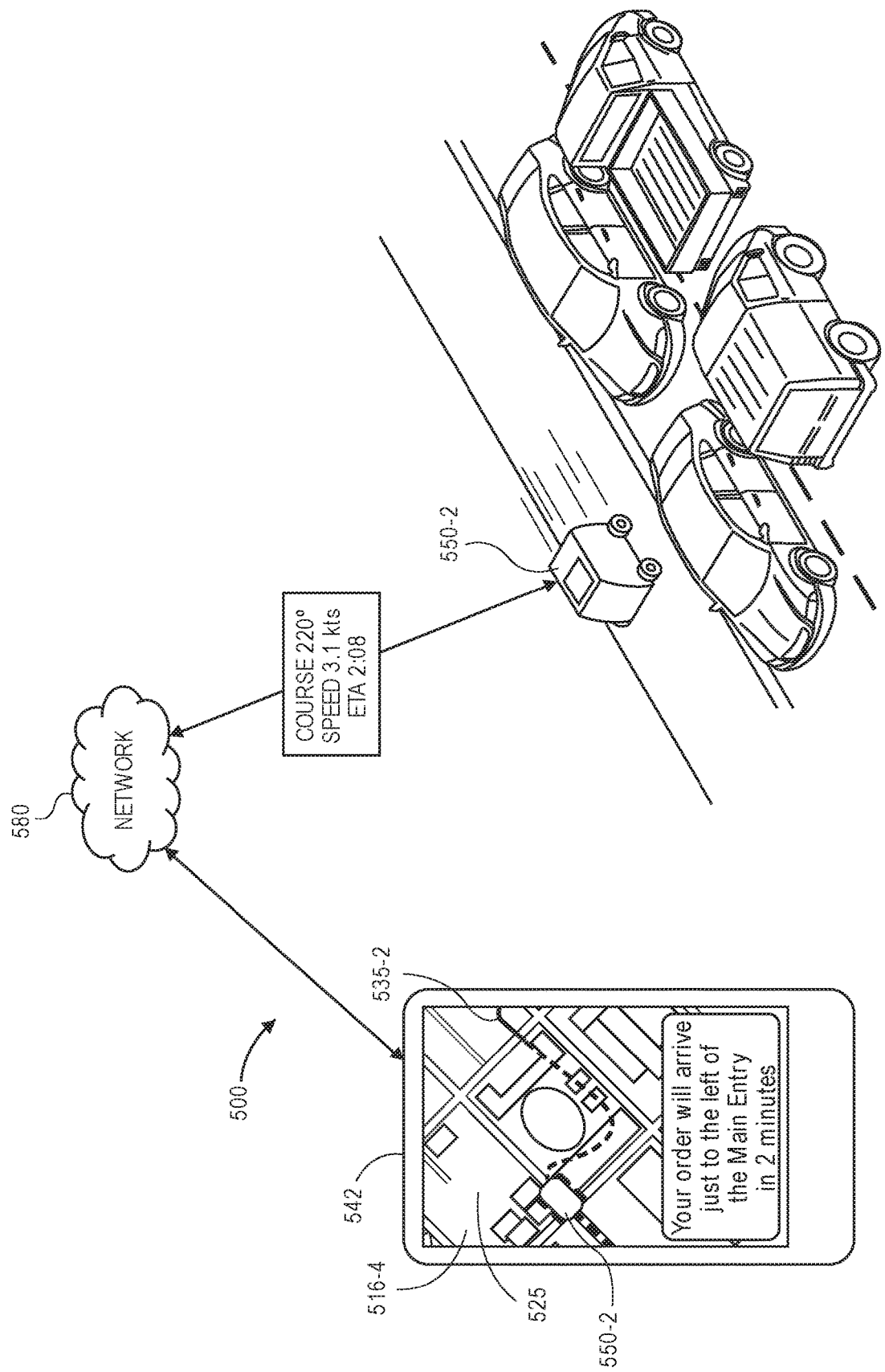

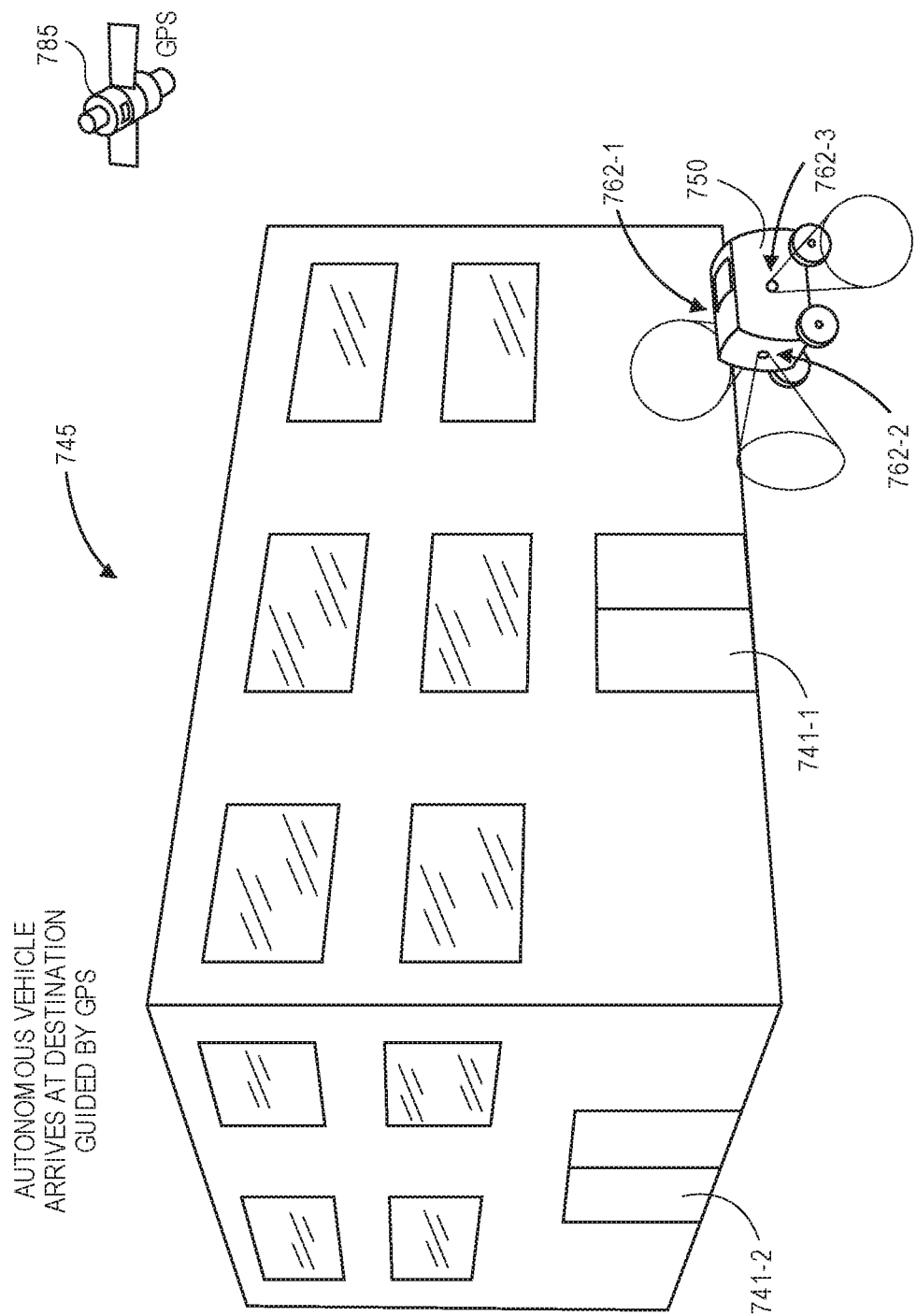

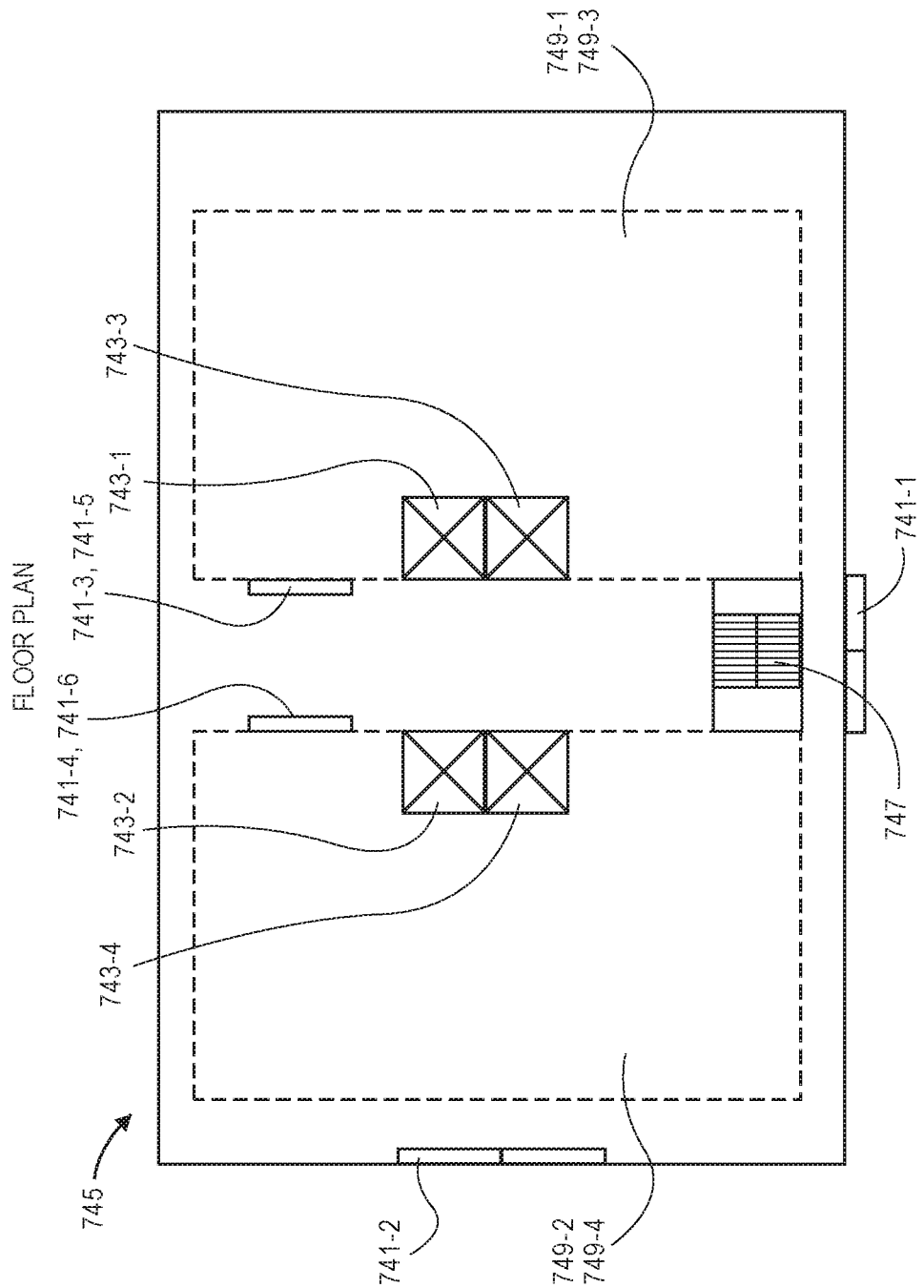

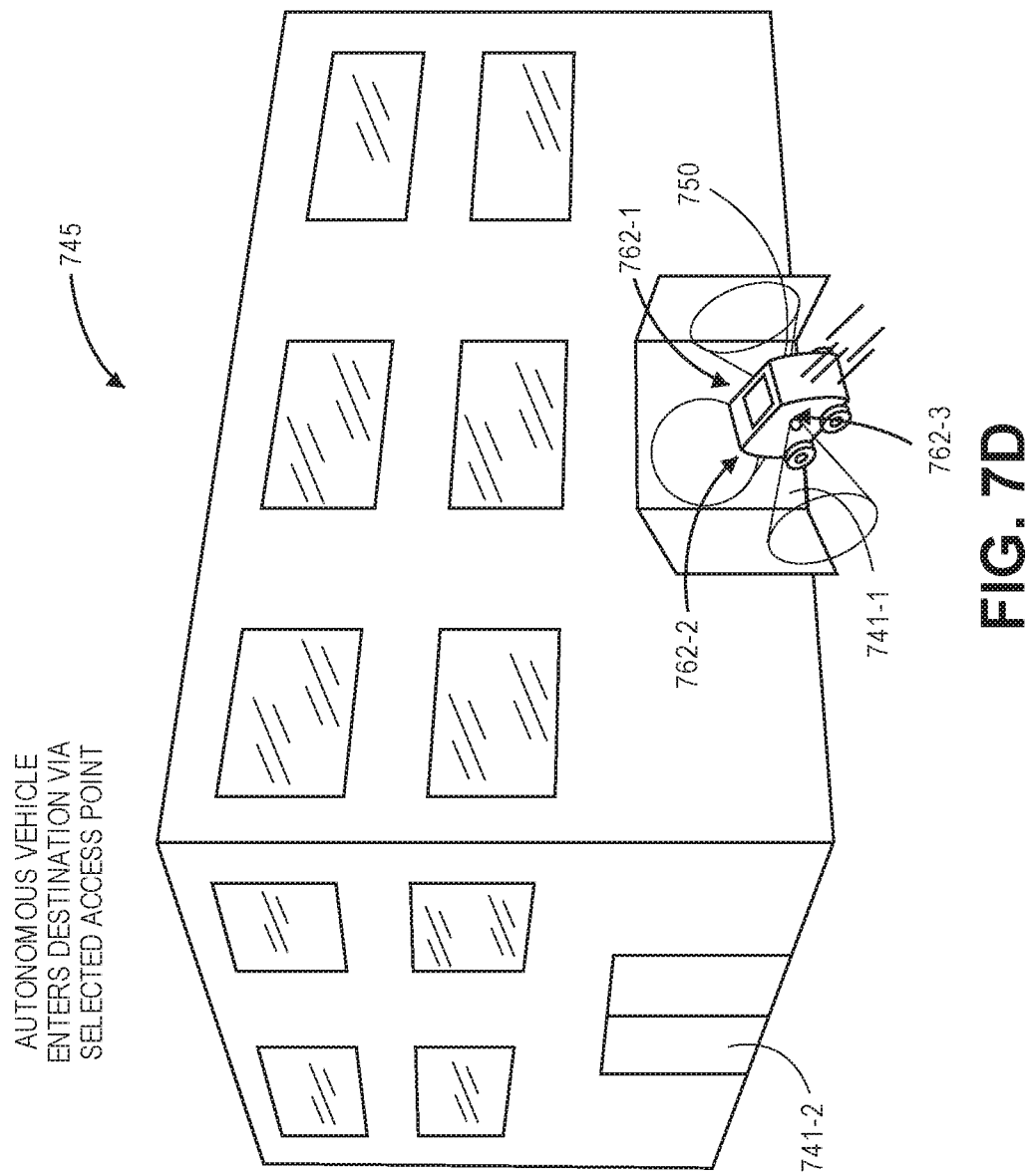

AUTONOMOUS VEHICLE NAVIGATES THROUGH BUILDING GUIDED BY ONBOARD SENSORS

INDOOR DELIVERIES BY AUTONOMOUS VEHICLES

CROSS-REFERENCE TO RELATED APPLICATIONS

This application claims priority to U.S. Patent Application No. 62/552,932, filed Aug. 31, 2017, the contents of which are incorporated by reference herein in their entirety. This application also claims priority to U.S. Patent Application No. 62/582,153, filed Nov. 6, 2017.

BACKGROUND

Currently, mathematical or statistical modeling methods for predicting a most efficient route between two known points, which are sometimes called "shortest path" methods, are effective when predicting routes for vehicles having similar and substantially nominal dimensions or capacities. In particular, such methods may estimate costs or time for travel between two points on roads, on rails, on foot or by air, where intrinsic and extrinsic factors associated with such travel may be predicted with acceptable degrees of accuracy or precision.

Most path modeling methods are ineffective or unhelpful, however, in environments where transportation networks include both traditional and non-traditional features or infrastructure, including not only paved or unpaved roads but also sidewalks or trails, or lawns, plazas, parks, or the like. Additionally, most path modeling methods are typically unable to quickly adapt to changes in physical structure or architecture of any of the paths of a network. At best, the only variables considered by typical path modeling techniques in selecting a route between two points are prevailing or predicted travel times or speeds along paths of the network. Moreover, traditional path modeling methods also fail to consider operational or functional capacities of a vehicle, such as standard or maximum operating speeds, power levels, ranges or other factors, when selecting or recommending a route between two points of a network or predicting a travel time between such points. Such techniques typically assume that all vehicles will travel at the maximum allowable speeds on paths within a network, as defined or capped by any regulatory limits such as speed limits or environmental factors such as traffic, and do not consider whether or when a vehicle may run out of fuel or otherwise reach a maximum range or limit of operation. Because traditional path modeling techniques do not consider the specific attributes of a vehicle when selecting or recommending a route or predicting a travel time, such techniques further fail to consider whether a given path of a network may accommodate a given vehicle, i.e., whether the dimensions and mass of the vehicle will actually fit on the path, as most vehicles on the road today have common dimensions such as widths.

Furthermore, because most vehicles for performing deliveries or executing tasks involving travel from one point to another are not configured to operate indoors, most path modeling methods are merely used to determine costs or time for travel between two outdoor points, and are not used in combination with indoor travel. Typical path modeling methods do not consider the availability or use of access systems or features such as elevators, escalators, moving sidewalks, stairs, ramps, automatic doors or other indoor transportation systems.

BRIEF DESCRIPTION OF THE DRAWINGS

FIGS. 5A through 5I are views of aspects of one system for utilizing customized navigation maps and routes in accordance with embodiments of the present disclosure.

FIGS. 7A through 7F are views of aspects of one system for utilizing customized navigation maps and routes in accordance with embodiments of the present disclosure.

DETAILED DESCRIPTION

Figure 1A:
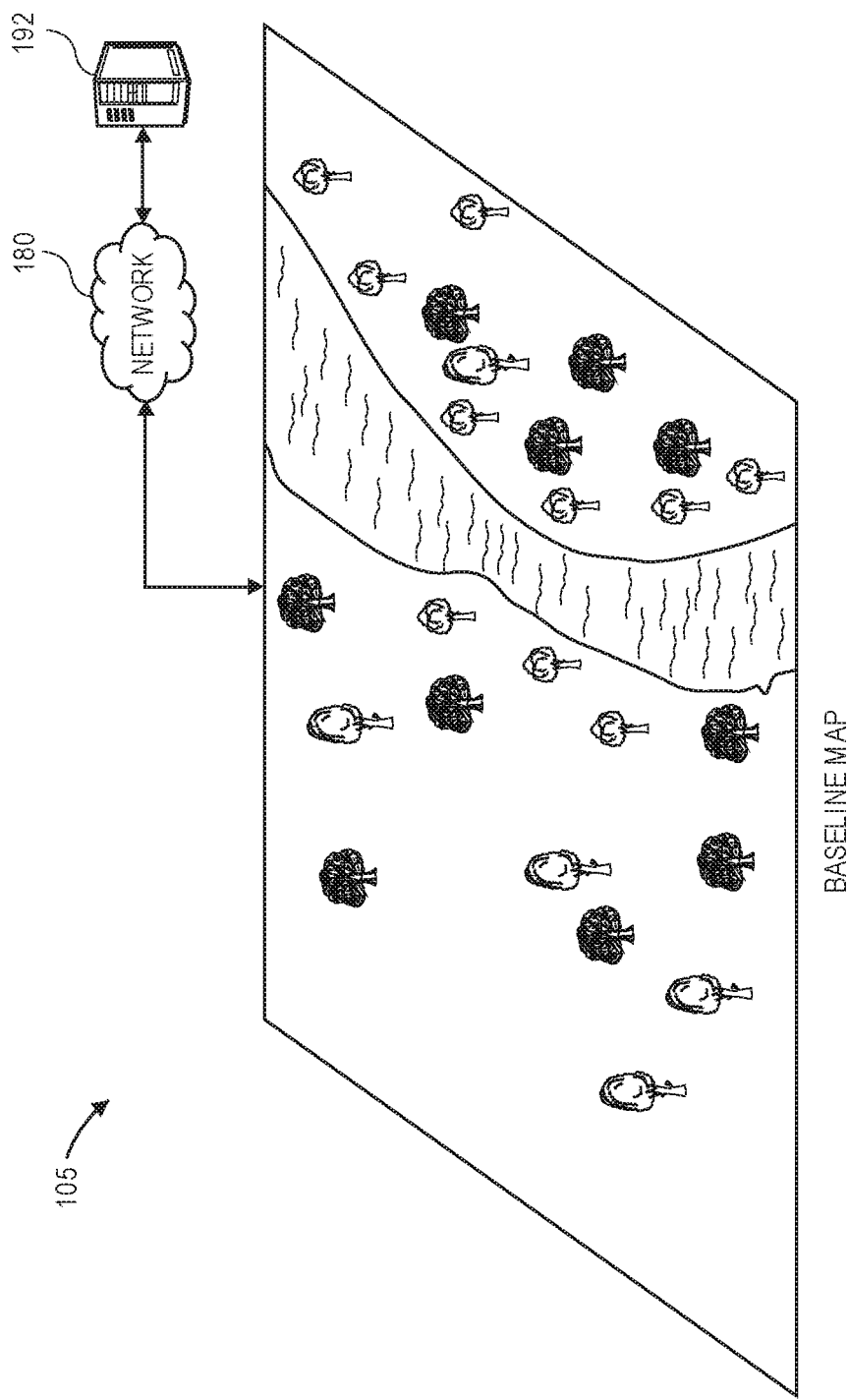
FIGS. 1A through 1M are views of aspects of one system for utilizing customized navigation maps and routes in accordance with embodiments of the present disclosure.

As is set forth in greater detail below, the present disclosure is directed to generating customized navigation maps for autonomous vehicles, and utilizing the customized navigation maps in selecting an autonomous vehicle to perform a task, such as a delivery of an item, or a route to be traveled by the autonomous vehicle during the performance of the task. Generating a customized navigation map may begin with a baseline map of an area or environment that has been constructed according to a geographic standard or system, and comprises a plurality of geolocations in two-dimensional space, such as a set of geographic coordinates, e.g., a latitude and a longitude, and, optionally, an elevation, corresponding to the composition and surface features within the area or environment. The baseline map may be augmented by one or more layers of information or data regarding available infrastructure or features within the area or environment, such as not only roads, sidewalks, crosswalks, bicycle or walking trails, or bridges of any length or width, but also parks, fields, forests, lots, clearings or other spaces, or any other outdoor features, or elevators, escalators, lifts, dumb waiters, moving sidewalks, ramps or other automatic features for transporting people or objects indoors, as well as known restrictions or conditions required for their use. A customized navigation map may be generated for an autonomous vehicle based on the augmented baseline map, along with attributes of the autonomous vehicle, including not only physical attributes such as dimensions (e.g., heights, widths, lengths) or masses but also operating characteristics such as maximum or minimum operating speeds or speed ratings, battery or fuel levels, power ratings, or operational ranges.

After customized navigation maps have been generated for one or more autonomous vehicles, e.g., for a fleet of such vehicles, the customized navigation maps may be stored in one or more data stores. One or more of the layers of information or data from which the customized navigation maps are generated may be updated on a periodic, near-real time or real time basis as information or data is obtained regarding the infrastructure or features within the area or environment, which may be received from one or more autonomous vehicles operating within the area or environment, or from any other source. The customized navigation maps that are generated for travel by autonomous vehicles within the area may thus be subject to constant revision as new or updated information or data regarding the area is identified. An optimal route for an autonomous vehicle during the performance of a task may be selected based on a customized navigation map in accordance with the present disclosure. Furthermore, when the performance of a given task by one of a plurality of autonomous vehicles is requested or required, either indoors or outdoors, an autonomous vehicle that is suitably configured or equipped to perform the task may be selected based on optimal routes generated from the customized navigation maps.

Accordingly, the customized navigation maps of the present disclosure may be utilized to select a location at which a task such as a delivery of an item (e.g., an attended delivery or an unattended delivery) is to be performed by an autonomous vehicle. In some embodiments, when a customer places an order for delivery of an item, or when an autonomous vehicle loaded with the item is instructed to transport the item to a delivery address provided by the customer, one or more computer devices or systems may access a customized navigation map that was generated specifically for the autonomous vehicle and augmented with data regarding known buildings or structures (or types of such buildings or structures), access points (e.g., locations and types) for such buildings or structures, e.g., in one or more layers. The autonomous vehicle may then calculate an optimal route to a location associated with the delivery address. The autonomous vehicle may then be instructed to proceed to the location along the optimal route, and to deliver the item to the customer, e.g., at one or more of the access points associated with the location. In this regard, some embodiments of the present disclosure may achieve a high level of convenience for the customer, as well as a high level of visibility of the autonomous vehicle, e.g., when the customer arrives to retrieve the item from the autonomous vehicle at a nearby access point, while also fulfilling legal regulations for walkways, sidewalks, roads, and parking.

Referring to FIGS. 1A through 1M, views of aspects of one system for utilizing customized navigation maps and routes in accordance with embodiments of the present disclosure are shown. As is shown in FIG. 1A, a baseline map 105 of an area or environment is stored on a server 192 that is connected to a network 180, which may include the Internet, in whole or in part. The baseline map 105 may have been previously determined or generated for the area or environment, and may include geolocations or geospatially-referenced points that precisely define locations in space with one or more geocodes, such as sets of geographic coordinates such as latitudes and longitudes, and, optionally, elevations. For example, the baseline map 105 may include or have been formed from geographic information system (or "GIS") data, by capturing imaging data from the area, e.g., using one or more ground-based cameras, aerial cameras, or cameras carried aboard one or more orbiting satellites, and processing the imaging data to recognize topographical data regarding the composition and surface features within the area or environment, as well as elevations of points within the area or environment, or by scanning or otherwise interpreting maps or other representations of the area or environment, e.g., in an atlas or other set of maps.

The server 192 may be associated with one or more systems for monitoring, maintaining, managing or otherwise controlling a fleet of one or more autonomous vehicles, e.g., a fleet management system for such vehicles. Such systems may, in some embodiments, be associated with an online marketplace, a fulfillment center, or any other entity requiring the performance of one or more tasks by the autonomous vehicles. The server 192 may be provided in a physical location associated with one or more of the autonomous vehicles, such as a garage or a maintenance facility, or in one or more alternate or virtual locations, e.g., in a "cloud"-based environment.

Figure 1B:
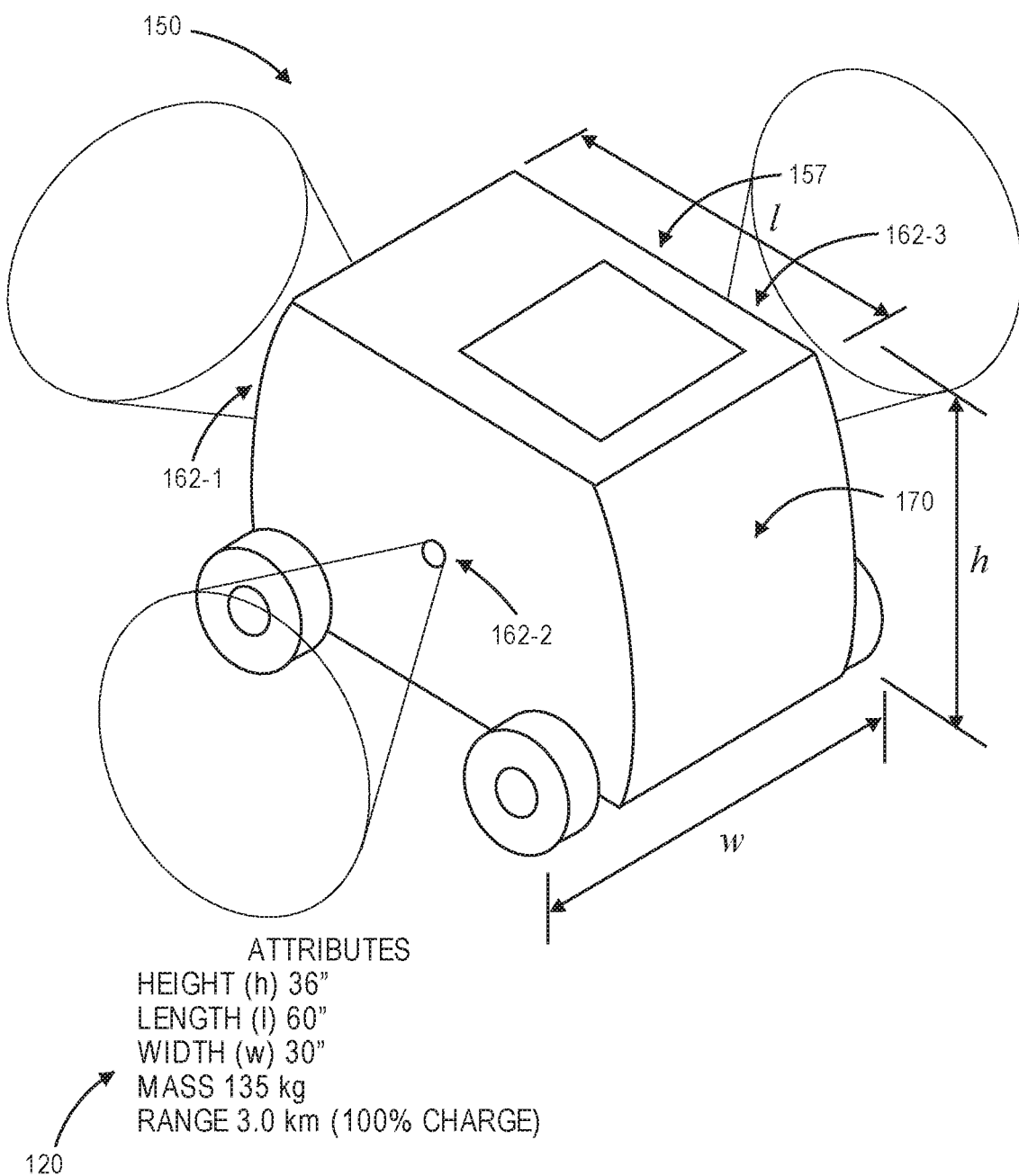

As is shown in FIG. 1B, an autonomous vehicle 150 includes a storage compartment 157, a plurality of imaging devices (e.g., digital cameras or other directional sensors) 162-1, 162-2, 162-3 and a motor 170 (not shown). The autonomous vehicle 150 may further include one or more power supplies, axles, shafts and/or wheels for causing the autonomous vehicle 150 and any items therein to travel in a desired direction and at a desired speed. The storage compartment 157 may be generally configured to store or house one or more items of any type or form therein, or specifically configured to store or house one or more selected items having any restrictions on temperature, pressure or alignment or orientation, and to protect such items against the elements. The imaging devices 162-1, 162-2, 162-3 may be embedded or installed within, or otherwise mounted to, one or more locations on external surfaces of the autonomous vehicle 150, and may be configured to capture information or data in directions extending normal to such locations. For example, as is shown in FIG. 1B, the imaging device 162-1 has a field of view extending forward of the autonomous vehicle 150, while the imaging device 162-2 has a field of view extending normal from a port side (e.g., a left side) of the autonomous vehicle 150, and the imaging device 162-3 has a field of view extending normal from a starboard side (e.g., a right side) of the autonomous vehicle 150.

As is shown in FIG. 1B, the autonomous vehicle 150 has a height h of thirty-six inches (36"), a length l of sixty inches (60") and a width w of thirty inches (30"), as well as a mass m of one hundred thirty-five kilograms (135 kg) and a range of three kilometers (3.0 km) when its power supplies are charged to their maximum capacities. A set of data 120 may be constructed or defined regarding the operational characteristics or capacities of the autonomous vehicle 150, including one or more of the dimensions including but not limited to the height h, the length l, the width w or the mass m, as well as any other attributes and/or capacities of the autonomous vehicle 150.

Figure 1C:
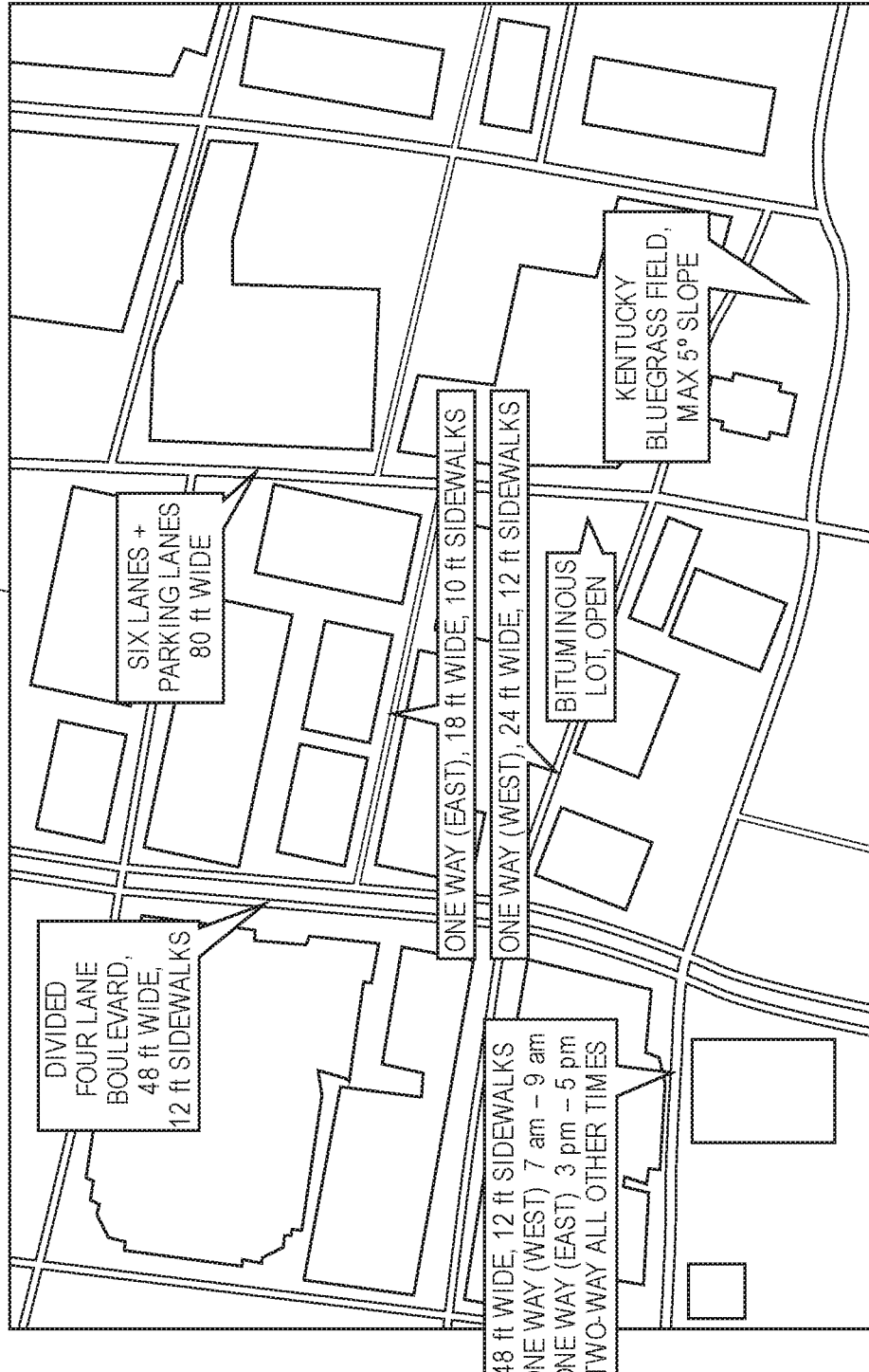

As is shown in FIG. 1C, a set of data 122 regarding transportation infrastructure within a portion of the area or environment covered by the baseline map 105 is shown. The set of data 122 may include one or more layers or other forms of data identifying locations (e.g., latitudes, longitudes and elevations) and dimensions (e.g., lengths or widths) of roads, sidewalks, crosswalks, bicycle trails, trails or the like, as well as any relevant operating restrictions (e.g., speed limits, or dates or times at which the infrastructure or features are available or unavailable), capacities (e.g., numbers or volumes of traffic that may be accommodated), or surface features (e.g., angles, orientations or textures of such operating surfaces, or materials from which the operating surfaces were formed) of the transportation infrastructure, or any other attributes of the transportation infrastructure. The set of data 122 may thus include one or more layers or other forms of data defining a plurality of paths extending over or along the outdoor transportation infrastructure within the area or environment, and may have been identified or determined from any source, e.g., from one or more networked data stores, or the like, including but not limited to the same sources as the baseline map 105 shown in FIG. 1A. For example, some or all of the set of data 122 regarding the outdoor transportation infrastructure may be determined from information or data previously captured during travel within the area or environment, e.g., based at least in part on one or more time stamps, net speeds, courses, angles of orientation, levels of traffic congestion, sizes or dimensions of any payloads carried, operational or environmental conditions, or any other information or data, captured or otherwise determined by autonomous vehicles or by one or more persons or machines. Moreover, some or all of the set of data regarding the outdoor transportation infrastructure may be updated in real time or in near-real time, on a synchronous or asynchronous basis.

Figure 1D:
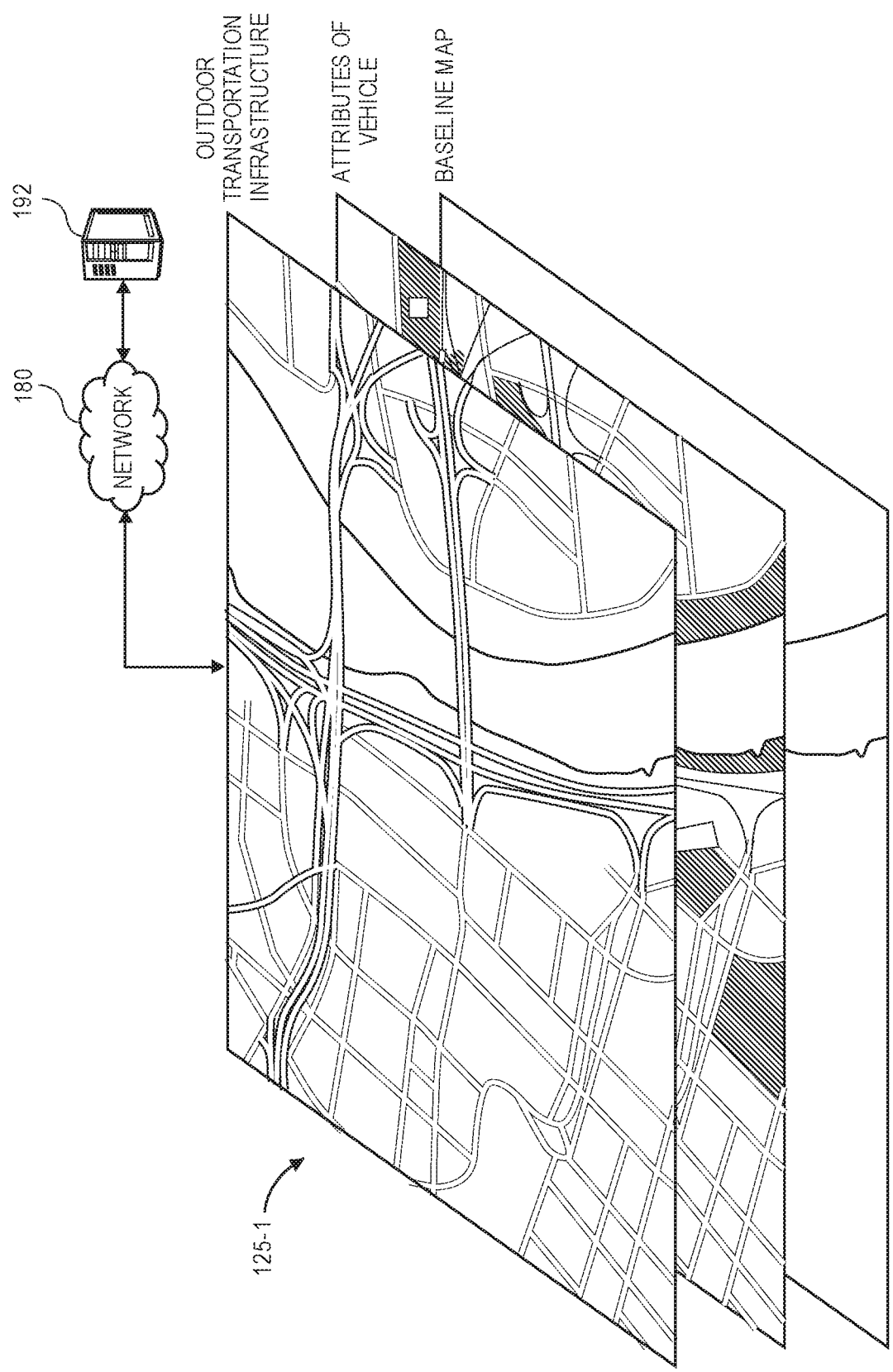

In accordance with embodiments of the present disclosure, a customized navigation map may be generated for an autonomous vehicle and used to select a route to be traveled by the autonomous vehicle during the performance of one or more tasks within an area or environment, such as a delivery of an item to a location within the area or environment. As is shown in FIG. 1D, a customized outdoor map 125-1 may be generated for the autonomous vehicle 150 based on the baseline map 105, along with one or more layers defined based at least in part on the set of data 120 shown in FIG. 1B or the set of data 122 shown in FIG. 1C, e.g., regarding attributes and/or capacities of the autonomous vehicle 150, or outdoor transportation infrastructure or features. The customized outdoor map 125-1 includes a plurality of paths that may accommodate, or be traveled upon, by the autonomous vehicle 150, and each of such paths extends between a pair of geolocations. The customized outdoor map 125-1 may be stored in association with the server 192, or in one or more other data stores, and updated from time to time (e.g., on a real time or near-real time basis) based on changes in the set of data 120 or the set of data 122.

Figure 1E:
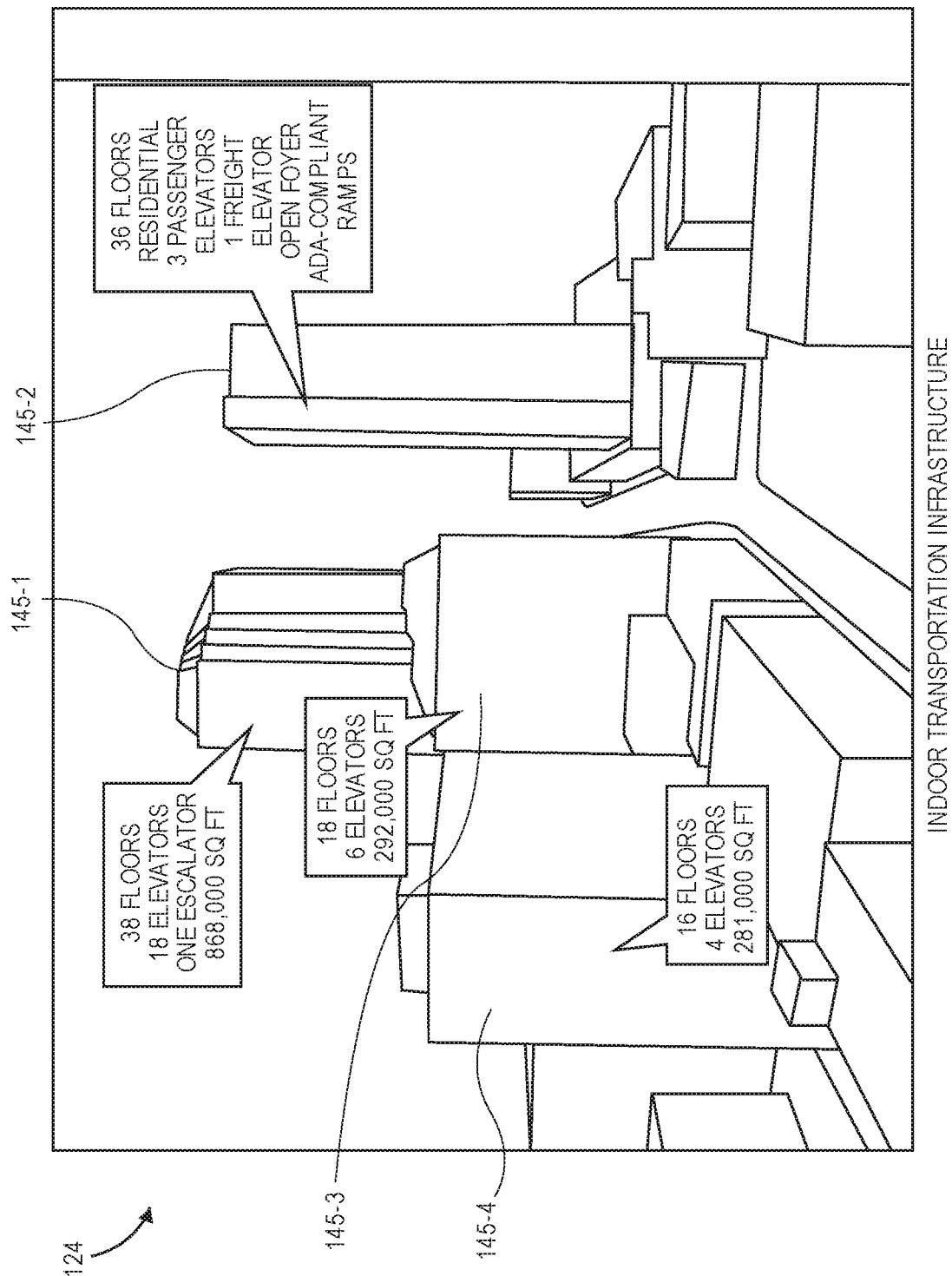

As is shown in FIG. 1E, a set of data 124 regarding indoor transportation infrastructure of buildings (or structures) 145-1, 145-2, 145-3, 145-4 within the portion of the area or environment covered by the baseline map 105 is shown. The set of data 124 may include one or more layers or other forms of data identifying access systems or features such as elevators, ramps, numbers of floors or floor space (or other traveling surfaces or spaces) within the buildings or structures, and may include, or may have been derived from, any information or data regarding interior spaces within such buildings or structures, including but not limited to blueprints, computer-aided design drawings, imaging data depicting walls, floors, or other indoor elements that was captured from such spaces. The set of data 124 may further include one or more layers or other forms of data identifying information or data regarding floor or wall sizes, floor or wall surface textures, openings such as windows, skylights, grates or others, as well as available access points such as doors of any size or shape for transporting people or objects within or around one or more of the buildings or structures. Like the set of data 122 of FIG. 1C, the set of data 124 may thus include one or more layers or other forms of data defining a plurality of paths extending over or along the indoor transportation infrastructure within the area or environment, and may have been identified or determined from any source, e.g., from one or more networked data stores, or the like, including but not limited to the same sources as the baseline map 105 shown in FIG. 1A or the set of data 122 of FIG. 1C. For example, some or all of the set of data 124 regarding the indoor transportation infrastructure may be determined from information or data previously captured during travel within the area or environment, either by autonomous vehicles or by one or more persons or machines.

In accordance with embodiments of the present disclosure, a customized navigation map generated for an autonomous vehicle may be used to select a route to be traveled by the autonomous vehicle in outdoor spaces, such as those shown in the baseline map 105, and also within indoor spaces, e.g., one or more of the buildings or structures 145-1, 145-2, 145-3, 145-4, during the performance of one or more tasks.

Figure 1F:
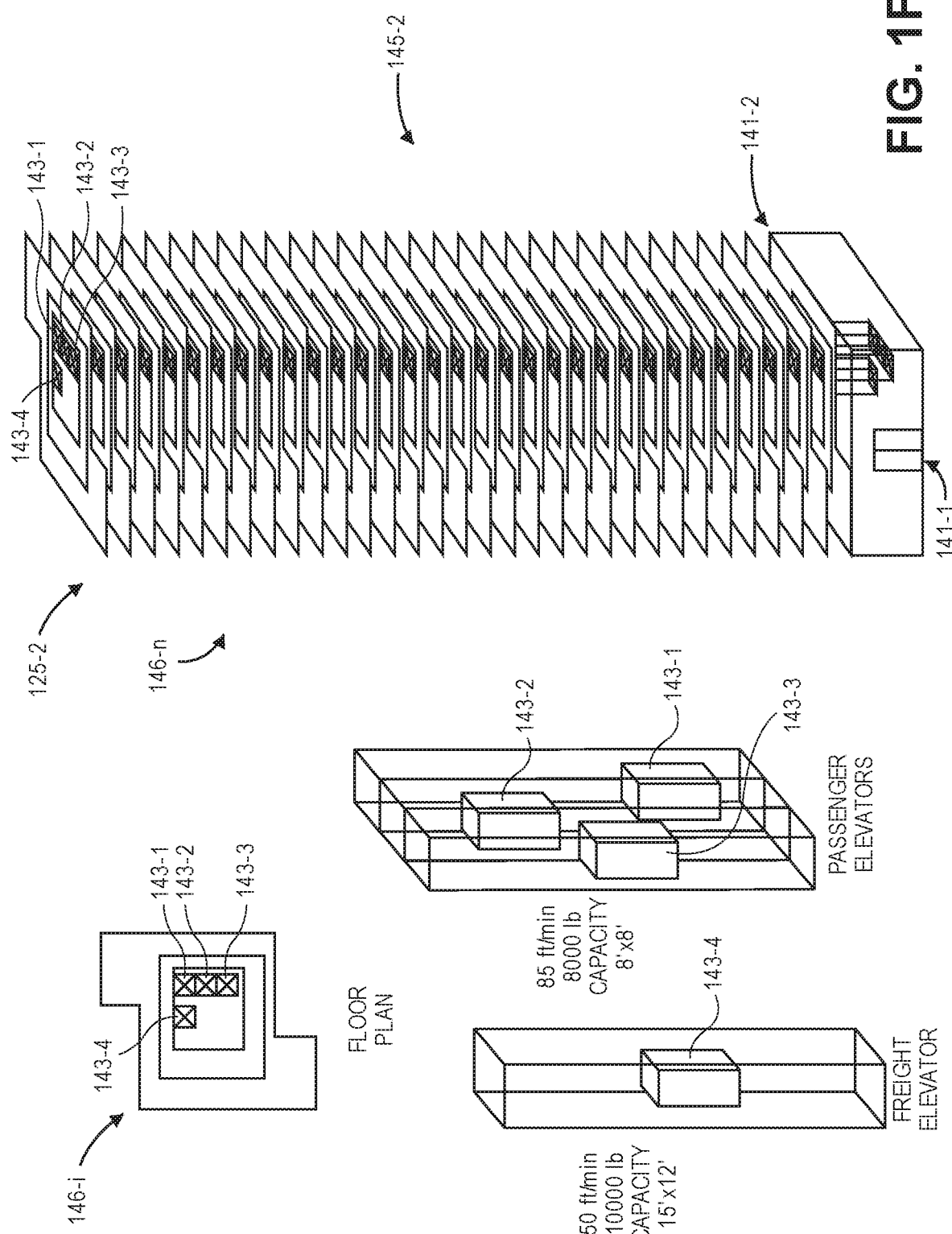

As is shown in FIG. 1F, a customized indoor map 125-2 of the building 145-2 is shown. The building 145-2 includes a pair of entry points 141-1, 141-2, a plurality of passenger elevators 143-1, 143-2, 143-3, a freight elevator 143-4 and a plurality of floors 146-n. The customized indoor map 125-2 is constructed based on a floor plan 146-i of one or more of the floors 146-n, as well as operating characteristics of the elevators 143-1, 143-2, 143-3, 143-4, and one or more attributes of the autonomous vehicle 150, such as the height h, the length I, the width w or the mass m. For example, the customized indoor map 125-2 defines a plurality of navigable paths within the building 145-2, as functions of space and/or time, based on the dimensions of traveling surfaces within the building 145-2 and/or attributes of access systems, such as the entry points 141-1, 141-2, or the elevators 143-1, 143-2, 143-3, 143-4.

Figure 1G:
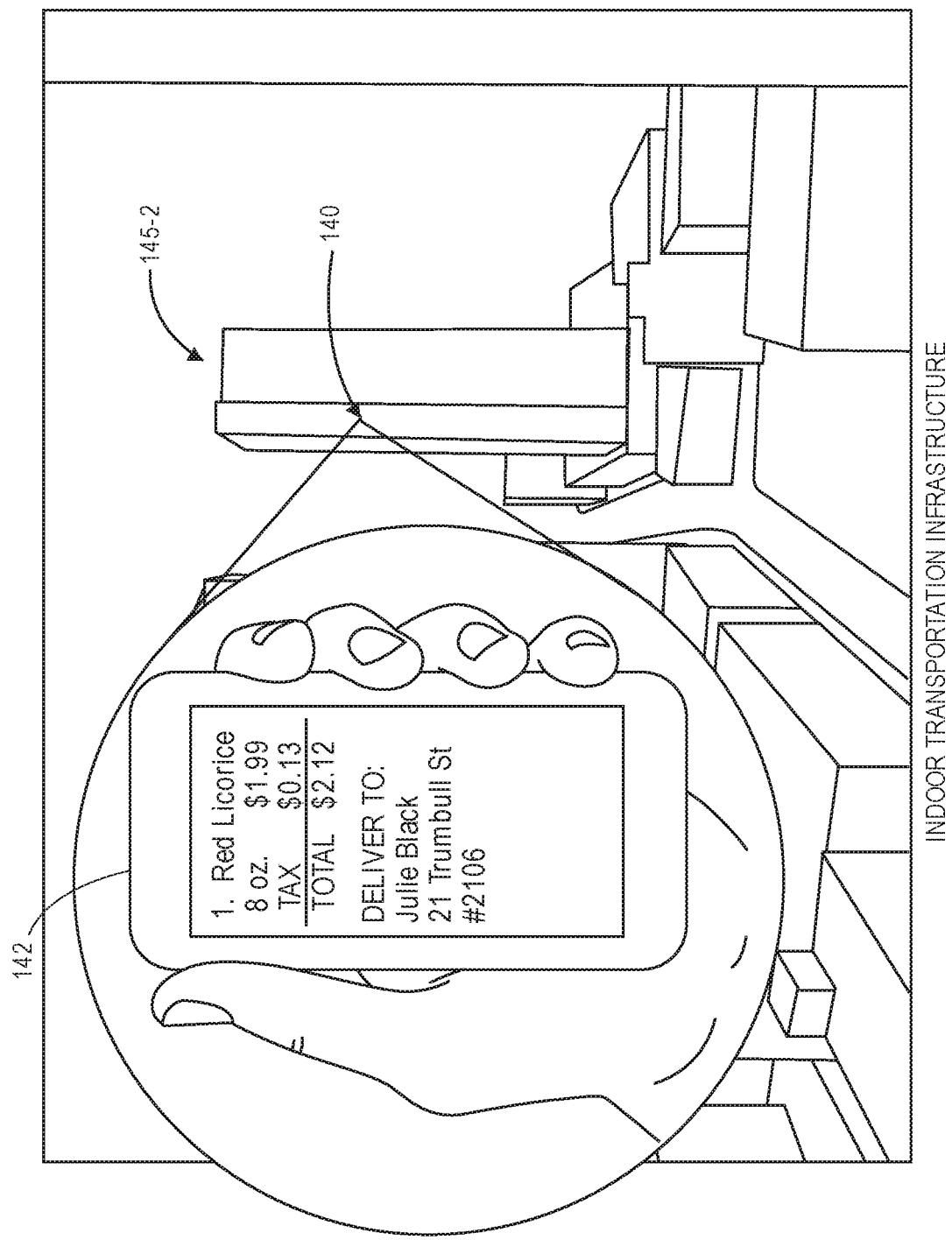

As is shown in FIG. 1G, a customer 140 within the building 145-2 completes an order for an item by executing one or more interactions with pages rendered by a smartphone 142 or another computer device. In particular, the customer 140 selects the item and designates a delivery address of the building 145-2 to which the item is to be delivered.

Figure 1H:

As is shown in FIG. 1H, a plurality of outdoor routes 135-1, 135-2, 135-3 that may be traveled throughout the area or environment shown in the baseline map 105 in order to deliver the ordered item from a fulfillment center 130 or other source of the item to the building 145-2 specified by the customer 140 are determined based on the customized outdoor map 125-1. The plurality of routes 135-1, 135-2, 135-3 throughout the area or environment are determined at a time that the order for the item is received from the customer 140, or at another time, based on the various paths extending between the geolocations of the customized navigation map 125-1. An optimal route for the delivery of the item may be selected from the routes 135-1, 135-2, 135-3 based on the customized navigation map 125-1, according to one or more algorithms, formulas or techniques, e.g., Dijkstra's Algorithm, Bellman-Ford Algorithm, Floyd-Warshall Algorithm, Johnson's Algorithm or a hub labeling technique.

For example, as is shown in FIG. 1H, a first route 135-1 would require the autonomous vehicle 150 to travel for thirteen minutes along broad or divided streets and/or sidewalks in order to reach the building 145-2. A second route 135-2 would require the autonomous vehicle 150 to travel for fifteen minutes along a one-way street that is experiencing construction delays in order to reach the building 145-2. A third route 135-3 would pass through a grass-covered field and along a restricted access road to reach the location 145 in just four minutes in order to reach the building 145-2. Whereas the first route 135-1 is the longest route, and the second route 135-2 is the shortest in length but would require the longest travel time, the third route 135-3 is the optimal route for the autonomous vehicle 150 in that the third route 135-3 would require the shortest travel time, and is the second-shortest in length. In accordance with the present disclosure, an optimal route may be selected for the autonomous vehicle 150 from among the routes 135-1, 135-2, 135-3 on any basis, e.g., time, any measure of cost or value, follow-on or concurrent tasking, or the like.

Figure 1I:
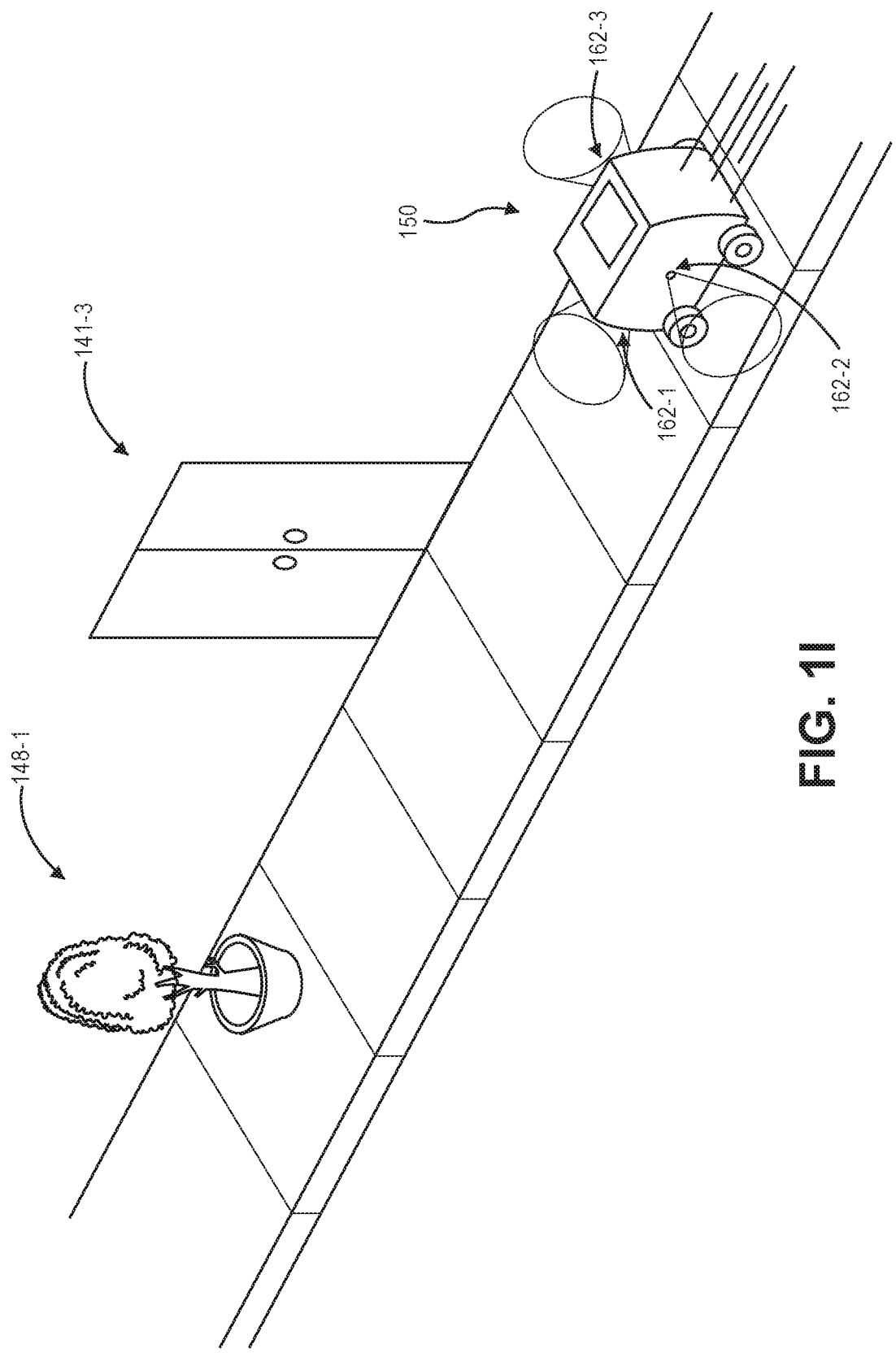
Figure 1J:
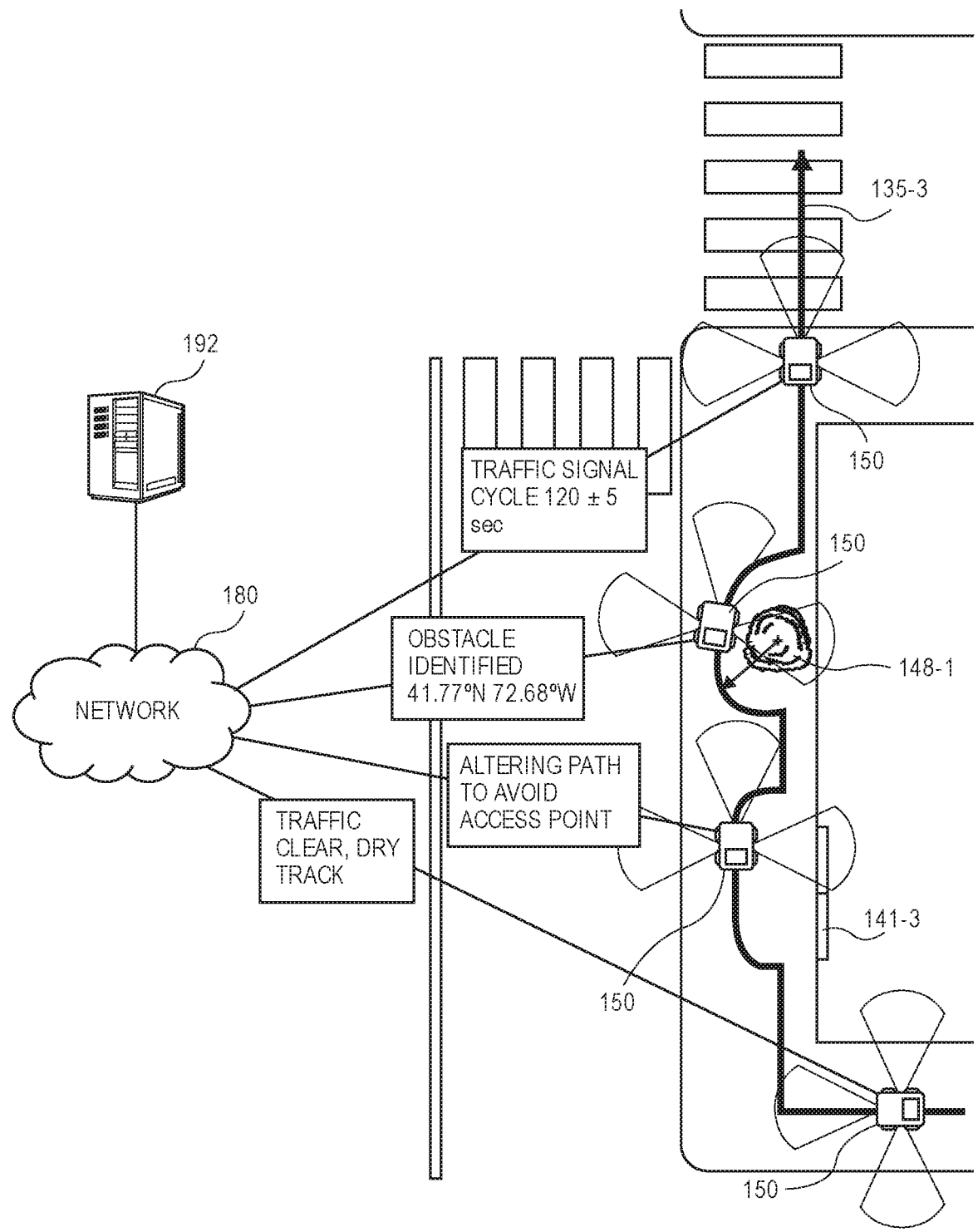

As the autonomous vehicle 150 travels from the fulfillment center 130 to the building 145-2, guided by Global Positioning System (or "GPS") navigation signals or other outdoor navigation systems, the autonomous vehicle 150 may be configured to capture information or data, e.g., by the imaging devices 162-1, 162-2, 162-3 or any other onboard sensors, and may be programmed to execute one or more modifications or adjustments to the optimal route 135-3 based on such information or data. As is shown in FIGS. 1I and 1J, where the optimal route 135-3 passes within a vicinity of an access point 141-3 to another building (e.g., an entrance into or exit from the other building), or an obstacle 148-1 (e.g., outdoor plant life having dimensions or shapes that may vary on a regular or seasonal basis), the autonomous vehicle 150 may detect the access point 141-3 or the obstacle 148-1 by the one or more imaging devices 162-1, 162-2, 162-3, and may execute one or more turns or other changes in course to remain at a safe distance from the access point 141-3 or the obstacle 148-2. As is further shown in FIG. 1J, the autonomous vehicle 150 may report information or data regarding the presence and locations of the access point 141-3 or the obstacle 148-1, or any other operational conditions or statuses affecting the route 135-3, to the server 192 over the network 180. The server 192 may utilize any information or data received from the autonomous vehicle 150, or from any other autonomous vehicles or other systems or machines (not shown), to update one or more of the baseline map 105, the sets of data 120, 122, 124, or any customized navigation maps generated based thereon, in accordance with the present disclosure.

Figure 1K:
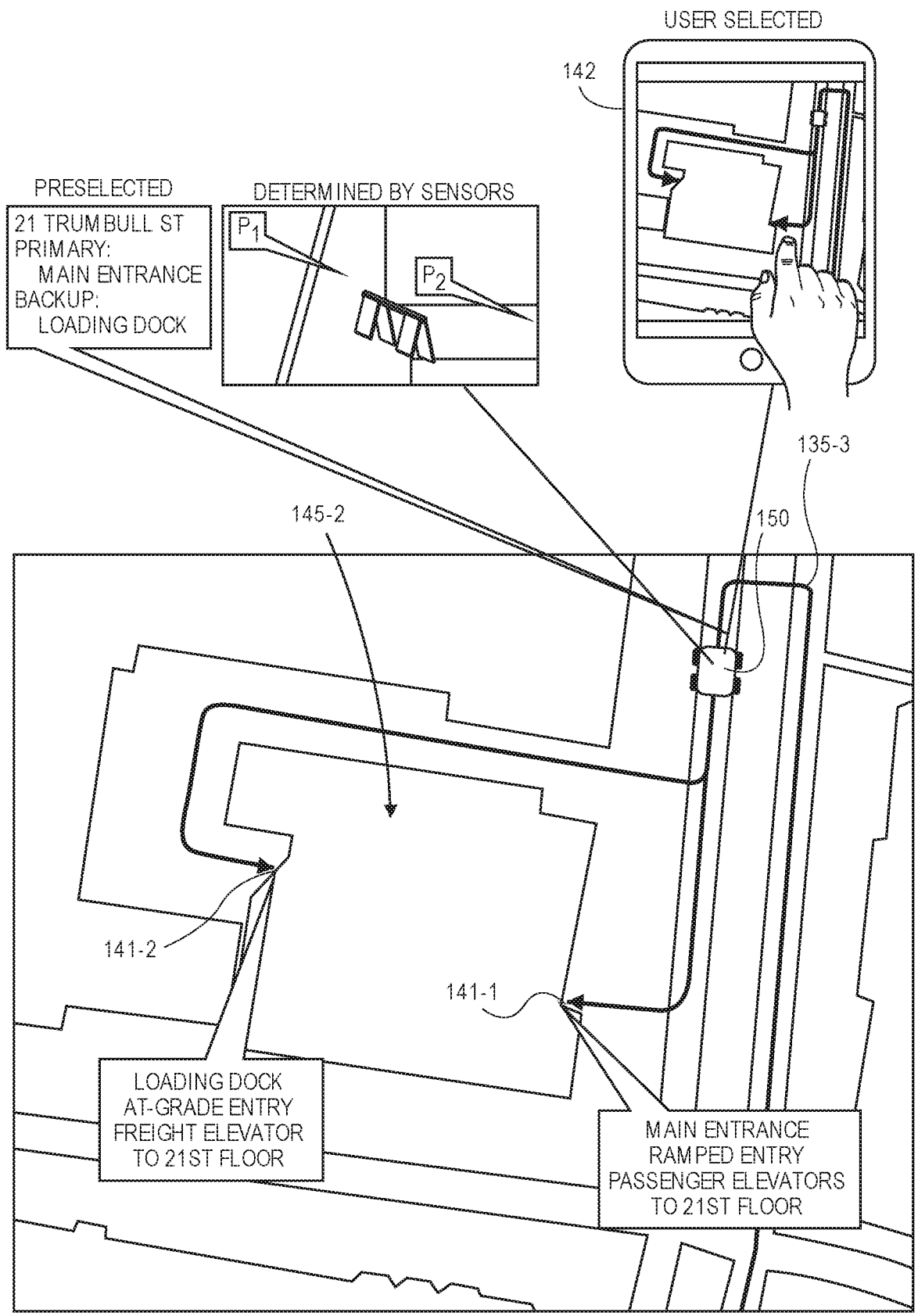

As is shown in FIG. 1K, upon arriving at the building 145-2 via the third route 135-3, the autonomous vehicle 150 may select one of the access points 141-1, 141-2 for entering the building 145-2 on any basis. In some embodiments, the autonomous vehicle 150 may be programed with location data (e.g., geolocations) of the access points 141-1, 141-2, and configured to select one of the access points 141-1, 141-2 as a primary access point, and to select the other of the access points 141-1, 141-2 as a backup (or secondary) access point, e.g., when the primary access point is unavailable. In some embodiments, the autonomous vehicle 150 may be configured to capture information or data (e.g., imaging data) upon arriving at the building 145-2, e.g., by the imaging devices 162-1, 162-2, 162-3 or by any other sensor, and to automatically identify the access points 141-1, 141-2 based on the information or data captured therefrom, e.g., imaging data, by detecting doors or other entryways, flows of traffic including humans and/or machines, or any other attributes of access points, before selecting one of the access points 141-1, 141-2 for accessing the building 145-2. For example, in such embodiments, the autonomous vehicle 150 may be programmed or otherwise configured to determine whether one or both of the access points 141-1, 141-2 is accessible based on such information or data, and to contact the customer 140, e.g., via the smartphone 142, upon determining that one of the access points 141-1, 141-2 is accessible or in the event that neither of the access points 141-1, 141-2 is accessible. Alternatively, the autonomous vehicle 150 may be programmed to return to the fulfillment center 130 upon determining that neither of the access points 141-1, 141-2 is accessible. In some embodiments, one of the access points 141-1, 141-2 may be selected by the customer 140 or one or more other designated individuals, and the autonomous vehicle 150 may be instructed to travel to the selected one of the access points 141-1, 141-2.

Figure 1L:
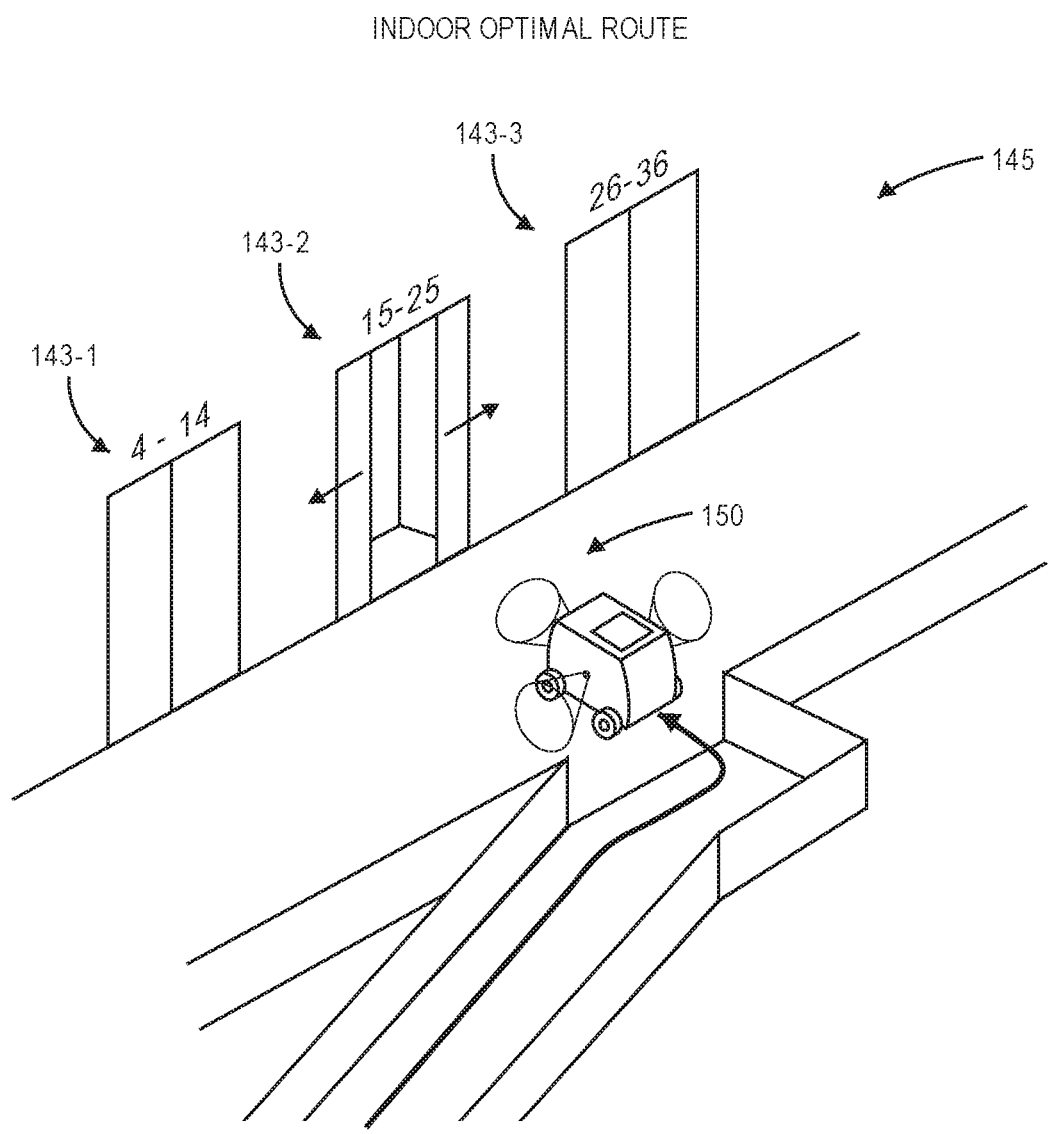

As is shown in FIG. 1L, after selecting the access point 141-1, the autonomous vehicle 150 may enter the building 145-2 and attempt to access one of a plurality of elevators 143-1, 143-2, 143-3 therein. For example, the autonomous vehicle 150 may be configured to deliver the item to the destination specified by the customer 140 via any one of the elevators 143-1, 143-2, 143-3, e.g., where each of the elevators 143-1, 143-2, 143-3 has a common or standard size that may accommodate the autonomous vehicle 150. In some embodiments, the autonomous vehicle 150 may be configured to transmit wireless codes, signals or other information to trigger a response from one or more of the elevators 143-1, 143-2, 143-3, e.g., to select a floor at the location 145. In some other embodiments, the autonomous vehicle 150 may include one or more robotic arms or other implements that are configured to contact one or more buttons or other interactive features for selecting a floor at the location 145. Alternatively, where none of the elevators 143-1, 143-2, 143-3 is sufficiently sized to accommodate the autonomous vehicle 150, the autonomous vehicle 150 may deliver the item to the destination specified by the customer 140 via the elevator 143-4.

In some embodiments, upon entering the building 145-2, the autonomous vehicle 150 may be programmed to transition from navigation by GPS signals or one or more outdoor navigation systems to navigation by way of the imaging devices 162-1, 162-2, 162-3, according to the customized indoor map 125-2, which includes information or data regarding a plurality of paths or routes extending from each of the access points 141-1, 141-2 to the destination within the building 145-2 specified by the customer 140. For example, the autonomous vehicle 150 may be programmed to detect and recognize a specific one of the elevators 143-1, 143-2, 143-3 based on imaging data captured by the imaging devices 162-1, 162-2, 162-3, and to travel within the building 145-2 along one or more of the paths or routes in accordance with the customized indoor map 125-2, e.g., by ascending to the destination specified by the customer 140 within the selected one of the elevators 143-1, 143-2, 143-3. The imaging data captured by the imaging devices 162-1, 162-2, 162-3 may be processed to recognize attributes of the building 145-2, such as landmarks, surface features, alphanumeric characters or other identifiers of floors, spaces or other features within the building 145-2. Alternatively, where the building 145-2 is equipped with one or indoor positioning system sensors configured to capture and interpret light waves, radio waves, magnetic fields, acoustic signals, or other sensory information, and the autonomous vehicle 150 may determine its position or navigate within the building 145-2 based on signals received from such indoor positioning systems.

Figure 1M:
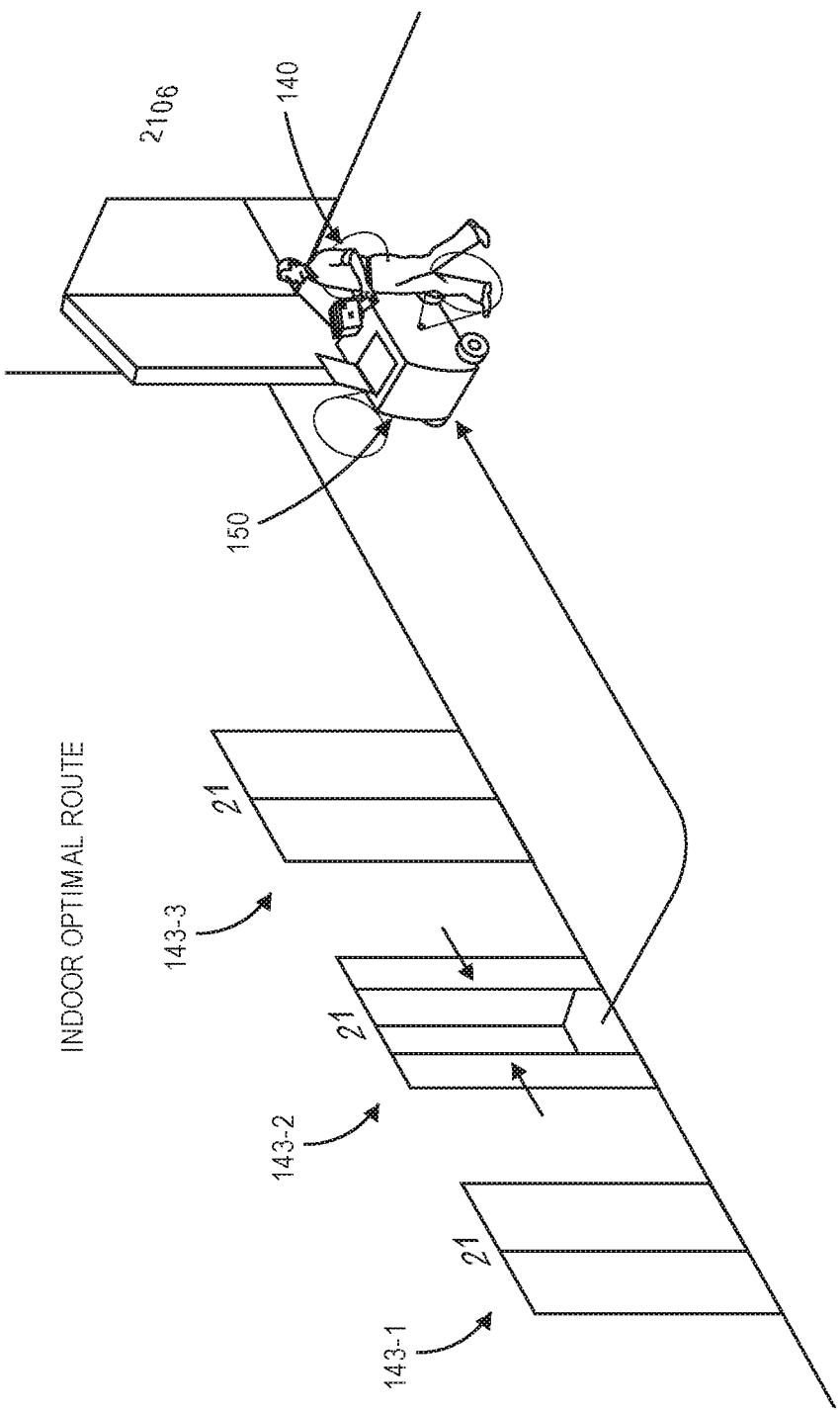

As is shown in FIG. 1M, upon reaching a floor of the destination specified by the customer 140, the autonomous vehicle 150 may depart the elevator 143-2 and travel to meet the customer 140 at the destination, guided by imaging data captured by one or more of the imaging devices 162-1, 162-2, 162-3. In some embodiments, the autonomous vehicle 150 may be configured to complete an attended delivery, e.g., where the customer 140 or a designated recipient awaits the item, and receives the item from the autonomous vehicle 150, such as is shown in FIG. 1M. In some embodiments, the autonomous vehicle 150 may be configured to complete an unattended delivery, e.g., by depositing the item at or near the destination specified by the customer 140, such as by a robotic arm or other feature. In some embodiments, the autonomous vehicle 150 may be configured to complete both attended and unattended deliveries.

Accordingly, the systems and methods of the present disclosure are directed to generating customized navigation maps for one or more autonomous vehicles, and identifying optimal routes, viz., outdoor and indoor routes, for the performance of one or more tasks by such vehicles. The customized navigation maps may be generated for the operation of an autonomous vehicle within an area or environment based on baseline maps or mapping data, e.g., existing maps, GIS data, imaging data or the like, which may be augmented by one or more layers of information or data regarding available infrastructure or features within the area or environment, as well as attributes of the autonomous vehicles (e.g., dimensions, operating characteristics or other attributes), and any prevailing operational or environmental conditions within the area or environment. The customized navigation maps may be updated from time to time, as the availability of infrastructure or features within the area or environment changes for any reason, e.g., on a continuous basis, as information or data regarding such infrastructure or features is received. Once the customized navigation maps have been updated, the customized navigation maps may be used to determine optimal routes for autonomous vehicles during the performance of tasks, such as a delivery of an item to a destination. Where optimal routes are generated for a plurality of autonomous vehicles, one of the vehicles may be selected for the performance of a task based on the optimal routes.

The autonomous vehicles of the present disclosure may include a cargo bay or other storage compartment, or multiple cargo bays or storage compartments, for storing items that are being delivered from an origin to a destination. Such cargo bays or storage compartments may be used to securely maintain items therein at any desired temperature, pressure or alignment or orientation, and to protect such items against the elements. Furthermore, in some embodiments, the autonomous vehicles may include various equipment or components for determining whether a cargo bay or other storage compartment is empty or includes one or more items, or for identifying specific items that are stored therein, along with equipment or components for engaging or interacting with such items. The autonomous vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous vehicles of the present disclosure may include any number of sensors such as position sensors (e.g., Global Positioning System receivers, or cellular transceivers configured to triangulate positions based on signals received from multiple cellular transmitters), imaging devices (e.g., digital cameras or other imaging devices) or other sensors, including but not limited to speedometers, inclinometers, compasses, altimeters, gyroscopes or scanners. The autonomous vehicles of the present disclosure may also include communications equipment (e.g., wired or wireless means for communication such as components or systems operating Wireless Fidelity, or Wi-Fi, Bluetooth, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous vehicle, e.g., in causing the autonomous vehicle to travel along one or more paths or routes, to search for alternate paths or routes, or to avoid expected or unexpected hazards encountered by the autonomous vehicle while traveling along such paths or routes. The autonomous vehicles of the present disclosure may further include any number of computer components (e.g., processors, data stores, transceivers or input/output devices) for performing any of the tasks or executing any of the functions described herein.

In some embodiments, an autonomous vehicle may be programmed or configured to travel to a building or structure having one or more access points, e.g., based on an optimal route determined from a customized outdoor navigation map constructed from a baseline map of an area or environment, and one or more layers of information or data regarding attributes of the autonomous vehicle, as well as one or more layers of information or data regarding available infrastructure or features within the area or environment. The autonomous vehicle may then travel to a location of the building or structure by way of the optimal route, guided by one or more GPS signals and/or other outdoor navigation systems. In some embodiments, upon arriving at the location of the building or structure, the autonomous vehicle may be configured to execute one or more actions in order to access the building or structure. For example, the autonomous vehicle may be programmed with one or more geolocations of a primary or preferred access point for accessing the building or structure, and with one or more other geolocations of other access points (e.g., secondary or backup access points) for accessing the building or structure. In some embodiments, the autonomous vehicle may be programmed to capture information or data regarding the building or structure and to select an access point based on prevailing conditions at the building or structure, e.g., in real time or in near-real time, based on such conditions. In some embodiments, the autonomous vehicle may be further configured to receive one or more selections or designations of primary or preferred access points from a customer, e.g., by way of one or more interactions with a computer device, and may be programmed to proceed to the primary access point, or to one or more of the preferred access points, in a descending order of preference. Alternatively, in some embodiments, the autonomous vehicle may be programmed to determine whether the autonomous vehicle may access the building or structure by way of a primary or preferred access point based on information or data captured thereby and, upon determining that the building or structure is inaccessible, select a secondary or backup access point, or contact the customer for further instructions.

The autonomous vehicles of the present disclosure may also be programmed or otherwise configured to automatically access one or more predetermined or specified locations, e.g., to automatically open a door or other entry point at a facility (e.g., a private dwelling or business location), to access a public garage or other parking or standing area, or to activate an indicator within a home, an office or another structure. When an order for an item stored in an autonomous vehicle is received, and the order is assigned to the autonomous vehicle for delivery, the autonomous vehicle may be configured to transmit wireless codes, signals or other information to trigger a response from one or more devices or machines equipped with wireless transceivers, such as garage door openers, doorbells, lights, haptic feedback systems or other machines or devices. Alternatively, requests or instructions for granting access to locations on behalf of an autonomous vehicle may be transmitted by one or more external computer devices or resources to one or more devices associated with structures at the locations, and access to such locations may be granted accordingly. Such requests or instructions may include access codes, authenticators, keys, tokens or similar information, which may be used by an autonomous vehicle to obtain access to one or more structures at a given location.

Figure 2A:
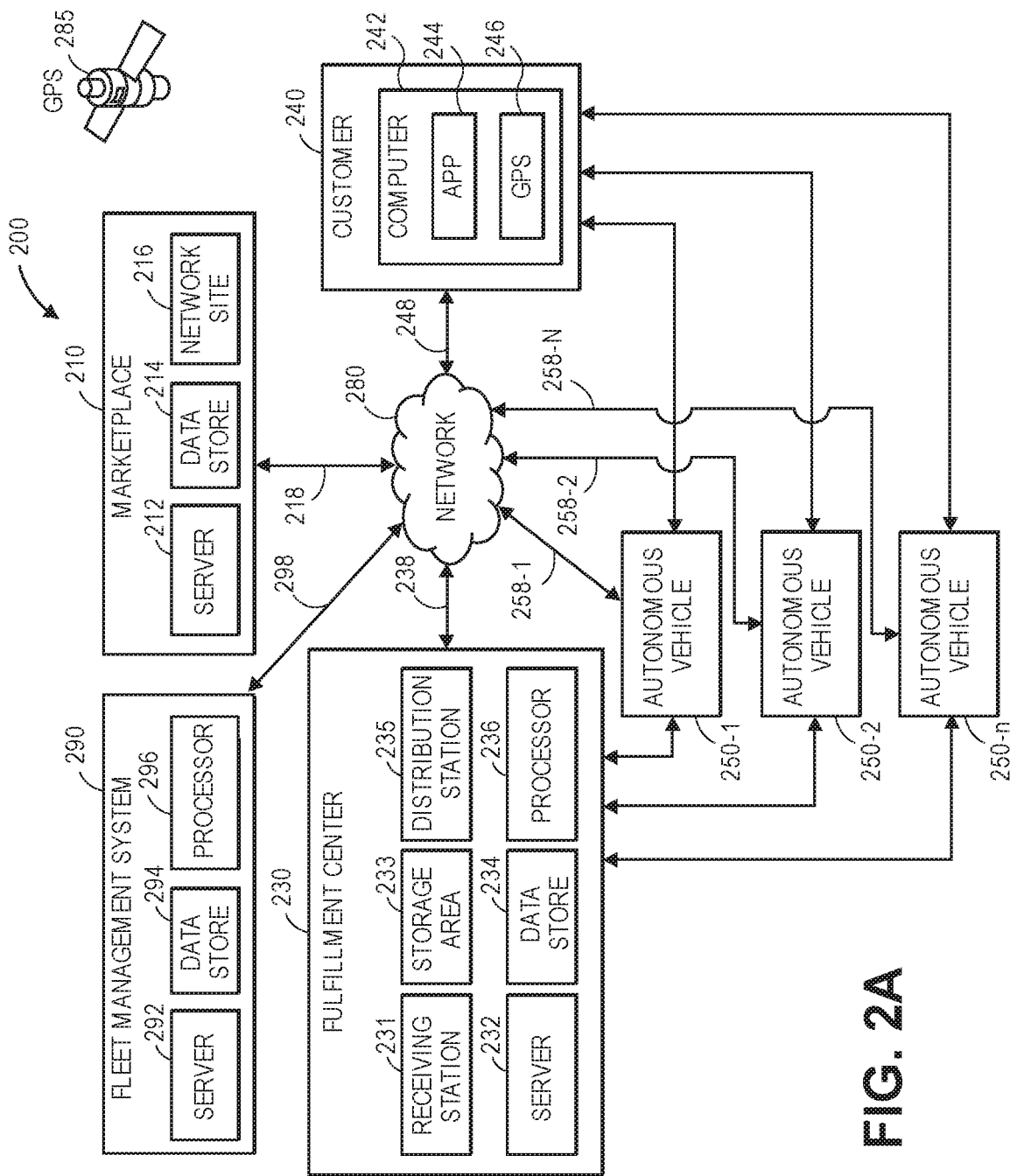
FIGS. 2A and 2B are block diagrams of components of one system for utilizing customized navigation maps and routes in accordance with embodiments of the present disclosure.
Figure 2B:
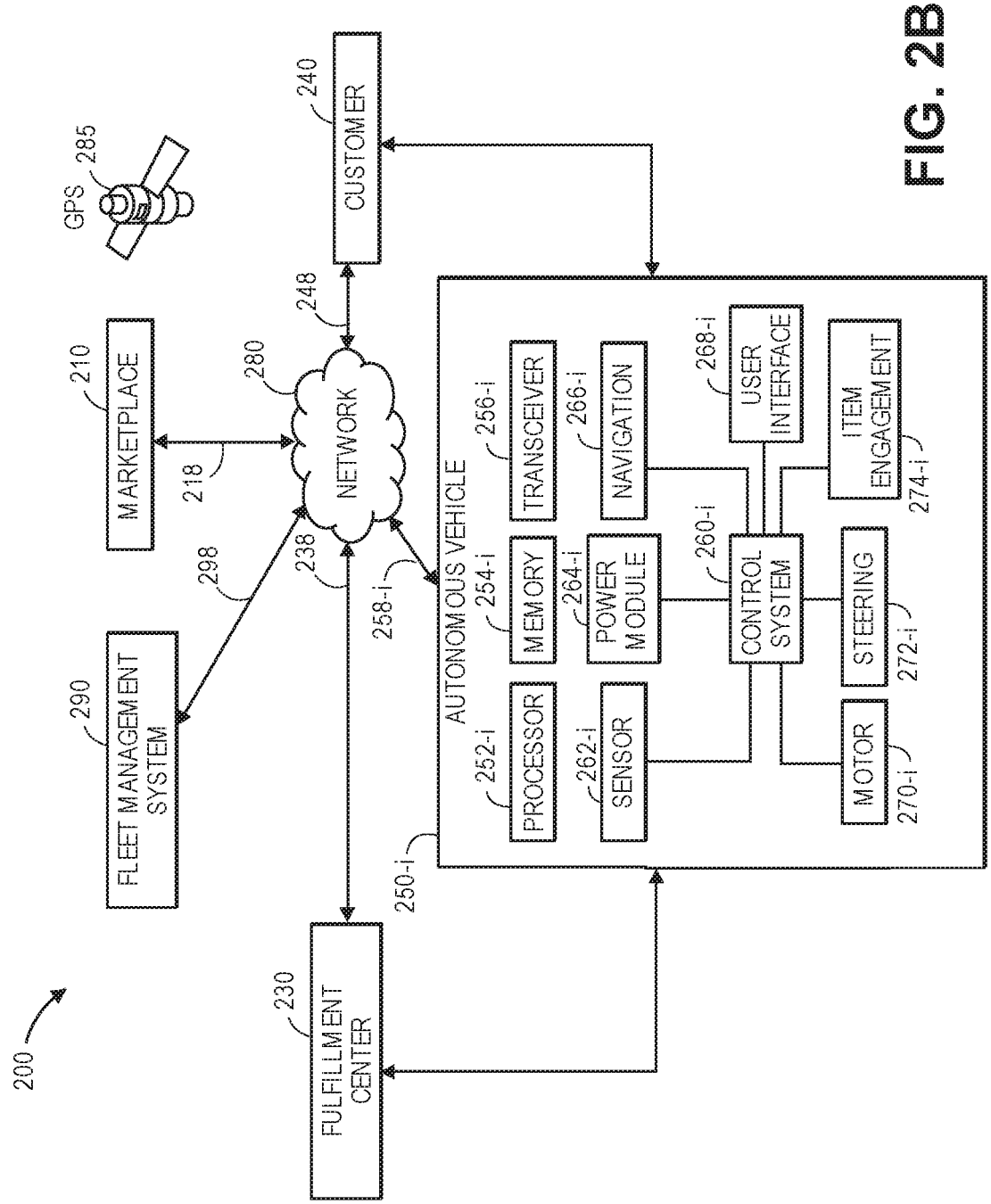

Referring to FIGS. 2A and 2B, block diagrams of components of one system for utilizing customized navigation maps and routes in accordance with embodiments of the present disclosure is shown. The system 200 includes a marketplace 210, a fulfillment center 230, a customer 240, a plurality of autonomous vehicles 250-1, 250-2 . . . 250-n and a fleet management system 290 that are connected to one another across a network 280, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1M.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data store 214 may include any type of information regarding items that have been made available for sale through the marketplace 210, or ordered by customers, such as the customer 240, from the marketplace 210, or any information or data regarding the delivery of such items to the customers, e.g., by one or more of the autonomous vehicles 250-1, 250-2 . . . 250-n.

The fulfillment center 230 may be any facility that is adapted to receive, store, process and/or distribute items. As is shown in FIG. 2A, the fulfillment center 230 includes a server 232, a data store 234, and one or more computer processors 236. The fulfillment center 230 also includes stations for receiving, storing and distributing items to customers, including but not limited to a receiving station 231, a storage area 233 and a distribution station 235.

The server 232 and/or the processors 236 may operate one or more order processing and/or communication systems and/or software applications having one or more user interfaces, or communicate with one or more other computing devices or machines that may be connected to the network 280, as indicated by line 238, for transmitting or receiving information in the form of digital or analog data, or for any other purpose. For example, the server 232 and/or the processors 236 may also operate or provide access to one or more reporting systems for receiving or displaying information or data regarding orders for items received by the marketplace 210, or deliveries made by one or more of the autonomous vehicles 250-1, 250-2 . . . 250-n, and may provide one or more interfaces for receiving interactions (e.g., text, numeric entries or selections) from one or more operators, users, workers or other persons in response to such information or data. The server 232, the data store 234 and/or the processor 236 may be general-purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

For example, the server 232 and/or the processors 236 may be configured to determine an optimal path or route between two locations for the execution of a given task by one or more of the autonomous vehicles 250-1, 250-2 . . . 250-n on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. The server 232 and/or the processors 236 may be configured to identify levels of inventory distributed at the fulfillment center 230, or in one or more other fulfillment centers, and to identify an optimal path to be traveled by one or more of the autonomous vehicles 250-1, 250-2 . . . 250-n in order to obtain each of the items included in an order and to deliver such items to a customer or other destination. Additionally, the server 232 and/or the processor 236 may determine which of the autonomous vehicles 250-1, 250-2 . . . 250-n is appropriately equipped to perform specific steps of a task, based on a proximity to one or more other autonomous vehicles or other vehicles, as well as a given destination or other location, or on any other relevant factor or basis. The server 232 and/or the processor 236 may also identify appropriate locations or rendezvous points where one or more humans, vehicles or other machines may meet in order to collaborate for any purpose, including but not limited to the delivery of an item.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), as well as one or more of the autonomous vehicles 250-1, 250-2 . . . 250-n, and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to locations or destinations specified by customers, e.g., by way of one or more of the autonomous vehicles 250-1, 250-2 . . . 250-n, or any other vehicle of any type, e.g., cars, trucks, trailers, freight cars, container ships or cargo aircraft (e.g., manned aircraft or unmanned aircraft, such as drones). Such locations or destinations may include, but are not limited to, facilities having specific addresses or other geo-coded identifiers (e.g., dwellings or businesses), as well as storage lockers or other temporary storage or receiving facilities. Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the server 232, the data store 234 and/or the processor 236, or with one or more other computing devices or machines, and may communicate with the receiving station 231, the storage area 233 or the distribution station 235 within the fulfillment center 230 by any known wired or wireless means, or with the marketplace 210, the customer 240 or one or more of the autonomous vehicles 250-1, 250-2 . . . 250-n over the network 280, as indicated by line 238, through the sending and receiving of digital data.

Additionally, the fulfillment center 230 may include one or more systems or devices (not shown in FIG. 2A or FIG. 2B) for determining locations of one or more elements therein, such as cameras or other image recording devices. Furthermore, the fulfillment center 230 may also include one or more workers or staff members (not shown in FIG. 2A or FIG. 2B), who may handle or transport items within the fulfillment center 230. Such workers may operate one or more computing devices or machines for registering the receipt, retrieval, transportation or storage of items within the fulfillment center, or a general-purpose device such as a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the marketplace 210, e.g., for delivery by one or more of the autonomous vehicles 250-1, 250-2 . . . 250-n. The customer 240 may utilize one or more computing devices 242 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 244, such as a web browser or a shopping application, and may be connected to or otherwise communicate with the marketplace 210, the fulfillment center 230 or the autonomous vehicles 250-1, 250-2 . . . 250-n through the network 280, as indicated by line 248, by the transmission and receipt of digital data.

The autonomous vehicles 250-1, 250-2 . . . 250-n may be any type or form of self-powered vehicle capable of being programmed or otherwise configured for autonomous travel between two points along one or more paths or routes, in furtherance of the performance of one or more tasks, such as the delivery of an item from the fulfillment center 230 to the customer 240, based on one or more computer instructions. For example, one or more of the autonomous vehicles 250-1, 250-2 . . . 250-n may be programmed with one or more paths or routes of a customized navigation map generated for a respective one of the autonomous vehicles 250-1, 250-2 . . . 250-n, or otherwise configured to travel along an optimal path or route between two locations for the execution of a given task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths or routes may, in some embodiments, have been determined from customized navigation maps generated for the specific autonomous vehicles 250-1, 250-2 . . . 250-n. Additionally, in some embodiments, the autonomous vehicles 250-1, 250-2 . . . 250-n may be programmed with locations of access points associated with delivery addresses, as well as instructions for operating one or more access systems or features such as manually or automatically activated doors (e.g., hinged, revolving, or sliding doors) or any wirelessly activated systems within one or more structures, such as wireless door openers (e.g., standard doors equipped with keyless access systems, as well as garage doors, pet doors or other access doors), wireless doorbells, or any other systems (e.g., feedback devices of any kind).

Each of the autonomous vehicles 250-1, 250-2 . . . 250-n shown in FIG. 2A, which may be represented in FIG. 2B as an autonomous vehicle 250-i, may include one or more computer components such as a processor 252-i, a memory 254-i and a transceiver 256-i in communication with one or more other computer devices that may be connected to the network 280, as indicated by line 258-i, in order to transmit or receive information in the form of digital or analog data, or for any other purpose. For example, the autonomous vehicle 250-i may receive instructions or other information or data via the transceiver 256-i regarding an item that is to be delivered from the fulfillment center 230 to the customer 240 via one or more paths or routes from the marketplace server 212, the fulfillment center server 232, the customer computing device 242 and/or one or more servers 292 of the fleet management system 290, or from any other computing device over the network 280. The transceiver 256-i may be configured to enable the autonomous vehicle 250-i to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 280 or directly.

The transceiver 256-i may further include or be in communication with one or more input/output (or "I/O") interfaces, network interfaces and/or input/output devices, and may be configured to allow information or data to be exchanged between one or more of the components of the autonomous vehicle 250-i, or to one or more other computer devices or systems (e.g., other aerial vehicles, not shown) via the network 280. For example, in some embodiments, the transceiver 256-i may be configured to coordinate I/O traffic between the processor 252-i and one or more onboard or external computer devices or components. The transceiver 256-i may perform any necessary protocol, timing or other data transformations in order to convert data signals from a first format suitable for use by one component into a second format suitable for use by another component. In some embodiments, the transceiver 256-i may include support for devices attached through various types of peripheral buses, e.g., variants of the Peripheral Component Interconnect (PCI) bus standard or the Universal Serial Bus (USB) standard. In some other embodiments, functions of the transceiver 256-i may be split into two or more separate components, or incorporated directly into the processor 252-i.

As is also shown in FIG. 2B, the autonomous vehicle 250-i also includes one or more control systems 260-i, as well as one or more sensors 262-i, one or more power modules 264-*i*, one or more navigation modules 266-*i*, and one or more user interfaces 268-*i*. As is also shown in FIG. 2B, the autonomous vehicle 250-*i* further includes one or more control systems 260-*i*, as well as one or more sensors 262-*i*, one or more power modules 264-*i*, one or more navigation modules 266-*i*, and one or more user interfaces 268-*i*. Additionally, the autonomous vehicle 250-*i* further includes one or more motors 270-*i*, one or more steering systems 272-*i* and one or more item engagement systems (or devices) 274-*i*.

The control system 260-*i* may include one or more software applications or hardware components configured for controlling or monitoring operations of one or more components such as the sensor 262-*i*, the power module 264-*i*, the navigation module 266-*i*, or the user interfaces 268-*i*, as well as the motors 270-*i*, the steering systems 272-*i* and the item engagement systems 274-*i*, e.g., by receiving, generating, storing and/or transmitting one or more computer instructions to such components. The control system 260-*i* may communicate with the marketplace 210, the fulfillment center 230 and/or the customer 240 over the network 280, as indicated by line 258-*i*, through the sending and receiving of digital data.

The sensor 262-*i* may be a position sensor such as a GPS receiver in communication with one or more orbiting satellites or other components of a GPS system 285, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data, of the autonomous vehicle 250-*i*. Geolocations of the sensor 262-*i* may be associated with the autonomous vehicle 250-*i*, where appropriate. Alternatively, the sensor 262-*i* may be further configured to receive one or more signals from indoor positioning systems, e.g., light waves, radio waves, magnetic fields, acoustic signals, or other sensory information, and the autonomous vehicle 250-*i* may determine its position or navigate one or more buildings or structures based on such signals.

The sensor 262-*i* may also be an imaging device including any form of optical recording sensor or device (e.g., digital cameras, depth sensors or range cameras, infrared cameras, radiographic cameras or other optical sensors) that may be configured to photograph or otherwise capture imaging data (e.g., still or moving images in color or black and white that may be captured at any frame rates, or depth imaging data such as ranges), or associated audio information or data, or metadata, regarding objects or activities occurring within a vicinity of the autonomous vehicle 250-*i*, or for any other purpose. For example, the sensor 262-*i* may be configured to capture or detect reflected light if the reflected light is within a field of view of the sensor 262-*i*, which is defined as a function of a distance between an imaging sensor and a lens within the sensor 262-*i*, viz., a focal length, as well as a location of the sensor 262-*i* and an angular orientation of the lens. Accordingly, where an object appears within a depth of field, or a distance within the field of view where the clarity and focus is sufficiently sharp, the sensor 262-*i* may capture light that is reflected off objects of any kind to a sufficiently high degree of resolution using one or more sensors thereof, and store information regarding the reflected light in one or more data files.

The sensor 262-*i* may also include manual or automatic features for modifying a field of view or orientation. For example, the sensor 262-*i* may be a digital camera configured in a fixed position, or with a fixed focal length (e.g., fixed-focus lenses) or angular orientation. Alternatively, the sensor 262-*i* may include one or more actuated or motorized features for adjusting a position of the sensor 262-*i*, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262-*i*, or a change in one or more of the angles defining the angular orientation of the sensor 262-*i*.

For example, the sensor 262-*i* may be an imaging device that is hard-mounted to a support or mounting that maintains the imaging device in a fixed configuration or angle with respect to one, two or three axes. Alternatively, however, the sensor 262-*i* may be provided with one or more motors and/or controllers for manually or automatically operating one or more of the components, or for reorienting the axis or direction of the sensor 262-*i*, i.e., by panning or tilting the sensor 262-*i*. Panning the sensor 262-*i* may cause a rotation within a horizontal plane or about a vertical axis (e.g., a yaw), while tilting the sensor 262-*i* may cause a rotation within a vertical plane or about a horizontal axis (e.g., a pitch). Additionally, the sensor 262-*i* may be rolled, or rotated about its axis of rotation, and within a plane that is perpendicular to the axis of rotation and substantially parallel to a field of view of the sensor 262-*i*.

Imaging data (e.g., still or moving images, as well as associated audio data or metadata) captured using the sensor 262-*i* may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 262-*i* may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 262-*i* may also be an item identification sensor that may include a bar code scanner, a radiofrequency identification (or RFID) reader, or other technology that is utilized to determine an identification of an item that is being retrieved or deposited, or has been retrieved or deposited, by the autonomous vehicle 250-$i$. In some embodiments, the sensor 262-$i$ may be provided within a cargo bay or other storage component of the autonomous vehicle 250-$i$, such as a presence detection sensor and/or a motion sensor for detecting the presence or absence of one or more objects within the cargo bay or storage compartment, or movement of objects therein.

The sensor 262-$i$ may be further configured to capture, record and/or analyze information or data regarding its positions, velocities, accelerations or orientations of the autonomous vehicle 250-$i$, and to analyze such data or information by one or more means, e.g., by aggregating or summing such data or information to form one or more qualitative or quantitative metrics of the movement of the sensor 262-$i$. For example, a net vector indicative of any and all relevant movements of the autonomous vehicle 250-$i$, including but not limited to physical positions, velocities, accelerations or orientations of the sensor 262-$i$, may be derived. Additionally, coefficients or scalars indicative of the relative movements of the autonomous vehicle 250-$i$ may also be defined.

The power module 264-$i$ may be any type of power source for providing electrical power, mechanical power or other forms of power in support of one or more electrical or mechanical loads aboard the autonomous vehicle 250-$i$. In some embodiments, the power module 264-$i$ may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 264-$i$ may each have any cell voltages, peak load currents, charge times, specific energies, internal resistances or cycle lives, or other power ratings. The power module 264-$i$ may also be any type, size or form of other power source, e.g., other than a battery, including but not limited to one or more fuel cells, turbines, solar cells or nuclear reactors. Alternatively, the power module 264-$i$ may be another form of prime mover (e.g., electric, gasoline-powered or any other type of motor) capable of generating sufficient mechanical forces for the autonomous vehicle 250-$i$.

The navigation module 266-$i$ may include one or more software applications or hardware components including or having access to information or data regarding aspects of transportation systems within a given region, including the locations, dimensions, capacities, conditions, statuses or other attributes of various paths or routes in the region. For example, the navigation module 266-$i$ may receive inputs from the sensor 262-$i$, e.g., from a GPS receiver, an imaging device or another sensor, and determine an optimal direction and/or an optimal speed of the autonomous vehicle 250-$i$ for travelling on a given path or route based on such inputs. The navigation module 266-$i$ may select a path or route to be traveled upon by the autonomous vehicle 250-$i$, and may provide information or data regarding the selected path or route to the control system 260-$i$.

The user interface 268-$i$ may be configured to receive and provide information to human users of the autonomous vehicle 250-$i$ and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous vehicle 250-$i$ and a human user. In various embodiments, the user interface 268-$i$ may include a variety of different features. For example, in one embodiment, the user interface 268-$i$ may include a relatively small display and/or a keypad for receiving inputs from human users. In other embodiments, inputs for controlling the operation of the autonomous vehicle 250-$i$ may be provided remotely. For example, in order to access a storage compartment, a human user may send a text message to or reply to a text message from the control system 260-$i$ and request that a door or other access portal be opened in order to enable the user to access an item therein. In various implementations, the autonomous vehicle 250-$i$ may have capabilities for directly receiving such signals from a user device or other device (e.g., a device inside a user's residence) that provides a signal to open the storage compartment door.

The motor 270-$i$ may be any type or form of motor or engine (e.g., electric, gasoline-powered or any other type of motor) that is capable of providing sufficient rotational forces to one or more axles, shafts and/or wheels for causing the autonomous vehicle 250-$i$ and any items therein to travel in a desired direction and at a desired speed. In some embodiments, the autonomous vehicle 250-$i$ may include one or more electric motors having any number of stators, poles and/or windings, such as an outrunner or an inrunner brushless direct current (DC) motor, or any other motors, having any speed rating, power rating or any other rating.

The steering system 272-$i$ may be any system for controlling a direction of travel of the autonomous vehicle 250-$i$. The steering system 272-$i$ may include any number of automatically operable gears (e.g., racks and pinions), gear boxes, shafts, shaft assemblies, joints, servos, hydraulic cylinders, linkages or other features for repositioning one or more wheels to cause the autonomous vehicle 250-$i$ to travel in a desired direction.

The item engagement system 274-$i$ may be any mechanical component, e.g., a robotic arm, for engaging an item or for disengaging the item, as desired. For example, when the autonomous vehicle 250-$i$ is tasked with delivering items from an origin to a destination, the item engagement system 274-$i$ may be used to engage the items at the origin and to deposit the items in a cargo bay or other storage compartment prior to departing. After the autonomous vehicle 250-$i$ arrives at the destination, the item engagement system 274-$i$ may be used to retrieve the items within the cargo bay or storage compartment, and deposit the items or materials in a desired location at the destination.

In some embodiments, the autonomous vehicle 250-$i$ may be programmed or configured to perform one or more missions or tasks in an integrated manner. For example, the control system 260-$i$ may be programmed to instruct the autonomous vehicle 250-$i$ to travel to an origin, e.g., the fulfillment center 230, and to begin the performance of a task there, such as by retrieving an item at the origin using the item engagement system 274-$i$, before proceeding to a destination, e.g., the customer 240, along a selected route (e.g., an optimal route). In some embodiments, the selected route may be determined based on a customized navigation map prepared for the autonomous vehicle 250-$i$, e.g., based on a baseline map, as well as any information or data regarding available transportation infrastructure or features, and any attributes of the autonomous vehicle 250-$i$. Along the way, the control system 260-$i$ may cause the motor 270-$i$ to operate at any predetermined speed and cause the steering system 272-$i$ to orient the autonomous vehicle 250-$i$ in a predetermined direction or otherwise as necessary to travel along the selected route, e.g., based on information or data received from or stored in the navigation module 266-*i*. The control system 260-*i* may further cause the sensor 262-*i* to capture information or data (including but not limited to imaging data) regarding the autonomous vehicle 250-*i* and/or its surroundings along the selected route. The control system 260-*i* or one or more other components of the autonomous vehicle 250-*i* may be programmed or configured as necessary in order to execute any actions associated with a given task, in accordance with the present disclosure.

Any combination of networks or communications protocols may be utilized in accordance with the systems and methods of the present disclosure. For example, each of the autonomous vehicles 250-1, 250-2 . . . 250-*n* may be configured to communicate with one another or with the marketplace server 212, the fulfillment center server 232 and/or the customer computer 242 via the network 280, such as is shown in FIGS. 2A and 2B, e.g., via an open or standard protocol such as Wi-Fi. Alternatively, each of the autonomous vehicles 250-1, 250-2 . . . 250-*n* may be configured to communicate with one another directly outside of a centralized network, such as the network 280, e.g., by a wireless protocol such as Bluetooth, in which two or more of the autonomous vehicles 250-1, 250-2 . . . 250-*n* may be paired with one another.

The fleet management system 290 includes one or more physical computer servers 292 having a plurality of databases 294 associated therewith, as well as one or more computer processors 296 provided for any specific or general purpose, including but not limited to the generation of customized navigation maps for one or more of the autonomous vehicles 250-1, 250-2 . . . 250-*n*. The servers 292 may be connected to or otherwise communicate with the databases 294 and the processors 296. The databases 294 may store any type of information or data, including but not limited to mapping data (such as GIS data), imaging data, acoustic signals or any other information or data. The servers 292 and/or the computer processors 296 may also connect to or otherwise communicate with the network 280, as indicated by line 298, through the sending and receiving of digital data. For example, the fleet management system 290 may include any facilities, stations or locations having the ability or capacity to receive and store information or data in one or more data stores, e.g., data files received from any of the autonomous vehicles 250-1, 250-2 . . . 250-*n*, one or more other external computer systems (not shown) via the network 280. In some embodiments, the fleet management system 290 may be provided in a physical location. In other such embodiments, the fleet management system 290 may be provided in one or more alternate or virtual locations, e.g., in a "cloud"-based environment. In still other embodiments, the fleet management system 290 may be provided onboard one or more of the autonomous vehicles 250-1, 250-2 . . . 250-*n*.

For example, the fleet management system 290 of FIG. 2 may be independently provided for the purpose of generating or receiving baseline maps of an area or environment, e.g., based on existing maps, GIS data, imaging data, or other data, and receiving information or data regarding indoor or outdoor transportation infrastructure or features in the area or environment. The fleet management system 290 may also be provided for the purpose of generating customized navigation maps for one or more of the autonomous vehicles 250-1, 250-2 . . . 250-*n* based on the baseline maps, as well as the information or data regarding the indoor or outdoor transportation infrastructure or features. The fleet management system 290 may also be provided for the purpose of updating customized navigation maps on a periodic, near-real time or real time basis, as information or data is received regarding the transportation infrastructure or features or the autonomous vehicles 250-1, 250-2 . . . 250-*n*.

In some embodiments, the fleet management system 290 of FIG. 2 may also be provided for the purpose of receiving, tracking and/or otherwise monitoring the operations of one or more of the autonomous vehicles 250-1, 250-2 . . . 250-*n*, including but not limited to any information or data regarding attributes of the autonomous vehicles 250-1, 250-2 . . . 250-*n*, or tasks being performed by the autonomous vehicles 250-1, 250-2 . . . 250-*n*, as well as operational or environmental conditions, traffic conditions, ground or surface conditions, weather conditions, planned or ongoing construction or other events, or any other factors that may affect the capacity of one or more paths or routes within areas in which such autonomous vehicles 250-1, 250-2 . . . 250-*n* are operating or have operated.

The fleet management system 290 may also be configured to determine an optimal path or route between two locations for the execution of a given task based on a customized navigation map, e.g., according to one or more traditional shortest path or shortest route algorithms such as Dijkstra's Algorithm, Bellman-Ford Algorithm, Floyd-Warshall Algorithm, Johnson's Algorithm or a hub labeling technique. The fleet management system 290 may also be configured to determine whether a route being traveled by one or more of the autonomous vehicles 250-1, 250-2 . . . 250-*n* is optimal or preferred for a given mission or task, or to communicate instructions for varying the route to the autonomous vehicles 250-1, 250-2 . . . 250-*n*. The fleet management system 290 may also be configured to control or direct the operations of one or more of the autonomous vehicles 250-1, 250-2 . . . 250-*n*, such as by determining which of the autonomous vehicles 250-1, 250-2 . . . 250-*n* is best suited to perform a given task, as well as one or more paths to be traveled by the autonomous vehicles 250-1, 250-2 . . . 250-*n* between two or more locations while performing the task. The fleet management system 290 may further utilize any available information or data in determining a capacity of a given path or route, or whether such capacity may have increased or decreased. The number and/or type of information or data that may be received and/or processed or utilized by the fleet management system 290 are not limited.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center" a "customer," an "autonomous vehicle," a "fleet management system" or like terms, may be automated steps performed by their respective computer systems, or implemented within software modules (or computer programs) executed by one or more general purpose computers. Moreover, process steps described as being performed by a "marketplace," a "fulfillment center," a "customer," an "autonomous vehicle" or a "fleet management system" may be typically performed by a human operator, but could, alternatively, be performed by an automated agent. Furthermore, any of the functions described herein as being performed by one or more computer devices or components of the fleet management system 290 (e.g., the server 292) may also be performed by one or more computer devices or components of the online marketplace 210 and/or the fulfillment center 230 (e.g., the server 212 and/or the server 232), and vice versa. For example, the fleet management system 290 may be directly associated with one or both of the online marketplace 210 and the fulfillment center 230, or provided or operated separately.

The marketplace 210, the fulfillment center 230, the customer 240, the autonomous vehicles 250-1, 250-2 . . . 250-n or the fleet management system 290 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages, social network messages, online marketplace messages, telephone calls or the like. For example, the fulfillment center 230 and/or the server 232 may be adapted to transmit information or data in the form of synchronous or asynchronous messages to the marketplace 210 and/or the server 212, the customer 240 and/or the computing device 242, the autonomous vehicles 250-1, 250-2 . . . 250-n and/or the control system 260-i or the fleet management system 290, or any other computer device in real time or in near-real time, or in one or more offline processes, via the network 280. Those of ordinary skill in the pertinent art would recognize that the marketplace 210, the fulfillment center 230, the customer 240, the autonomous vehicles 250-1, 250-2 . . . 250-n or the fleet management system 290 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, 292, the computing devices 242, the processors 252-i, 296, or any other computers or control systems utilized by the marketplace 210, the fulfillment center 230, the customer 240, the autonomous vehicles 250-1, 250-2 . . . 250-n, the fleet management system 290, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
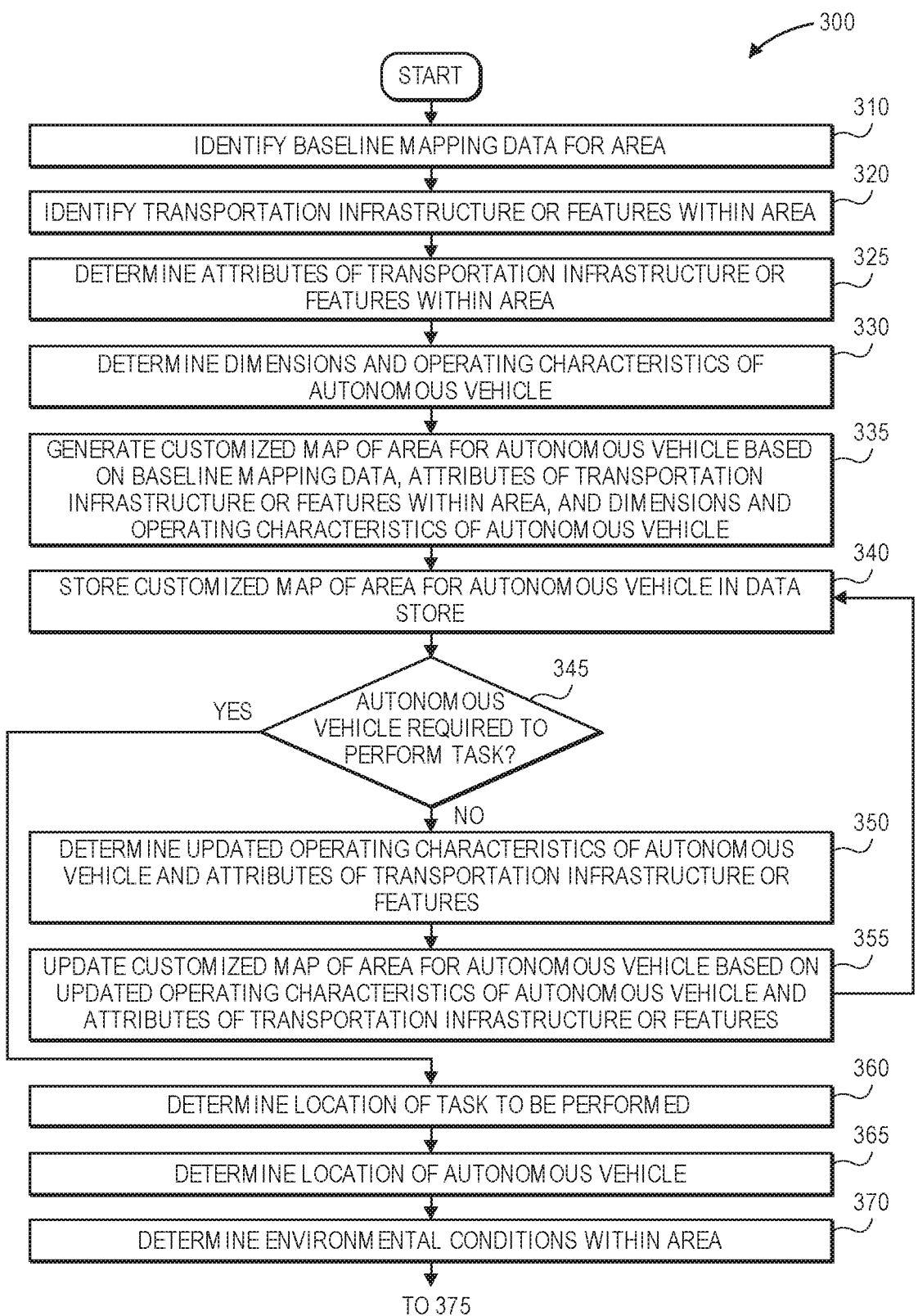
FIGS. 3A and 3B are a flow chart of one process for utilizing customized navigation maps and routes in accordance with embodiments of the present disclosure.
Figure 3B:
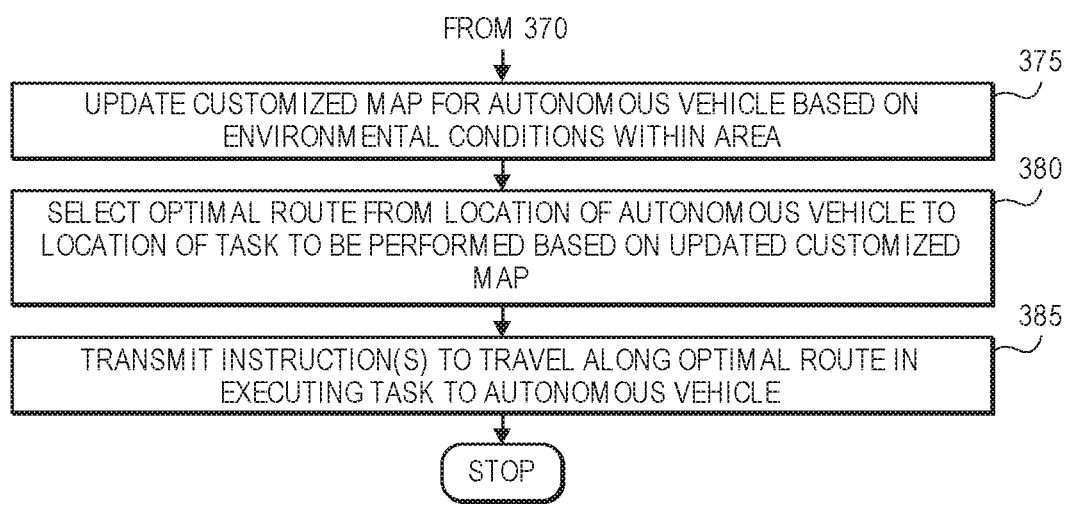

As is discussed above, in some embodiments, the systems and methods of the present disclosure may be used to generate customized navigation maps for specific autonomous vehicles within an area based on available infrastructure or features within the area, and attributes of the autonomous vehicles. The customized navigation maps may be used to generate paths or routes, e.g., optimal paths or routes, to be traveled by the autonomous vehicles during the performance of tasks, such as the delivery of items from one location within the area to another location within the area. Referring to FIGS. 3A and 3B, a flow chart 300 of one process for utilizing customized navigation maps and routes in accordance with embodiments of the present disclosure is shown. At box 310, baseline mapping data is identified for an area. For example, the baseline mapping data may have been previously determined or generated for the area and stored in one or more data stores, e.g., geolocations or geospatially-referenced points that precisely defines locations in space with one or more geocodes, such as sets of geographic coordinates such as latitudes and longitudes, and, optionally, elevations, such as geographic information system (or "GIS") data, or other data maintained in one or more data stores. The baseline mapping data may also be obtained by capturing imaging data from the area, e.g., by one or more ground-based cameras, aerial cameras, or cameras carried aboard one or more orbiting satellites. Such imaging data may be processed to recognize topographical data regarding the composition and surface features within the area or environment, as well as elevations of points within the area or environment. Alternatively, the baseline mapping data may be obtained by scanning or otherwise interpreting maps or other representations of the area, e.g., in an atlas or other set of maps.

At box 320, transportation infrastructure or features within the area are identified. For example, where the area includes transportation systems such as roads, sidewalks, crosswalks, bicycle or walking trails or bridges, and also non-traditional transportation systems, e.g., parks, fields, forests, lots, clearings or other spaces, the transportation infrastructure or features may be identified in any manner. In some embodiments, the transportation infrastructure or features may be identified in same manner or from information or data obtained from the same sources as the baseline mapping data identified at box 310.

At box 325, attributes of the transportation infrastructure or features within the area are determined. Information or data regarding locations (e.g., latitudes, longitudes and elevations), dimensions (e.g., lengths or widths), operating restrictions (e.g., speed limits, or dates or times at which the infrastructure or features are available or unavailable), capacities (e.g., numbers or volumes of traffic that may be accommodated), or surface features (e.g., angles, orientations or textures of such operating surfaces, or materials from which the operating surfaces were formed) of the infrastructure or features, or any other attributes of the infrastructure or features, may be identified or determined. Information or data regarding the transportation infrastructure or features may be identified or determined from any source, e.g., from one or more networked data stores, or the like, including but not limited to the same sources as the baseline mapping data identified at box 310. For example, the attributes of the transportation infrastructure or features may be identified based on information or data regarding prior travel within an area or environment including, but not limited to, one or more time stamps (e.g., times and positions of autonomous vehicles within the given area at such times), elapsed times between departures and arrivals, net speeds, courses, angles of orientation (e.g., a yaw, a pitch or a roll), levels of traffic congestion, sizes or dimensions of any payloads carried, operational or environmental conditions or any other information or data that describes or represents instances of prior travel by autonomous vehicles within the area or environment.

At box 330, dimensions and operating characteristics of the autonomous vehicle are determined. For example, dimensions of such vehicles (e.g., heights, lengths, widths), as well as operating characteristics of such vehicles (e.g., power levels, speeds, ranges, carrying volumes or weight limits) may be identified in a look-up table or other data file or record. In some embodiments, dimensions and/or operating characteristics of a plurality of autonomous vehicles may be determined.

At box 335, a customized navigation map is generated for the autonomous vehicle, based on the baseline mapping data, the attributes of the transportation infrastructure or features, and the dimensions and operating characteristics of the autonomous vehicle. For example, the customized navigation map may identify specific infrastructure or features that are available to the autonomous vehicle, that may accommodate the autonomous vehicle, or that may be accessed by the autonomous vehicle, e.g., roads, sidewalks, or other infrastructure, or lots, clearings or other spaces on any basis. The customized navigation map may exclude specific infrastructure or features that are not available to the autonomous vehicle, that may not accommodate the autonomous vehicle, or may not be accessed by the autonomous vehicle. For example, the customized navigation map may include sidewalks that are wider than the autonomous vehicle, tunnels that have sufficient vertical clearance for the autonomous vehicle, terrain that may be traveled upon by the autonomous vehicle's tires or wheels, while excluding roads having minimum speed limits in excess of the maximum speeds of the autonomous vehicle, paths that are subject to flooding, or bridges that are closed for temporary or long-term maintenance. In some embodiments, customized navigation maps may be generated for a plurality of autonomous vehicles, with each of the customized navigation maps representing different infrastructure or features based on the attributes of the autonomous vehicles.

At box 340, the customized navigation map of the area generated for the autonomous vehicle is stored in one or more data stores, which may be provided in a physical location associated with the autonomous vehicle such as a garage or a maintenance facility, or in one or more alternate or virtual locations, e.g., in a "cloud"-based environment.

At box 345, whether the autonomous vehicle is required to perform a task is determined. If the autonomous vehicle is not required to perform a task, then the process advances to box 350, where updated operating characteristics of the autonomous vehicles and updated attributes of the transportation infrastructure or features are determined. In some embodiments, the characteristics of the autonomous vehicles (such as power levels, ranges or carrying capacities or volumes), or the attributes of the transportation infrastructure or features (such as whether a road, a sidewalk, a path, a bridge, a park, a field or a lot is open and available for travel thereon or closed for a period of time), may be determined on a regular basis, e.g., periodically, or in real time or near-real time. At box 355, the customized navigation map is updated for the autonomous vehicle based on the updated operating characteristics or attributes, e.g., to the extent that such operating characteristics or attributes have changed, before the process returns to box 340, wherein the updated customized navigation map is stored in the one or more data stores.

If the autonomous vehicle is required to perform a task, however, then the process advances to box 360, where the location of the task to be performed is determined. For example, where the task is the delivery of one or more items, computer devices or resources operated by an online marketplace, a fulfillment center or any other commercial entity may determine that the items are located within a vicinity of the autonomous vehicle, e.g., at the same location or nearby, and may dispatch or instruct the autonomous vehicle to retrieve the ordered items for delivery to the location, which may be a location of the customer or a destination designated by the customer. An order may be completely or partially fulfilled by the autonomous vehicle, based on levels of available inventory within the vicinity of the autonomous vehicle, which may collaborate with one or more humans, machines or other vehicles, such as other autonomous vehicles in fulfilling an order received from one or more customers in the regions. The location of the task may be identified by a specific identifier of the location, such as an address, a set of coordinates, or one or more other geocodes, or by an informal identifier such as a name of a building or a reference to one or more natural or artificial landmarks associated with the location.

At box 365, a location of the autonomous vehicle is determined. For example, where the autonomous vehicle is engaged in one or more operations or missions, a location of the autonomous vehicle may be determined by one or more onboard position sensors, e.g., GPS receivers, cellular transceivers, imaging devices or the like. Where the autonomous vehicle is stationary or is not engaged in any operations or missions, a location of the autonomous vehicle may also be determined by one or more onboard position sensors, such as a most recent location identified or returned by the onboard position sensors. In some embodiments, where the autonomous vehicle is located indoors, a location of the autonomous vehicle may be determined based on information or data captured thereby, e.g., imaging data, which may be processed to recognize one or more background features or other aspects of an area or environment where the autonomous vehicle is located. The information or data may be processed to determine a location of the autonomous vehicle, e.g., by one or more recognition techniques.

At box 370, operational or environmental conditions within the area are determined. For example, real time or near-real time weather conditions, operational hazards, congestion levels or any other relevant factors may be determined from extrinsic sensors such as rain sensors, anemometers, traffic cameras or other traffic sensors or imaging devices in communication with a central server, one or more nodes of a distributed network, or other computer system. Historical or forecasted conditions may be identified based on data stored in one or more data stores, or predicted by one or more models, algorithms or techniques. In some embodiments, information or data regarding operational or environmental conditions may be captured using sensors onboard operating autonomous vehicles, which may be reported back to the central server or other computer system and processed accordingly. Information or data regarding the operational or environmental conditions may be captured or determined in any manner and by any method or technique in accordance with the present disclosure.

At box 375, the customized navigation map for the autonomous vehicle is updated based on the operational or environmental conditions within the area, as determined at box 370. The customized navigation map may be modified or revised to any qualitative or quantitative extent. For example, where prevailing operational or environmental conditions indicate that a road is occupied by motor vehicle traffic, a parade, or any other congestion, that a bicycle path is flooded, or that a park is filled with picnickers, the road, the bicycle path or the park may be removed from the customized navigation map. Where the operational or environmental conditions indicate that construction on a sidewalk is complete, or that a drawbridge has closed, the sidewalk or the drawbridge may be added to the customized navigation map. Alternatively, the customized navigation map may be updated to include flow rates or other indicators of capacity for travel thereon.

At box 380, an optimal route from the location of the autonomous vehicle to the location of the task to be performed is selected based on the updated customized navigation map. Depending on the attributes and/or capacities of the autonomous vehicle, the optimal route may call for travel on any type or form of infrastructure or features. For example, the optimal route may lie entirely on roads, on sidewalks or on crosswalks, or may pass entirely through parks or fields. Alternatively, the optimal route may include one or more paths on roads, one or more paths on a sidewalk, one or more paths on a crosswalk, one or more paths extending through a park and/or one or more paths extending through a field. Additionally, the optimal route may be determined based on any factor or element, including but not limited to times required to travel on any of the respective paths of the optimal route, costs associated with traveling on the respective paths, or any other intrinsic or extrinsic factors.

In some embodiments, the route may be selected according to one or more traditional shortest path or shortest route algorithms such as Dijkstra's Algorithm, Bellman-Ford Algorithm, Floyd-Warshall Algorithm, Johnson's Algorithm or a hub labeling technique. Furthermore, the optimal route may extend directly from the location of the autonomous vehicle to the location of the task to be performed, e.g., where the autonomous vehicle is in possession of an item to be delivered to a destination, or, alternatively, through one or more intervening waypoints, e.g., where the autonomous vehicle must travel to a location where an item is located, before delivering the item to the location at which the task is to be performed.

At box 385, one or more instructions for causing the autonomous vehicle to travel along the optimal route in executing the task are transmitted to the autonomous vehicle, e.g., over a network, and the process ends. For example, where the task requires a delivery of one or more items from an origin (e.g., a fulfillment center or other facility) to a destination (e.g., a location specified by a customer), the items may be loaded into storage compartments or other areas of the autonomous vehicle and secured therein, and the autonomous vehicle may then travel from the origin to the destination in response to the one or more instructions. The instructions may identify specific courses and/or speeds at which the autonomous vehicle is to travel on individual paths of the optimal route, or along the optimal route as a whole, and may include information or data regarding specific portions of the updated customized navigation map corresponding to the optimal route, or portions that are adjacent to the optimal route. In some embodiments, the instructions may be provided to the autonomous vehicle in series, such that the autonomous vehicle may report having arrived at a point or having completed travel along a specific path in accordance with a first instruction, and a second instruction for causing the autonomous vehicle to travel to another point or along another path may be transmitted to the autonomous vehicle. Alternatively, in other embodiments, a single instruction to travel along the optimal route may be provided to the autonomous vehicle.

Figure 4:
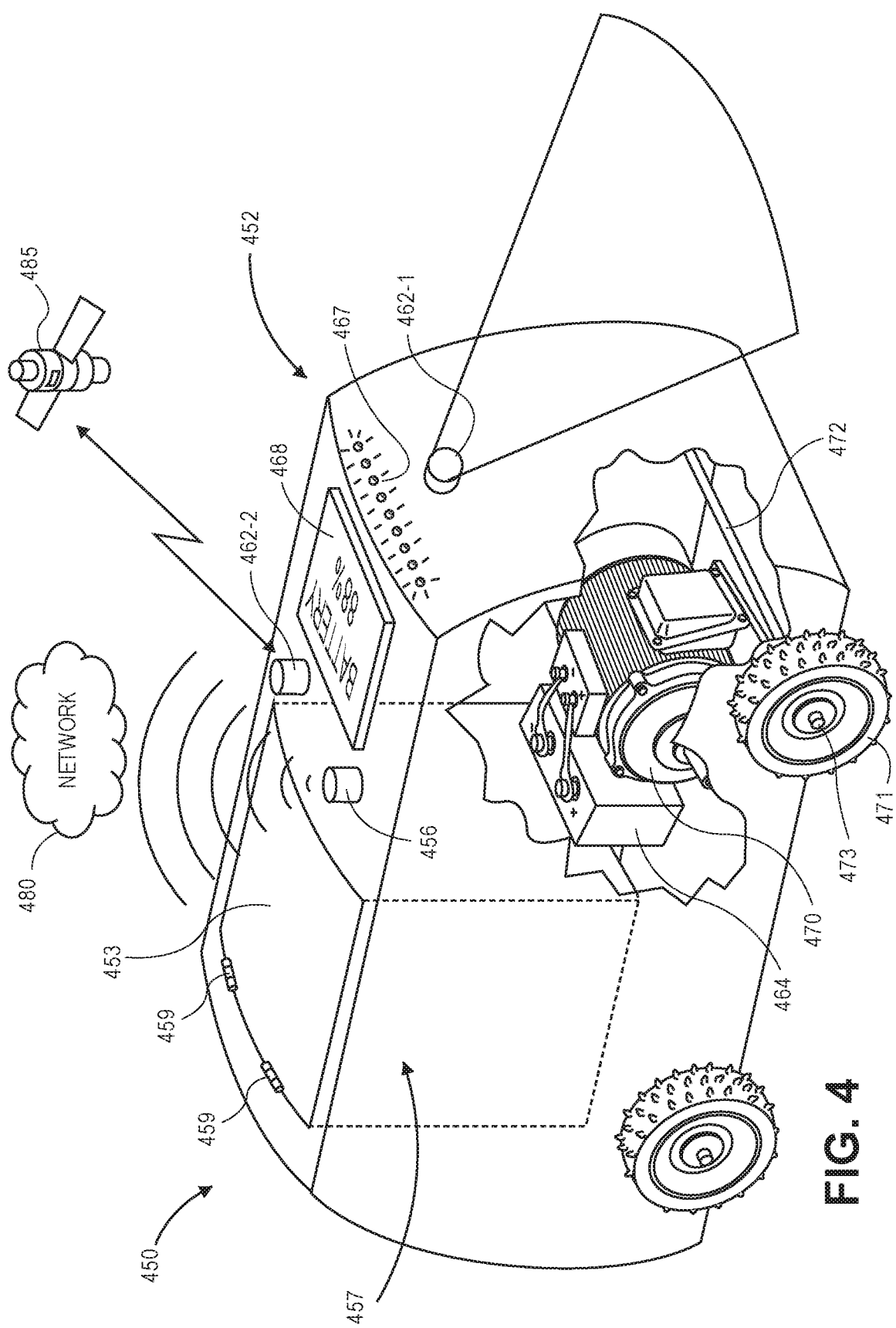
FIG. 4 is a view of one autonomous vehicle configured to utilize one or more customized navigation maps and routes in accordance with embodiments of the present disclosure.

One example of an autonomous vehicle that may be configured to perform one or more tasks based on customized navigation maps and routes is shown in FIG. 4. Referring to FIG. 4, a view of one autonomous vehicle 450 that may be programmed with customized navigation maps and routes in accordance with embodiments of the present disclosure is shown. Except where otherwise noted, reference numerals preceded by the number "4" in FIG. 4 refer to elements that are similar to elements having reference numerals preceded by the number "2" in FIG. 2A or FIG. 2B or by the number "1" shown in FIGS. 1A through 1M.

As is shown in FIG. 4, the autonomous vehicle 450 includes a frame 452, a storage compartment 457, a pair of axles 471 and a plurality of wheels 471 joined to the axles 472. A front surface of the frame 452 includes an imaging device 462-1 having a field of view aligned in a forward direction or orientation with respect to the autonomous vehicle 450 and an array of lights 467. In some embodiments, the autonomous vehicle 450 may include any number of imaging devices 462-1, with fields of view that may be permanently or adjustably aligned in any direction or orientation with respect to the autonomous vehicle 450. In some embodiments, the autonomous vehicle 450 may include any number of lights, on any surface thereof, and one or more of the lights may include light emitting diodes (LEDs) or other light sources.

An upper surface of the frame 452 includes a door 453 that provides access to the storage compartment 457 and is rotatably connected by a pair of hinges 459. The door 453 may include any number of manual or automatic features for causing the opening or closing thereof, and may include any suitable dimensions with respect to the dimensions of the storage compartment 457. In some embodiments, the autonomous vehicle 450 may include doors 453 on any surface thereof, and any number of storage compartments 457 of any size or shape. The doors 453 may operate (e.g., rotate) in any direction with respect to one or more surfaces of the autonomous vehicle 450.

The upper surface of the frame 452 further includes a transceiver 456, as well as a GPS receiver 462-2, which may receive geolocation data from or transmit geolocation data to a GPS network 485. In some embodiments, the transceiver 456 may include a Wi-Fi transmitter and/or receiver for communicating with a network 480, which may include the Internet in whole or in part, as well as any other transmitters and/or receivers for communicating in any other manner or fashion, or according to any other protocols. In some embodiments, the transceiver 456 may be configured to transmit and/or receive one or more codes or other information or data in one or more radio frequency (or "RF") waves or signals, at any frequencies or power levels. In some embodiments, the transceiver 456 may be configured to transmit and/or receive radio frequency identification (or "RFID") signals, near-field communication (or "NFC") signals, Bluetooth® signals, or any other type of wireless signals. Additionally, the upper surface of the frame 452 further includes a user interface 468 which may receive manual interactions from a human user, or display information to the human user, as appropriate. For example, the user interface 468 may be a touchscreen display. In some embodiments, the GPS receiver 462-2, the transceiver 456 and/or the user interface 468 may be provided on any other surface of the frame 452.

As is shown in FIG. 4, the autonomous vehicle 450 may include a power module 464 (e.g., a battery), a motor 470 (e.g., a DC electric motor operating at twelve to forty-eight volts) and a steering component 473 (e.g., one or more racks or pinions for automatically changing a direction of travel of the autonomous vehicle 450 and/or an orientation of one or more of the axles 472 or the wheels 471. The motor 470 may be configured to operate at any speed or have any power rating, and to cause the autonomous vehicle 450 to travel in a forward direction of travel, a reverse direction of travel or in any other direction of travel as determined by the steering component 473. Additionally, the axles 472 and wheels 471 of the autonomous vehicle 450 may also have any dimension. For example, the wheels 471 may have bores or axle pads for accommodating axles 472 of any diameter or thickness, and any number of spokes or other extensions for supporting a rim having any desired spacings or offsets for accommodating tires or other coverings. Each of the axles 472 may be joined to and configured to rotate any number of wheels 471, which may include tires or other coverings of any suitable material, including but not limited to rubbers and/or plastics. The wheels 471 or tires thereon may feature any number of belts, walls, treads or other components, and may be pneumatic or solid, or take any other form.

According to some embodiments, autonomous vehicles of the present disclosure, such as the autonomous vehicle 450 of FIG. 4, may be configured for travel throughout an area or environment, such as travel on traditional transportation systems and non-traditional transportation systems provided within the area or environment. The autonomous vehicle 450 may be programmed with a path or route selected from a customized navigation map generated for the autonomous vehicle 450 specifically, e.g., based on dimensions and/or operating characteristics of the autonomous vehicle 450, as well as any prevailing operational or environmental conditions within the area or environment generally, or within a vicinity of the autonomous vehicle 450 specifically. The customized navigation map may be generated based on baseline mapping data, e.g., geospatial data regarding physical features in an area or environment including but not limited to topographical data regarding the composition and surface features within the area or environment, as well as elevations of points within the area or environment, which may be identified or determined from satellite or ground-based imagery, GIS data, or any other information or data obtained from any other source, along with attributes of the transportation infrastructure and other physical features within the area or environment, as well as attributes of prior travel through the area or environment. Similarly, where an area or environment includes transportation systems such as roads, sidewalks, crosswalks, bicycle or walking trails or bridges, and also non-traditional transportation systems, e.g., parks, fields, forests, lots, clearings or other spaces, the autonomous vehicle 450 may be configured for travel thereon along one or more paths or routes selected or determined from the customized navigation map.

In some embodiments of the present disclosure, where an order is received for a delivery of one or more items to a destination, a customized navigation map may be utilized to select an autonomous vehicle, and a route to be traveled by the autonomous vehicle, to complete the delivery. Additionally, one or more access points for delivering the one or more items may also be selected based on the customized navigation map or any other information or data available to the autonomous vehicle. Referring to FIGS. 5A through 5I, views of aspects of one system for utilizing customized navigation maps and routes in accordance with embodiments of the present disclosure are shown. Except where otherwise noted, reference numerals preceded by the number "5" in FIGS. 5A through 5I refer to elements that are similar to elements having reference numerals preceded by the number "4" in FIG. 4, by the number "2" in FIG. 2A or FIG. 2B or by the number "1" shown in FIGS. 1A through 1M.

Figure 5A:
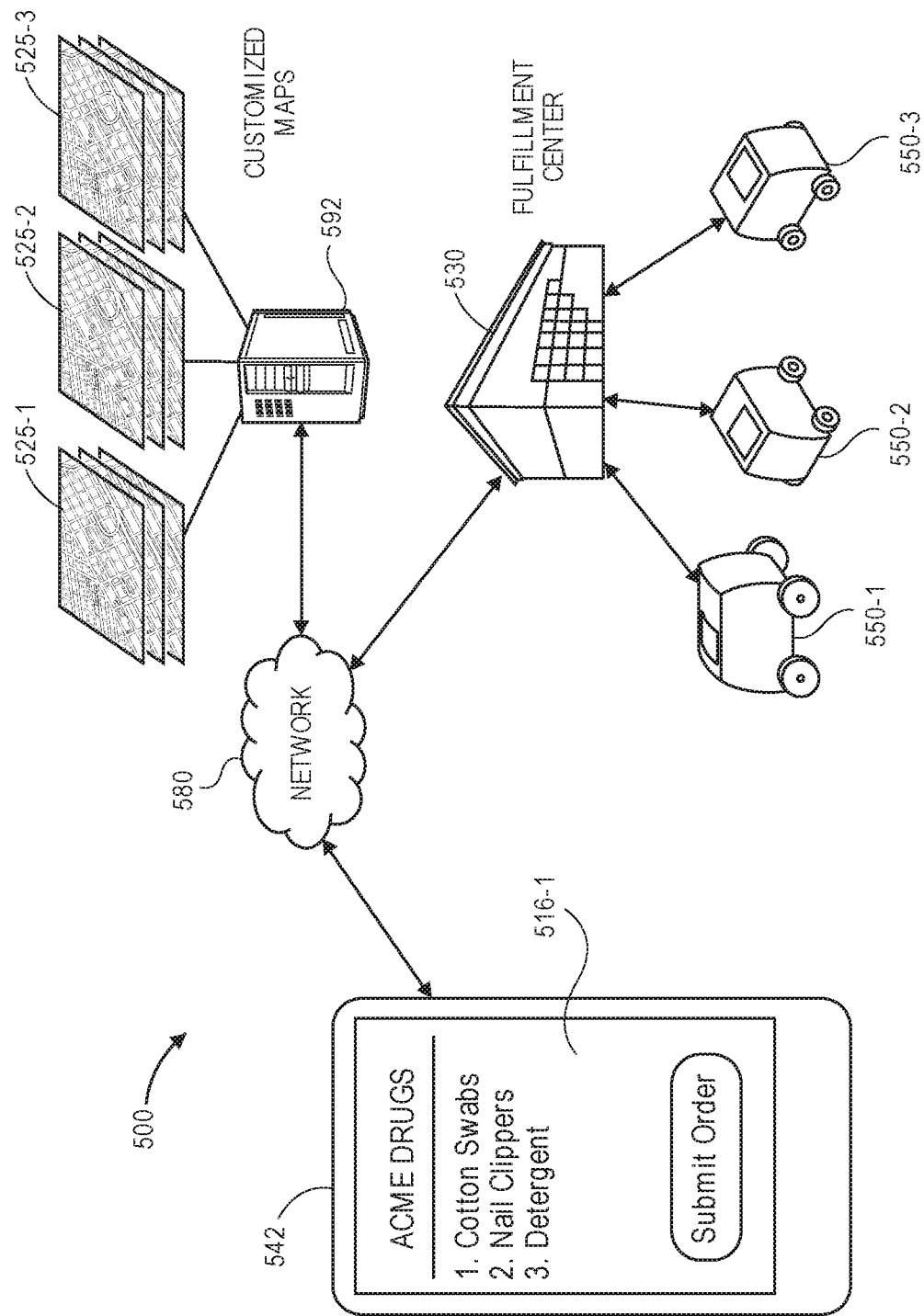
Figure 5B:
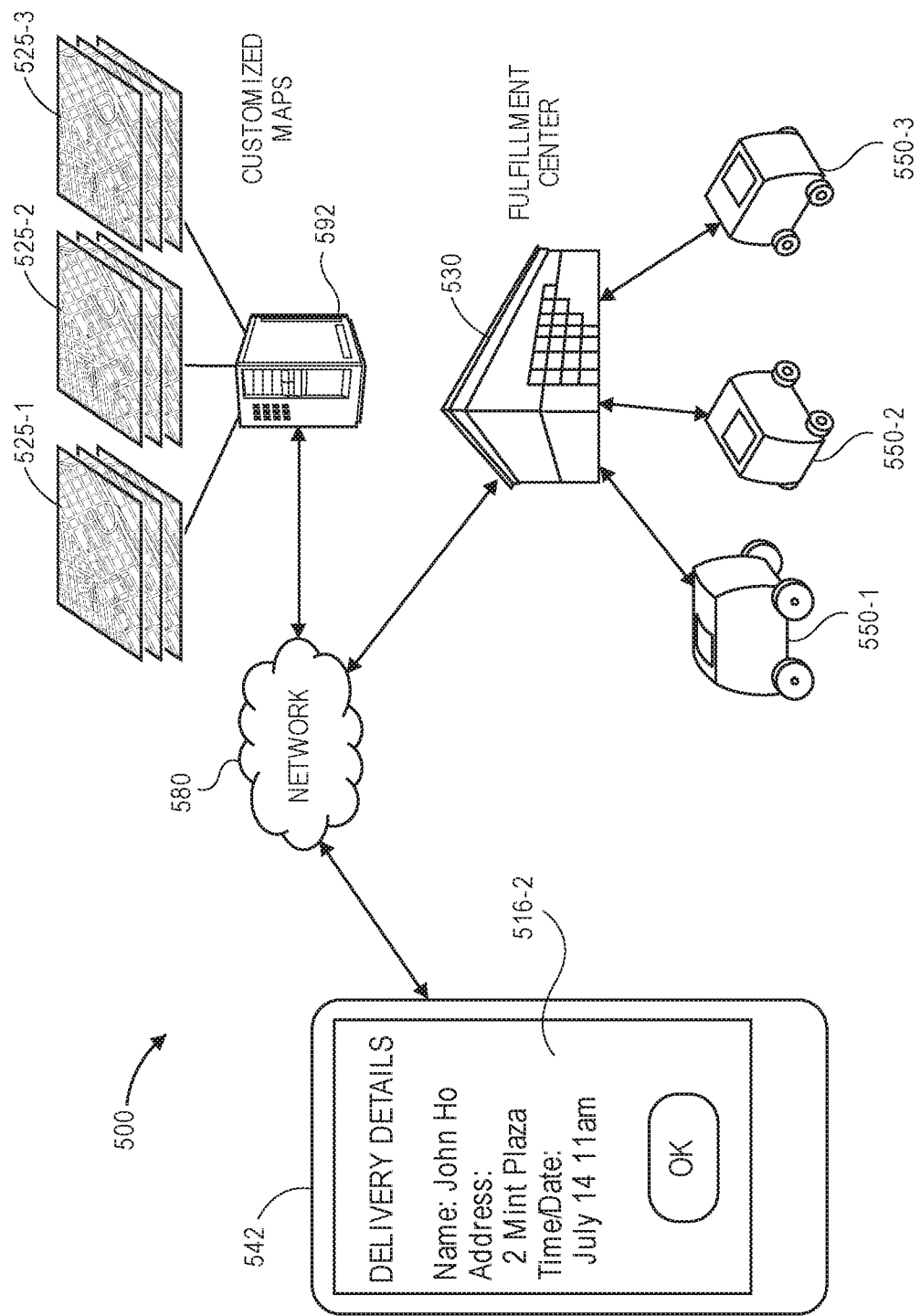

As is shown in FIGS. 5A and 5B, a system 500 includes a fulfillment center 530 and a fleet management system server 592 in communication with one another over a network 580. The server (e.g., a remote server) 592 may be provided in association with an online marketplace (not shown) and/or the fulfillment center 530, such as in the same physical location, or in one or more alternate or virtual locations, e.g., in a "cloud"-based environment. A plurality of autonomous vehicles 550-1, 550-2, 550-3 are associated with the fulfillment center 530 and configured to perform one or more tasks, e.g., a delivery of an item from the fulfillment center 530 to another location, a delivery of an item from another location to the fulfillment center 530, or any other tasks which need not be associated with a delivery of one or more items. Additionally, the server 592 is programmed with customized navigation maps 525-1, 525-2, 525-3 of all or portions of an area or environment. The maps 525-1, 525-2, 525-3 may be generated for each of the autonomous vehicles 550-1, 550-2, 550-3, e.g., based on a baseline map, as well as one or more layers of information or data regarding indoor and/or outdoor infrastructure or features within the area or environment, attributes of the autonomous vehicles 550-1, 550-2, 550-3, or any other relevant information or data.

The autonomous vehicles 550-1, 550-2, 550-3 may be configured to travel along traditional transportation infrastructure or features, such as roads, sidewalks, crosswalks, bicycle or walking trails or bridges, and also non-traditional transportation infrastructure or features, e.g., parks, fields, forests, lots, clearings or other spaces. For example, in some embodiments, the autonomous vehicles 550-1, 550-2, 550-3 may be deployed in an urban environment to complete last-mile delivery of any given item (e.g., a bag of groceries) to an end-recipient. The autonomous vehicles 550-1, 550-2, 550-3 may be outfitted or equipped with various components for performing one or more of the tasks disclosed herein, including but not limited to a chassis; a drive system (e.g., two driven center wheels, and one or two 360°-swivel castors at each end); a compartment such as a cargo hold that is configured to hold one or more discrete payloads (e.g., multiple individually-packaged items, such as multiple grocery bags containing multiple grocery items, or boxes containing one or more items) in a heated, cooled, or unconditioned volume; a set of sensors configured to collect information about an environment in which the autonomous vehicles 550-1, 550-2, 550-3 are operating; and one or more controllers that are configured to transform sensor streams outputted by the sensors into a crossing confidence score, and to navigate the autonomous vehicles 550-1, 550-2, 550-3 over a pedestrian walkway or bike lane based on crossing confidence scores calculated over time.

In some embodiments, the autonomous vehicles 550-1, 550-2, 550-3 may include one or more omnidirectional or 360° LIDAR sensors or other range sensors arranged on the top of the autonomous vehicles 550-1, 550-2, 550-3 or in other locations or positions, such as at either end of the autonomous vehicles 550-1, 550-2, 550-3. For example, each of such sensors may generate one or more three-dimensional distance maps, e.g., in the form of a 3D point cloud representing distances at nominal ranges (e.g., between one meter and fifty meters) from the LIDAR sensor and an external surface within the field of view of the LIDAR sensor by rotating the LIDAR sensor (i.e., once per scan cycle).

In some embodiments, the autonomous vehicles 550-1, 550-2, 550-3 may also include one or more color cameras facing outwardly from one or more sides (e.g., front, rear, and left lateral or right lateral sides) of the autonomous vehicles 550-1, 550-2, 550-3. For example, one or more of such cameras may output a video feed (or stream) containing a sequence of digital photographic images (or "frames"), such as at a rate of twenty Hertz (20 Hz). In some embodiments, the autonomous vehicles 550-1, 550-2, 550-3 may also include a set of infrared proximity sensors arranged along a perimeter. Such infrared proximity sensors may be configured to output signals corresponding to proximities of objects (e.g., pedestrians) within predetermined ranges of the autonomous vehicles 550-1, 550-2, 550-3. One or more controllers within the autonomous vehicles 550-1, 550-2, 550-3 may fuse data streams from any of such sensors, e.g., LIDAR sensor(s), color camera(s), and/or proximity sensor(s), into a single real-time 3D color map of surfaces of objects (e.g., roads, sidewalks, road vehicles, pedestrians, or the like) around the autonomous vehicles 550-1, 550-2, 550-3 per scan cycle, and process the 3D color map into a crossing confidence score or other navigational decision during operations.

As is shown in FIGS. 5A and 5B, a customer operating a mobile device 542 (or another computer device) may access a page 516-1 associated with an online marketplace or other system configured to distribute items at the fulfillment center 530 in response to one or more orders. As is shown in FIG. 5A, the customer may place an order for one or more items through an ordering interface rendered in the page 516-1, e.g., by a web browser or native application executing on the mobile device 542, and may provide a delivery address for the one or more items. For example, the server 592 and/or the fulfillment center 530 may receive information regarding delivery of an item to the customer, or a destination specified by the customer, such as a delivery of a locally-sourced good to a patron, a lunch order fulfilled by a local restaurant, groceries supplied by a local grocer, toiletries supplied by a local convenience store, beer supplied by a local liquor store, or medication supplied by a local pharmacy. In some embodiments, the server 592 can access delivery information for last-mile delivery of an item, such as including pickup of an item from a regional or global shipping facility for final delivery to a recipient nearby. As is also shown in FIG. 5B, the customer may also confirm details regarding the delivery via a page 516-2.

Figure 5C:
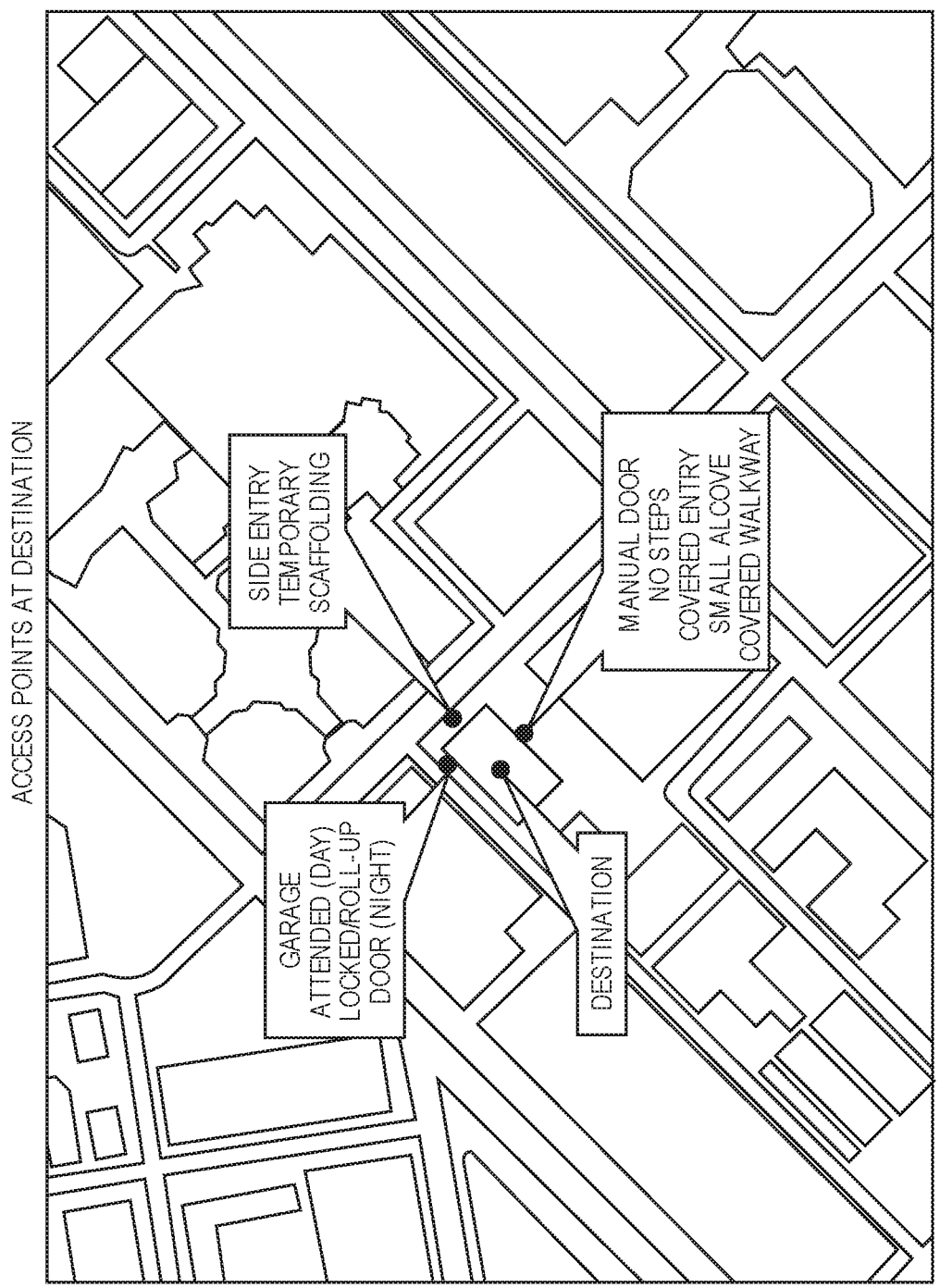

As is shown in FIG. 5C, upon receiving the order, the server 592 may identify or select one or more access points or other target delivery locations associated with the delivery address or the customer, and propose or confirm such locations with the customer. In some embodiments, a target delivery location may be located outside of a building or structure at the delivery address, e.g., at a door or other access point, where a delivery may be attended or unattended. In some embodiments, however, the target delivery location may be located within a building or structure at the delivery address, and accessed by entering the building or structure via one or more of the access points.

For example, where the server 592 determines that a delivery address entered by the customer is a single-family residence having a single known access point, including a walkway extending from a sidewalk to a stoop with multiple steps terminating at a front door, the server 592 can calculate a target delivery location that places an autonomous vehicle on private property at the delivery address, on or adjacent the walkway, e.g., adjacent the stoop, and with a compartment in the autonomous vehicle loaded with the customer's items facing the front door, thereby enabling the customer to visually detect and quickly access the autonomous vehicle upon exiting the front door, without subjecting the autonomous vehicle to one or more public use requirements, and enhancing the security of the autonomous vehicle by ensuring that the autonomous vehicle is out of the public domain.

As another example, where the server 592 determines that a delivery address entered by the customer is associated with a corporate office, a multi-tenant residential building, or a dormitory having multiple known access points (e.g., a main entry at street level, a side exit at a parking lot, and a rear exit at an alley), the server 592 may calculate one possible delivery location for each of the known access points. For example, the server 592 may calculate a first delivery location tucked against the building adjacent the main entry with a compartment of an autonomous vehicle containing the ordered items facing outwardly from the building; a second delivery location in front of and offset by a selected distance (e.g., two meters) from a side exit; and a third delivery location in a street parking space in the alley and facing the rear exit.

For example, as is shown in FIG. 5C, the server 592 may query one or more data stores for a set of known access points for a building at a delivery address selected by a customer. In some embodiments, the server 592 may access information regarding a plurality of known access points for each of a plurality of delivery addresses within an area or environment, and query one or more databases for locations, types, and other parameters of each of the access points associated with a selected delivery address. For example, a customized navigation map or other record in the data store may associate a first building address with a single known public access point, such as an access point set back from a sidewalk and connected to the sidewalk via a private walkway. The customized navigation map or other record may also associate a single-family home or duplex with a single access point set back from the sidewalk and connected to the sidewalk by a driveway but no walkway, or a small commercial building with a single access point immediately adjacent a sidewalk. The customized navigation map may also associate multiple discrete access points with other building addresses, such as for large commercial buildings, hotels, and large multi-tenant resident buildings (e.g., a condominium or apartment complex). The customized navigation map may further indicate a type of a building at a delivery address, such as whether a building is a residential single-tenant building, a small residential multi-tenant building (e.g., duplex, triplex, or quadplex only), a large residential multi-tenant building (e.g., more than four apartments), a commercial building (e.g., an office building, hotel, or event space), or a public open space (e.g., a park).

One or more data stores may also include data associating various characteristics of the access points within a customized navigation map, and such characteristics may be presented to a customer or otherwise utilized in selecting a delivery location for a given address, or for any other purpose. For example, a customized navigation map may indicate a type of each access point at a building address, such as whether the access point is a manual door, an automatic sliding door, or a gate, such as separating public property or easements (e.g., a sidewalk) from private property. A customized navigation map may also indicate whether each access point is manually operable, automatically opened upon selection of a button (e.g., a handicap switch), or automatically opened upon approach. Furthermore, a customized navigation map may further indicate whether a door or gate at an access point is at ground level, offset above or below ground level by one or more steps, accessible by a ramp (or whether the ramp is wide enough to accommodate an autonomous vehicle based on attributes of the autonomous vehicle, such as a locational tolerance or turning radius), or the like. A customized navigation map may also indicate a location and a width of a walkway leading from a sidewalk or walkway to an access point at a building address. A customized navigation map may further indicate whether an access point is covered, such as by an awning or extended roof, as well as locations of other covered areas nearby, e.g., awnings, a breezeway, a carport, a parking garage, or the like. Any other building-related data or access point-related data for various buildings or delivery addresses within a geographic area or environment may be stored in association with a customized navigation map in accordance with the present disclosure.

Figure 5D:
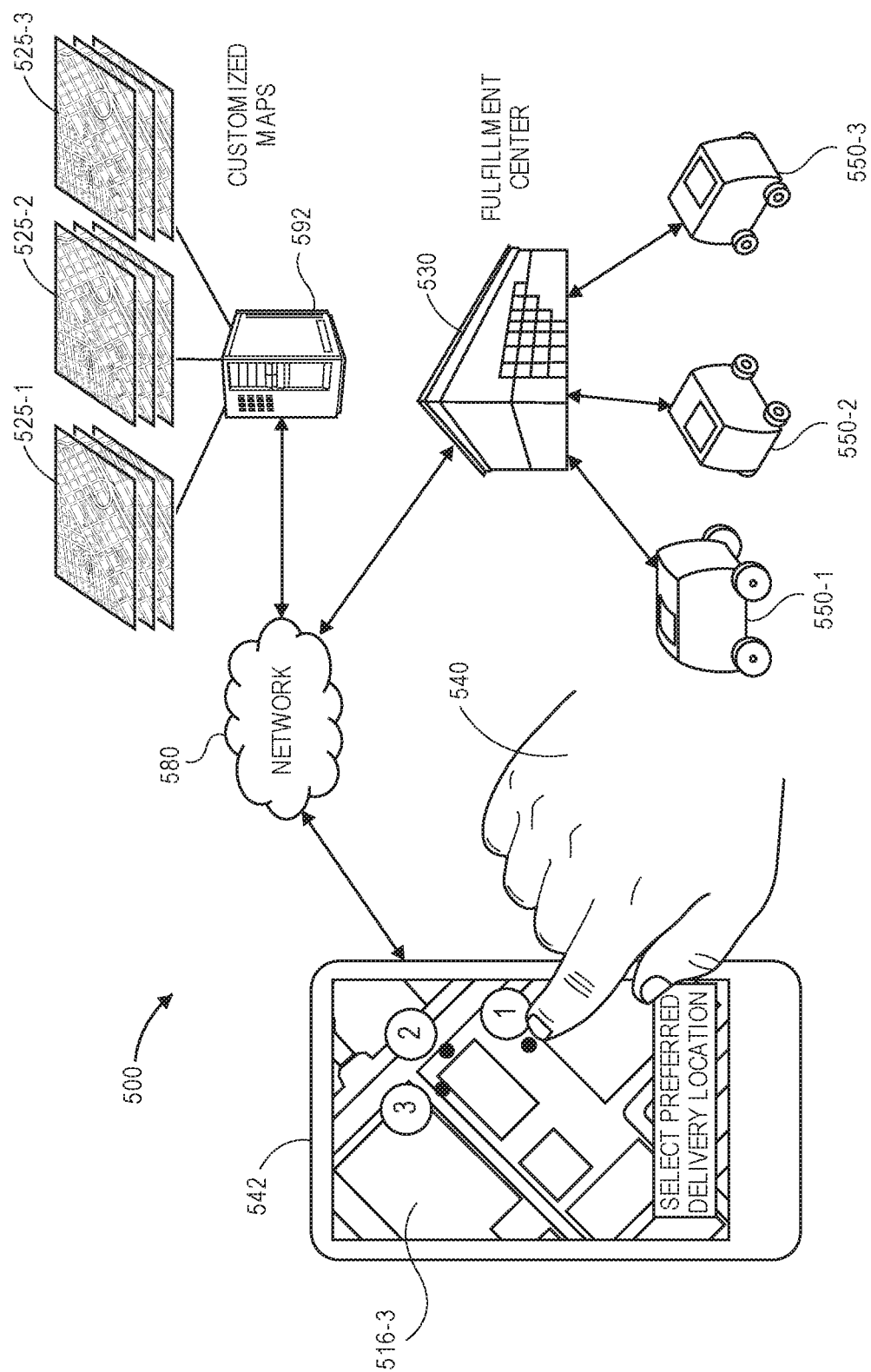

After identifying one or more delivery locations for a given delivery address or facility, a delivery location may be selected on any basis. For example, in some embodiments, the server 592 may automatically select one of the delivery locations. Alternatively, as is shown in FIG. 5D, the server 592 may visually communicate one or more of the delivery locations to a customer 540, e.g., within a page 516-3 rendered on the mobile device 542. The page 516-3 may include a geographic map containing a representation of a perimeter of a building at the delivery address that may be served to the customer 540 through a plug-in or web application within the electronic ordering interface on the page 516-3. The customer 540 may be prompted to confirm one of these possible delivery locations via the page 516-3, e.g., by selecting an icon or a portion of the geographic map on the mobile device 542. One of the autonomous vehicles 550-1, 550-2, 550-3 may be dispatched to the selected delivery location after the one of the autonomous vehicles 550-1, 550-2, 550-3 has been loaded with the items ordered by the customer 540. In some embodiments, where multiple access points for the delivery address are indicated by the navigation map within the page 516-3, the server 592 can interface with the customer 540 through the mobile device 542 to select one access point, define a target delivery location near this access point, and confirm this target delivery location with the customer 540 at any time, such as minutes, hours, days, or even weeks before scheduled or estimated delivery of the item.

In some embodiments, the mobile device 542 may host or maintain a web plug-in that loads within a web-based ordering interface, e.g., the pages 516-1, 516-2, 516-3, within a web browser and interfaces with the customer 540 to select an access point or target delivery location at which to collect an item from an autonomous vehicle once the customer 540 has placed an order for an item with the ordering interface. Once the customer 540 has selected an item, completed an order for the item, and entered a delivery address, the web-based ordering interface can open the web plug-in through which the customer 540 may set a target delivery location, or collect identifying information (e.g., a name, username, password, electronic mail address, phone number, date of birth, etc.) from the customer 540, which the autonomous vehicle may be programmed to interpret in order to identify the customer 540 (or a designated recipient) prior to releasing the item. Alternatively, the mobile device 542 may host an application plug-in that loads within a native application executing on the mobile device 542 to collect relevant order information and to select a target delivery location for an item ordered by the customer, or to receive a delivery location for the item selected by the customer, through the native application. As yet another alternative, the mobile device 542 may host internal logistic systems and a web portal or native application through which customers may place orders for items, e.g., from local retailers, for local delivery with autonomous vehicles. Alternatively, in some embodiments, the server 592 may interface with an external (i.e., third-party) logistics system to schedule a pick-up of a container or other package containing an item ordered by or otherwise scheduled for delivery to the customer 540.

In some embodiments, the server 592 may execute one or more instructions to calculate a target delivery location for the item near an assigned or designated delivery address, and to serve a prompt to a customer or the recipient of the item (e.g., to the recipient's mobile device or electronic mail address) to confirm this target delivery location. A target delivery location may be selected or determined at any time, such as upon receiving an order, after one of the autonomous vehicles 550-1, 550-2, 550-3 has been selected to deliver the item, after the item has been collected by the one of the one of the autonomous vehicles 550-1, 550-2, 550-3, or at any time before the one of the autonomous vehicles 550-1, 550-2, 550-3 has reached the target delivery location. For example, the server 592 may identify a customer or a recipient by a phone number, a user name, or an electronic mail address provided by the customer 540 when placing the order, and serve an in-application notification to the mobile device 542 within an instance of a native delivery application executing on the recipient's mobile device and linked to the recipient's phone number or electronic mail address. Once the customer or recipient has accessed the native application on his or her mobile device 542, the server 592 may interface with the customer 540 through the native application to select a delivery location. In another example, the server 592 can serve one or more electronic messages, e.g., an SMS text message, containing an image or map of the building at the delivery address with a visual representation of a target delivery location calculated for the delivery address, or a link to a webpage at which a target delivery location may be confirmed or modified when placing an order. In some other embodiments, the server 592 may asynchronously engage the customer 540 or a designated recipient of the item, in order to assist with a selection of a target delivery location for the item, or to receive a confirmation of a target delivery location for the item.

For example, where a building has a single tenant (e.g., a home, an office or the like) and a single georeferenced access point, the server 592 may calculate a target delivery location proximate the access point based on a type of the building, a type of the access point, or one or more known traveling surfaces (e.g., paved or sufficiently flat surfaces) between a road and the access point, and store the target delivery location in association with the building in the customized navigation map. A target delivery location at or near each known access point returned by the customized navigation map may be determined and stored in association with the delivery address.

Where a building has a single tenant and a walkway or other passageway extending to a single georeferenced access point, e.g., a front door connected to a sidewalk or street via a private walkway, the server 592 may calculate a target delivery location on the private walkway between the street and front door, e.g., adjacent the front door or adjacent steps leading up to the front door. When an autonomous vehicle navigates to the target delivery location and stops on the private walkway, the autonomous vehicle may be programmed to temporarily obstruct the walkway, thereby implying an immediate need for the customer or a designated recipient crossing the walkway to collect the item from the autonomous vehicle. Additionally, by setting the target delivery location on private property rather than on public property, the server 592 may also reduce a risk or likelihood of tampering or theft from the autonomous vehicle while the autonomous vehicle awaits the customer or other recipient at the target delivery location, e.g., by maintaining high visibility of the autonomous vehicle from the front door, and enhancing the experience of the customer, since the autonomous vehicle is located near the front door.

Where a building has multiple tenants and a single public access point, a customized navigation map may indicate a single georeferenced access point and related data for a front door of the building connected to a sidewalk or street via a private walkway. The server 592 may select a target delivery location on a paved surface (e.g., the walkway) as close to the front door of the building as possible while achieving at least a minimum clearance (e.g., 36") along one side of the autonomous vehicle, in order to permit other tenants or visitors of the building to walk past or around the autonomous vehicle while the autonomous vehicle awaits a removal of the item by the user.

Where a building has a setback with a walkway connected to a driveway, e.g., a single-tenant or small multi-tenant building that is set back from a street, a customized navigation map may indicate a single georeferenced access point and related data for a front door of the building, which may be connected to a driveway via a private walkway. The server 592 may select a target delivery location on the walkway, if the customized navigation map indicates that the walkway is large enough to accommodate an autonomous vehicle with a minimum clearance on one side, or otherwise select a target delivery location on the driveway adjacent the walkway.

Where a building has a setback with a driveway but does not include a walkway, e.g., a single-tenant or small multi-tenant building that is set back from a street, a customized navigation map may return a single georeferenced access point and related data for a front door that is set back from a street and connected directly to a driveway. The server 592 may select a target delivery location that is adjacent to a garage door, beside the garage door (e.g., between the garage door and the front door), or between two garage doors if the customized navigation map indicates that at least two garage doors are present.

Where a building does not include a setback, e.g., a single-tenant or small multi-tenant building that is adjacent to a street or has a landing or stoop that abuts a street or sidewalk directly, a customized navigation map may return a single georeferenced access point and related data for a front door at a landing or stoop that abuts a street or sidewalk directly. The server 592 may select a target delivery location immediately in front of or immediately to one side of the front door or landing. Alternatively, the server 592 may scan the customized navigation map for a sidewalk region near the single access point that is characterized by a depth that exceeds a known width of an autonomous vehicle by more than a minimum required clearance (e.g., approximately one meter, or three feet). If such a region is identified from the customized navigation map, and is within a nominal distance (e.g., five meters) of the front door or landing, or within the bounds of a facade of the building, the server 592 can select a target delivery location within the region that is tucked against the facade of the building, such that a compartment of the autonomous vehicle containing an item faces outwardly from the building.

In some embodiments, the server 592 may scan one or more customized navigation maps generated for autonomous vehicles in order to determine a level of availability of street parking within a vicinity of an access point in front of a building, or for a curb cut within a vicinity of the street parking. Upon arriving at a delivery address, the autonomous vehicle may navigate to an open position along a length of street nearest a front door of the building, e.g., between two cars parked within this length of the street.

Alternatively, where a customized navigation map includes a single access point for a given building at a delivery address, the server 592 may select a target delivery location at any other position in front of, adjacent to or otherwise near this access point, based on access point data stored in association with the customized navigation map. For example, an autonomous vehicle may navigate to an access point while also permitting a recipient of an item contained in the autonomous vehicle to relatively easily detect the autonomous vehicle by sight, and to physically access the autonomous vehicle.

Figure 5E:
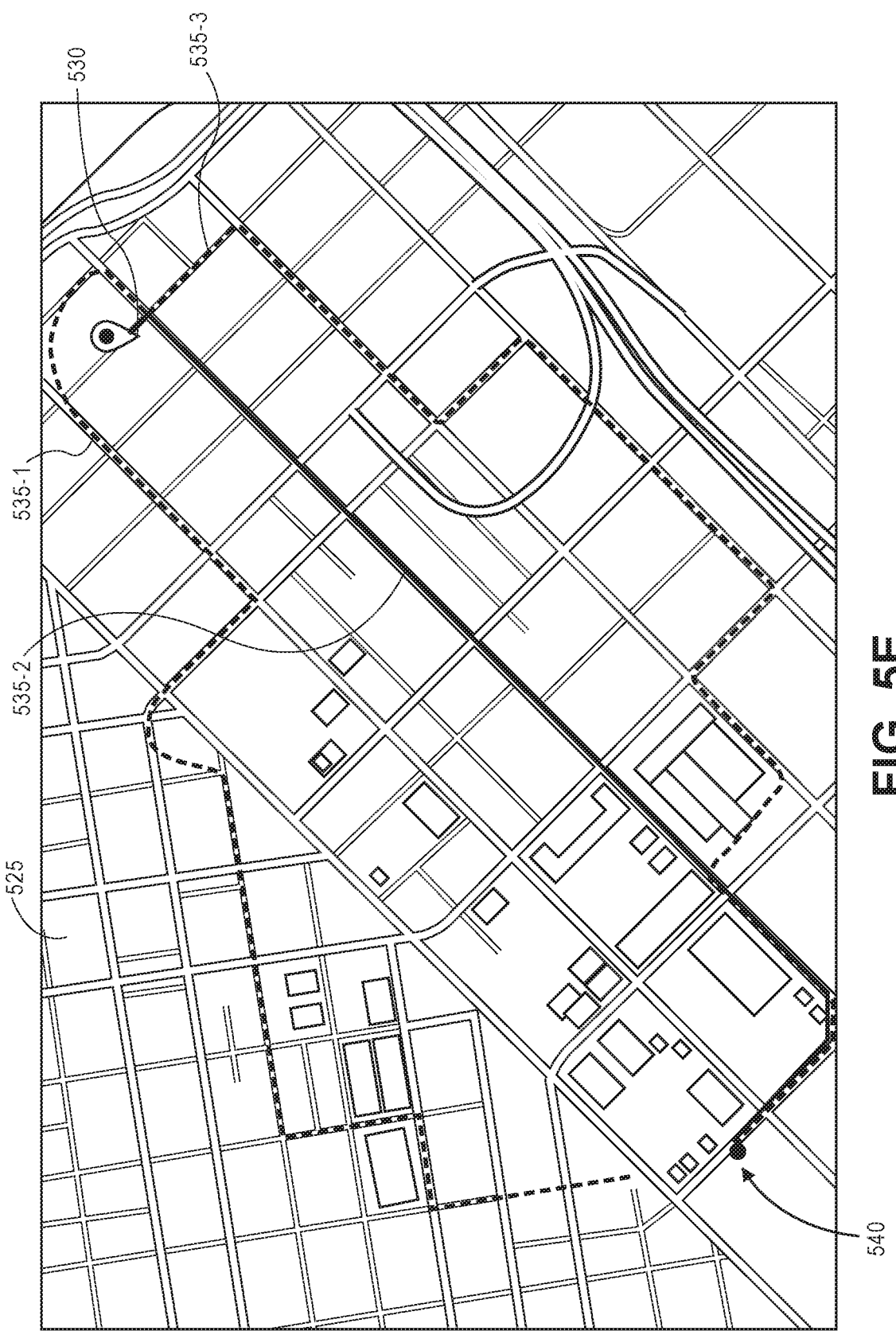

As is shown in FIG. 5E, where customized navigation maps 525-1, 525-2, 525-3 are up-to-date, optimal routes 535-1, 535-2, 535-5 between the fulfillment center 530 and the customer 540 may be calculated for each of the autonomous vehicles 550-1, 550-2, 550-3, e.g., according to one or more traditional shortest path or shortest route algorithms such as Dijkstra's Algorithm, Bellman-Ford Algorithm, Floyd-Warshall Algorithm, Johnson's Algorithm or a hub labeling technique. One of the autonomous vehicles 550-1, 550-2, 550-3 may be selected to deliver the items based on the optimal routes 535-1, 535-2, 535-3.

The server 592 may continuously receive information or data regarding the area or environment (e.g., the infrastructure or features therein) from any source, and may update the customized navigation maps 525-1, 525-2, 525-3 generated for the autonomous vehicles 550-1, 550-2, 550-3. In some embodiments, information or data may be received from operating autonomous vehicles 550-4, 550-5, 550-6, 550-7, 550-8 within the area or environment, regarding their past, present or future operations, e.g., their respective speeds, courses, positions (e.g., latitudes and longitudes), elevations or angles of orientation (e.g., yaws, pitches or rolls), as well as operational or environmental conditions such as surface conditions, traffic conditions, congestion or any other relevant factors encountered by the autonomous vehicles to the server 592 or other networked computer systems.

Figure 5F:
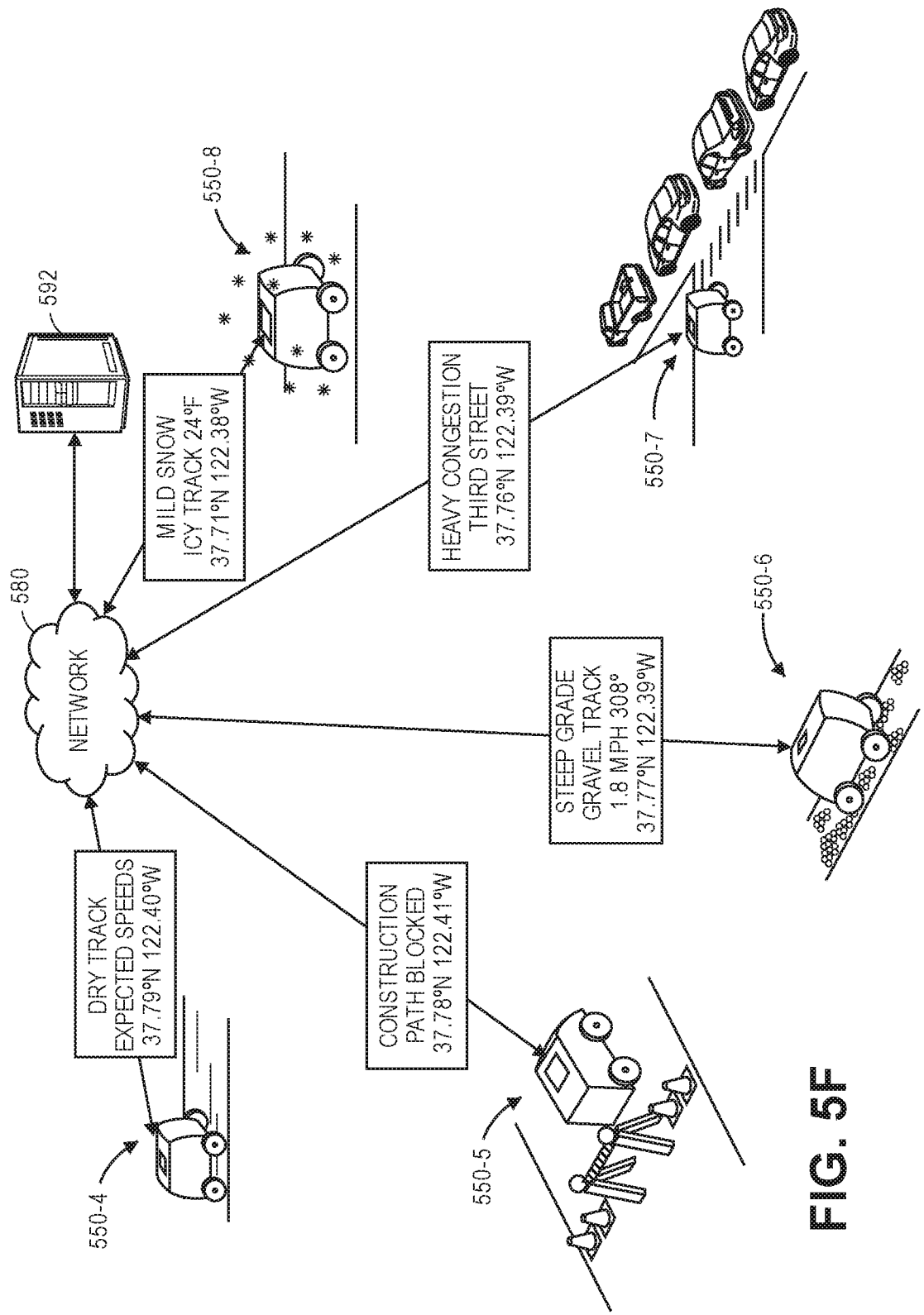

As is shown in FIG. 5F, each of the plurality of autonomous vehicles 550-4, 550-5, 550-6, 550-7, 550-8 is engaged in independent and discrete operations, and is reporting information regarding its respective operations to the server 592 over the network 580. For example, the autonomous vehicle 550-4 reports information or data regarding a surface upon which the autonomous vehicle 550-4 is traveling (e.g., that the track is dry), as well as its speeds (e.g., that its speeds met expectations or predictions), along with coordinates of its position. The autonomous vehicle 550-5 reports that it has encountered an obstruction (e.g., that its path is blocked), and identified a possible cause of the obstruction, along with coordinates of its position. Similarly, the autonomous vehicle 550-6 reports that it is traveling up a slope having a specific surface (e.g., gravel), along with a speed, a course, and coordinates of its position. The autonomous vehicle 550-7 also reports that it has encountered heavy traffic and identifies its position using words (e.g., a name of a street) and coordinates. The autonomous vehicle 550-8 also reports information or data regarding a surface upon which the autonomous vehicle 550-8 is traveling (e.g., that the track is icy), along with weather conditions (e.g., mild snow, and twenty-four degree Fahrenheit, or 24° F., air temperatures) and coordinates of its position.

Information or data of any type or form that is captured by sensors operating onboard autonomous vehicles during operations, including but not limited to the autonomous vehicles 550-4, 550-5, 550-6, 550-7, 550-8 shown in FIG. 5F, may be utilized along with information or data obtained from any number of other sources to update the customized navigation maps 525-1, 525-2, 525-3 generated for the autonomous vehicles 550-1, 550-2, 550-3, e.g., by updating one or more paths of the customized navigation maps 525-1, 525-2, 525-3 to add or remove one or more paths, or to adjust a capacity of such paths. The customized navigation maps 525-1, 525-2, 525-3 may be generated and maintained over time through the manual or automated labeling of imaging data (e.g., visual imaging data or depth imaging data) captured by imaging devices provided aboard one or more autonomous vehicles or one or more other third-party imaging systems over time. For example, pivoting doors, sliding doors, steps, ramps, walkways, driveways, awnings, or other features may be annotated onto visual imaging data and/or depth imaging data captured by one or more of a fleet of autonomous vehicles over time, and the server 592 can construct and update the customized navigation maps 535-1, 535-2, 535-3 based on this imaging data over time. Alternatively, or additionally, the server 592 may implement one or more computer vision or machine learning techniques to automatically detect and label such features and reconstruct the customized navigation maps 535-1, 535-2, 535-3 accordingly over time. For example, in some embodiments, where the customer 540 selects a delivery address, the server 592 may prompt the customer, e.g., through a web plug-in, an in-app plug-in, or a native application, to supply additional feedback regarding characteristics of one or more access points in buildings at the delivery address, such as whether an access point is currently undergoing construction, whether an access point has a non-functional door or an automated door mechanism, whether an access point is covered, whether an access point includes steps up or down to a walkway, or the like. The server 592 can then update and refine access point data for the delivery address in one or more of the customized navigation maps according to the feedback supplied by the customer 540.

Figure 5G:
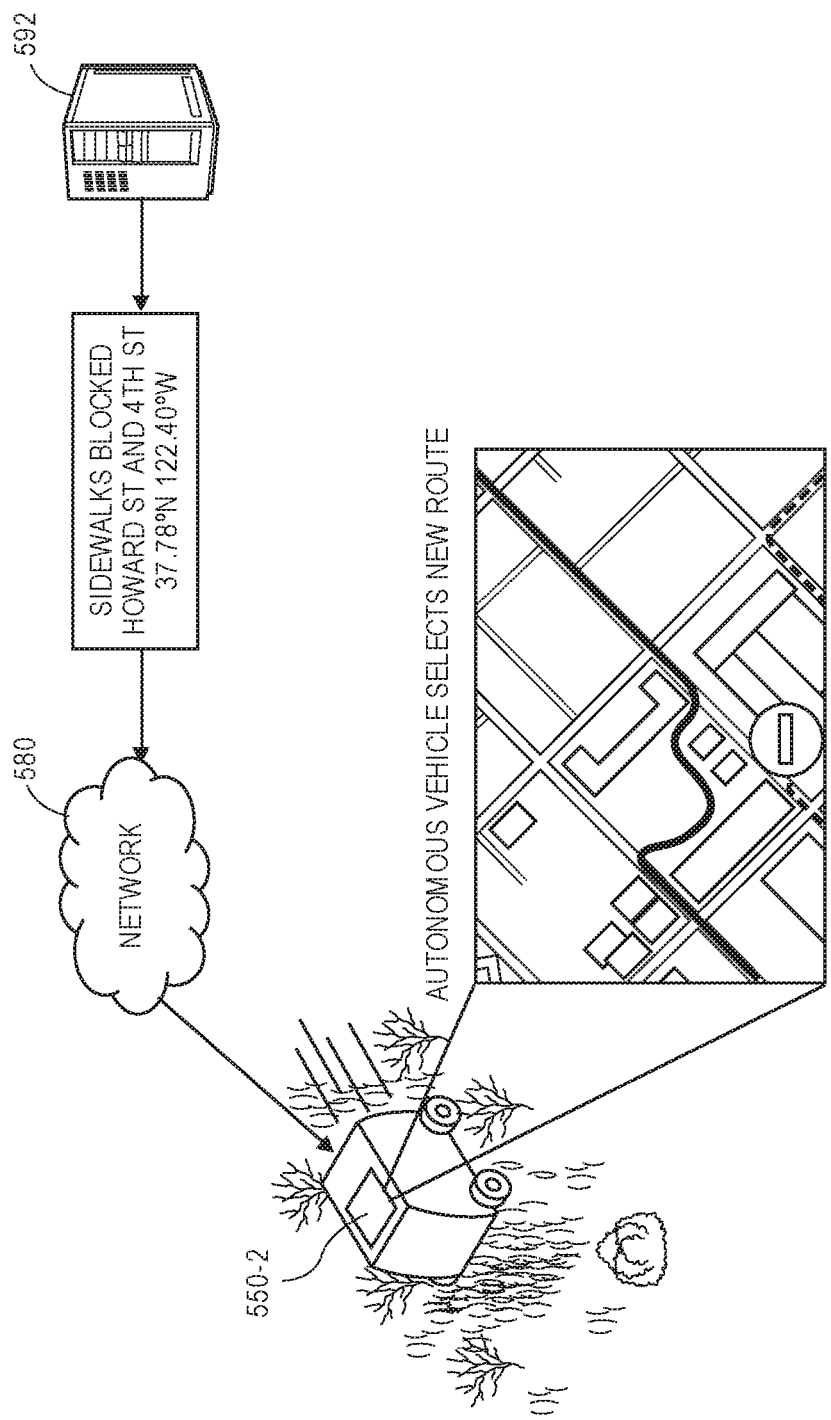
Figure 5I:
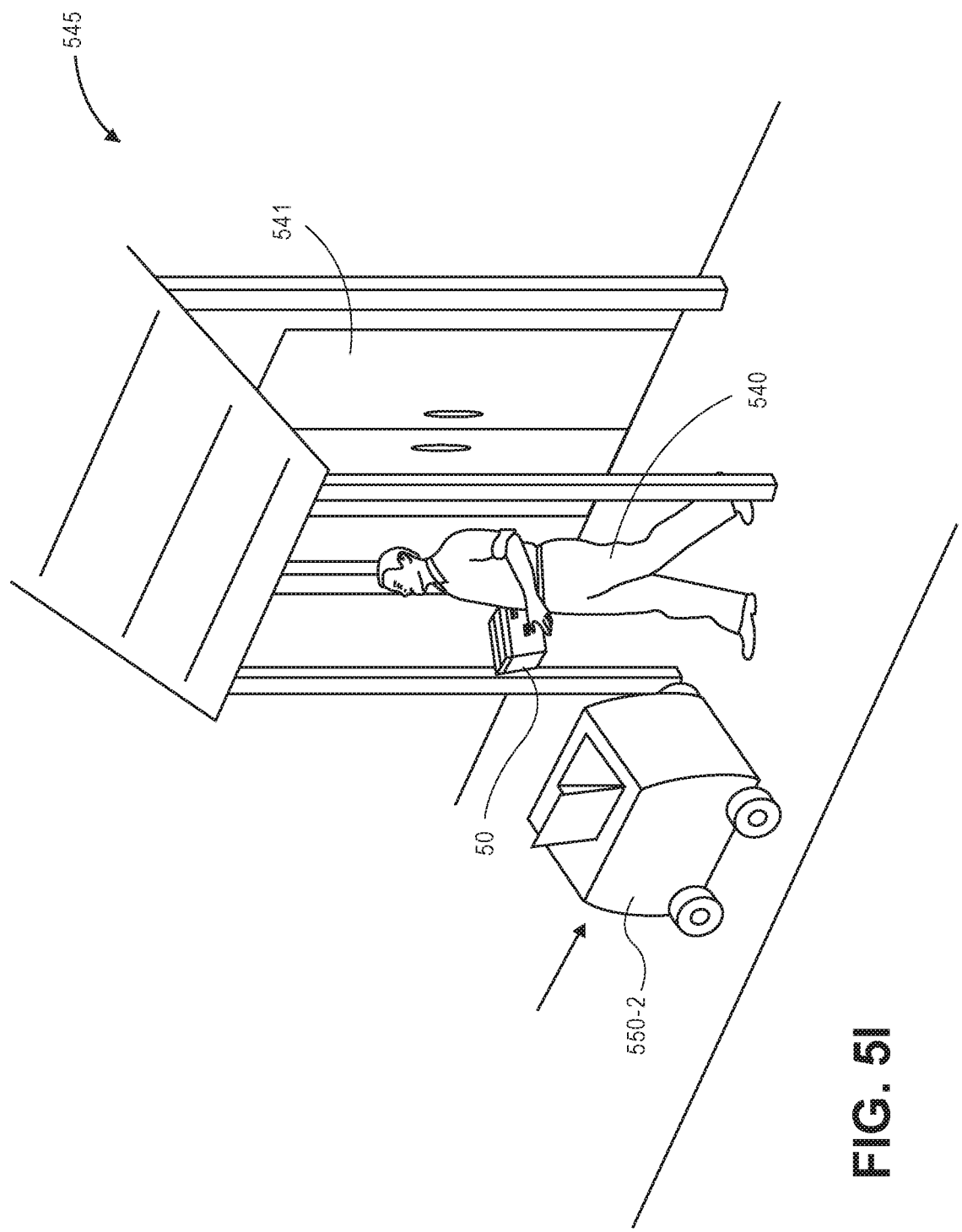

As is shown in FIG. 5G, after the autonomous vehicle 550-2 has been selected to deliver the item to the customer 540, the autonomous vehicle 550-2 may travel along the optimal route 535-2 to deliver the item. Where one or more factors affecting the optimal route 535-2 are determined to have occurred, e.g., based at least in part on information or data received from one or more autonomous vehicles, or from any other source, such information or data may be provided to the autonomous vehicle 550-2, e.g., over the network 580. The autonomous vehicle 550-2 may be programmed or otherwise configured to interpret the information or data, and determine whether the optimal route 535-2 may remain unchanged, or whether one or more modifications to the optimal route 535-2 are required. As is shown in FIG. 5G, where the autonomous vehicle 550-2 receives information from the server 592 regarding congestion along the optimal route 535-2, e.g., a blockage of one or more sidewalks or other paths of the optimal route, the autonomous vehicle 550-2 may select a new route on any other accessible traveling surfaces, and may provide information or data regarding the new route to the server 592 and/or to the customer 540 over the network 580.

As is shown in FIG. 5H, the autonomous vehicle 550-2 may report its progress to the customer 540 or to the server 592 via one or more electronic messages transmitted over the network 580, e.g., on a continuous or regular basis. Such electronic messages may report a position of the autonomous vehicle 550-2, as well as any feedback regarding its speeds, courses, positions (e.g., latitudes and longitudes), elevations or angles of orientation (e.g., yaws, pitches or rolls), as well as operational or environmental conditions such as surface conditions, traffic conditions, congestion or any other relevant factors encountered by the autonomous vehicle 550-2 while en route. Such information or data may be used to inform the customer 540 and/or the server 592 as to an estimated time of arrival, to update the customized navigation map 535-2 generated for the autonomous vehicle 550-2, or to update the customized navigation maps generated for one or more other autonomous vehicles (not shown). For example, as is shown in FIG. 5H, some or all of the information or data received from the autonomous vehicle 550-2 while en route may be transmitted to the mobile device 542, which may display a page 516-4 including a portion of the optimal route 535-2 and a position of the autonomous vehicle 550-2, along with an estimated time of arrival at an access point or other selected delivery location.

As is shown in FIG. SI, when the autonomous vehicle 550-2 arrives at an access point 541 (e.g., a door) associated with the delivery address, the customer 540 may retrieve the item 50 from a storage compartment or other feature of the autonomous vehicle 550-2. Alternatively, the autonomous vehicle 550-2 may be configured to complete an unattended delivery of the item 50, e.g., by automatically removing or ejecting the item 50 therefrom, such as by a robotic arm or conveyor. The autonomous vehicle 550-2 may then report that the item 50 has been delivered to the customer 540, and may be released to perform any other tasking.

In some embodiments, where multiple autonomous vehicles are scheduled to be present at a delivery address concurrently, e.g., in order to deliver items to the same recipient or different recipients, the server 592 may select different delivery locations or other delivery parameters for these autonomous vehicles in order to enable the one or more recipients to distinguish between the vehicles. For example, where two autonomous vehicles are scheduled to deliver an item to a common access point (e.g., a door), one of the autonomous vehicles may be assigned a delivery location on a left side of the access point, and instructed to illuminate a green light (or a light of any other color) upon arriving at the access point, while another of the autonomous vehicles may be assigned a delivery location on a right side of the access point and instructed to illuminate a red light (or a light of any other color) upon arriving at the access point. The recipient or recipients may be instructed as to whether their delivery or deliveries are being made by the autonomous vehicle with the green light, or the autonomous vehicle illuminated with the red light, e.g., by one or more electronic messages to a computer device, such as the mobile device 542. In some other embodiments, where two or more autonomous vehicles are programmed to make deliveries to a common access point, one of the autonomous vehicles may approach the common access point at a first time, and other autonomous vehicles may be instructed to navigate to a holding location until a second time, when the access point is free and clear to complete a delivery. The types or ways in which autonomous vehicles may be managed or instructed to complete an attended or unattended delivery of one or more items or to perform any other tasks in accordance with the present disclosure are not limited.

In some embodiments, a location for the performance of a task by an autonomous vehicle may be selected based on a desired orientation of the autonomous vehicle when performing the task. For example, where the task requires an autonomous vehicle to be adjacent to a wall or other structure when delivering an item to a customer, an orientation of the autonomous vehicle that causes a storage compartment of the autonomous vehicle to face outwardly and away from the wall or other structure, thereby enabling the customer to retrieve the item from the storage compartment, may be selected. Conversely, where an autonomous vehicle is to deliver an item at an access point, e.g., a door, an orientation of the autonomous vehicle that causes a storage compartment of the autonomous vehicle to face toward the access point may be selected. One or more instructions for causing the autonomous vehicle to be aligned in the selected orientation at the access point may be provided.

Figure 6A:
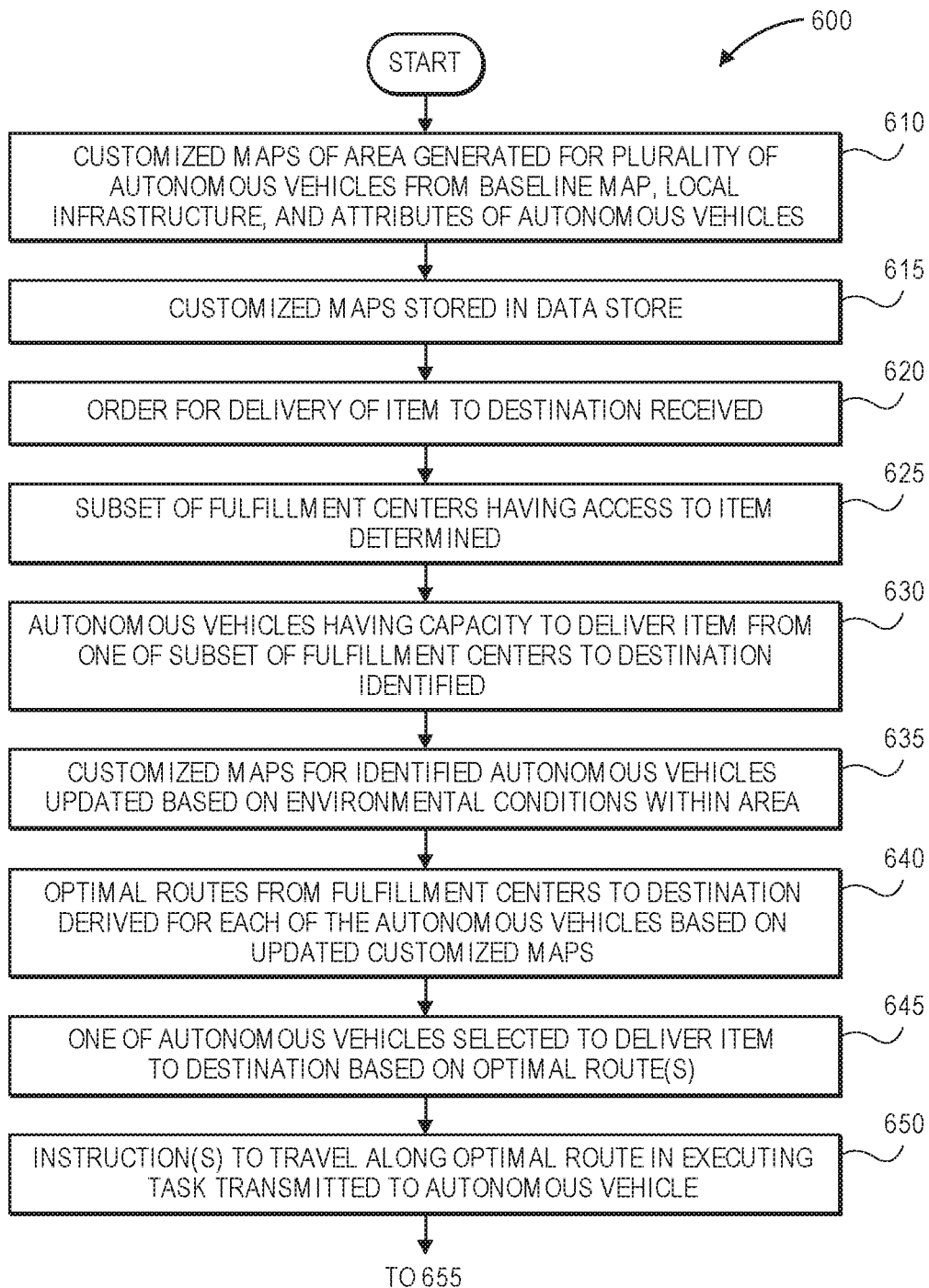
FIGS. 6A and 6B are a flow chart of one process for utilizing customized navigation maps and routes in accordance with embodiments of the present disclosure.
Figure 6B:
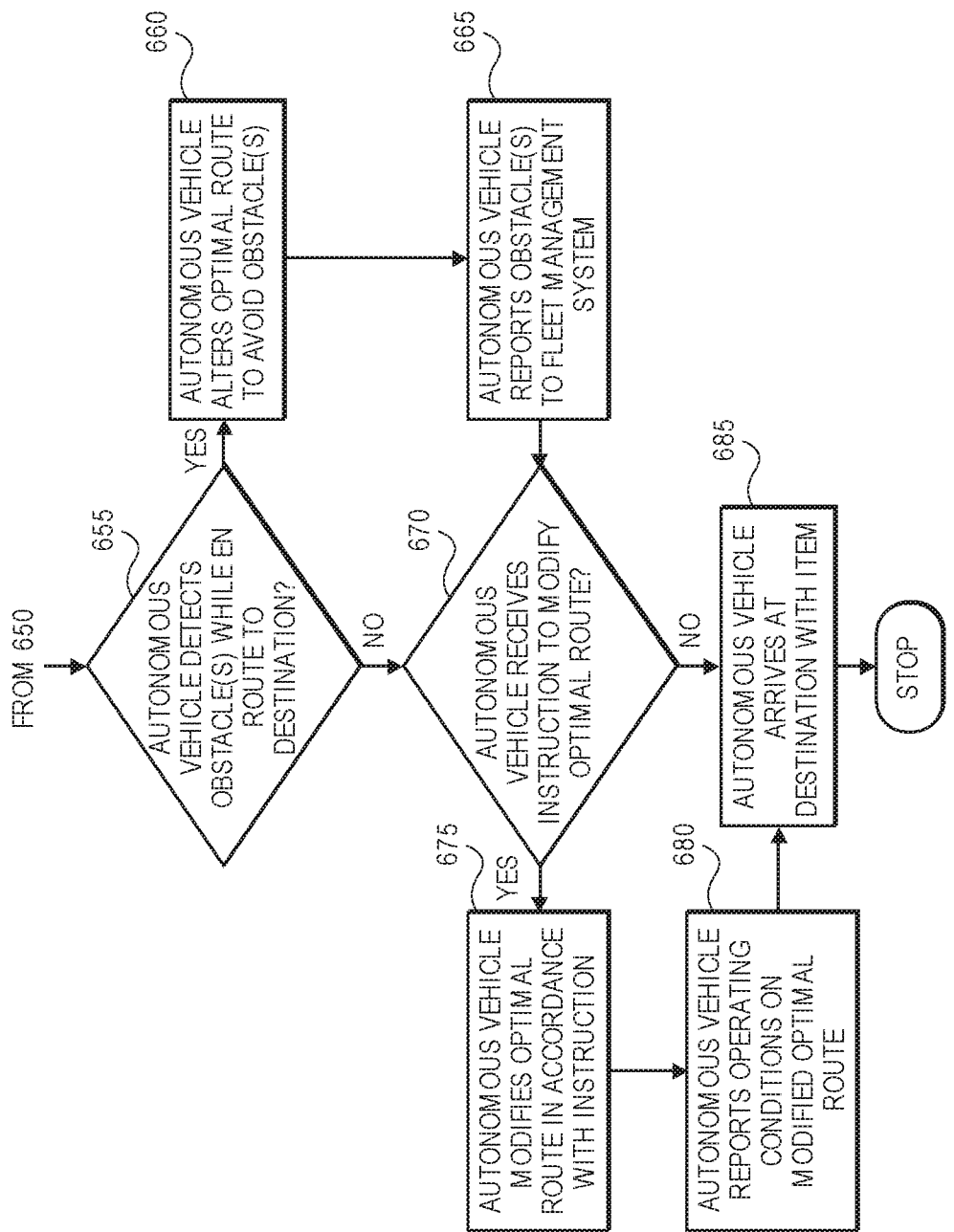

Furthermore, a location at which a task (e.g., a delivery of an item) is to be performed may be selected for an item based on prevailing operational or environmental conditions, which may include weather, traffic or other factors affecting the performance of the task within the environment. For example, where precipitation is ongoing or forecast at a time of a delivery, a target delivery location may be selected in order to shield the autonomous vehicle from precipitation, thereby improving a level of comfort for a customer or other recipient retrieving a package from the autonomous vehicle, and ensuring that items within a storage compartment of the autonomous vehicle remain dry while a door of the storage compartment vehicle is open.

Where customized navigation maps of an area or environment are generated for a plurality of autonomous vehicles, one of the autonomous vehicles that is best suited to perform a given task at a location within the area or environment may be selected based on optimal paths or routes determined from each of the customized navigation maps, even where the autonomous vehicles are at different locations when the task is requested or instructed. Referring to FIGS. 6A and 6B, a flow chart 600 of one process for utilizing customized navigation maps and routes in accordance with embodiments of the present disclosure is shown. At box 610, customized navigation maps are generated for a plurality of autonomous vehicles based on a baseline map, information or data regarding local infrastructure, and one or more attributes of the autonomous vehicles. For example, as is discussed above, the baseline map may have been previously determined or generated for the autonomous vehicles within the area or environment and stored in one or more data stores, and may include geolocations or geospatially-referenced points that precisely define locations in space with one or more geocodes, e.g., latitudes, longitudes and elevations. The baseline map may have been obtained by processing imaging data captured from the area or environment to recognize topographical data regarding the composition and surface features within the area or environment, or by scanning or otherwise interpreting maps or other representations of the area, e.g., in an atlas or other set of maps. The information or data regarding the local infrastructure may relate to or describe traditional transportation infrastructure or features such as roads, sidewalks, crosswalks, bicycle or walking trails or bridges, and also non-traditional transportation infrastructure or features, e.g., parks, fields, forests, lots, clearings or other spaces. In some embodiments, the transportation infrastructure or features may be identified in same manner or from information or data obtained from the same sources as the baseline map.

Alternatively, or additionally, the transportation infrastructure or features, or all or portions of the baseline map, may be identified based on information or data captured by one or more autonomous vehicles during prior operations within the area or environment. The attributes of the autonomous vehicles may include dimensions or capacities of such vehicles (e.g., heights, lengths, widths, power levels, speeds, ranges or carrying volumes or weight limits), or any other relevant attributes. The customized navigation maps may be generated to identify local infrastructure that may accommodate each of the respective autonomous vehicles, and to exclude local infrastructure that is unable to accommodate the respective autonomous vehicles. At box 615, the customized navigation maps may be stored in one or more data stores, which may be provided in a physical location associated with the autonomous vehicle such as a garage or a maintenance facility, or in one or more alternate or virtual locations, e.g., in a "cloud"-based environment.

At box 620, an order for a delivery of an item to a destination is received. The order may be received by an online marketplace (not shown) from a customer in the area or environment over a network, e.g., by accessing a network site or dedicated shopping application associated with the marketplace, or by communicating with the marketplace in any way, such as by telephone or in person at a bricks-and-mortar facility, to review and evaluate one or more items for purchase and to place the order for the item. The order may identify the item by name or one or more identifiers (e.g., alphanumeric codes), and include a destination to which the desk chair is to be delivered. Alternatively, the order may be received from a customer outside of the area or environment, but may specify a destination for delivery within the area or environment.

At box 625, a subset of the fulfillment centers having access to the item to be delivered is determined. The subset may be as many as all of the fulfillment centers within the area or environment, or within range of the area of environment, or as few as one of the fulfillment centers, which may be identified by resort to a look-up table or other data file or record. At box 630, autonomous vehicles having the capacity to deliver the item from the fulfillment centers of the subset to the destination are identified. Such autonomous vehicles may be located at the respective fulfillment centers, or at other locations, and the capacity of such autonomous vehicles may be determined based on the respective carrying capacities, operating ranges, speeds, or other requirements of the delivery, as well as any requirements or restrictions on the autonomous vehicles (e.g., maintenance, prior obligations, or the like). At box 635, the customized navigation maps for the autonomous vehicles identified at box 630 are updated based on operational or environmental conditions within the area. Such conditions may be determined based on information or data obtained from any extrinsic sensors such as rain sensors, anemometers, traffic cameras or other traffic sensors or imaging devices, based on historical or predicted conditions, based on information or data captured during the operations of one or more autonomous vehicles, or the like. To the extent that the operational or environmental conditions impact the operations or availability of one or more of the autonomous vehicles, either by indicating that one or more infrastructure or features may be utilized by such autonomous vehicles, by foreclosing one or more infrastructure or features from use by such autonomous vehicles, or by affecting the traffic flow rates on such infrastructure or features, the customized navigation maps for such autonomous vehicles may be updated accordingly, e.g., to add or remove infrastructure or features thereto or remove infrastructure or features therefrom, or to modify anticipated traffic flow rates on such infrastructure or features accordingly.

At box 640, optimal routes from the fulfillment centers to the destination are derived for each of the autonomous vehicles based on the customized navigation maps as updated at box 635, e.g., by a fleet management system. The optimal routes may be selected based on the updated customized navigation maps in any manner, and may include paths or segments on any type or form of infrastructure or features within the area or environment. The optimal routes may be determined based on any factor or element, including but not limited to times required to travel on any of the respective paths of the optimal route, costs associated with traveling on the respective paths, or any other intrinsic or extrinsic factors, and may be selected according to one or more traditional shortest path or shortest route algorithms such as Dijkstra's Algorithm, Bellman-Ford Algorithm, Floyd-Warshall Algorithm, Johnson's Algorithm or a hub labeling technique. In some embodiments, such as where the autonomous vehicle is in possession of an item to be delivered to a destination, an optimal route may extend directly from the location of the autonomous vehicle to the location of the task to be performed. Alternatively, in some other embodiments, such as where the autonomous vehicle must travel to another location to obtain the item prior to delivery, an optimal route may extend through one or more intervening waypoints.

At box 645, one of the autonomous vehicles is selected to deliver the item to the destination based on the optimal routes, e.g., based on a shortest time to deliver the item to the destination, a lowest cost to deliver the item to the destination, or any other factor or factors. At box 650, one or more instructions for causing the autonomous vehicle selected at box 645 to travel along the optimal route to deliver the item are transmitted to the autonomous vehicle. The instructions may specify the optimal route with any level of detail, e.g., by identifying the waypoints with geocodes or other identifiers, and specifying any courses or speeds to be traveled between the waypoints, or along the optimal route as a whole. Additionally, the instructions may be provided to the selected autonomous vehicle individually, e.g., upon an arrival of the autonomous vehicle at one of the waypoints, or in one or more batch processes, and the instructions may include all or portions of the customized navigation map for the autonomous vehicle.

At box 655, the autonomous vehicle determines whether it has detected one or more obstacles while en route to the destination. For example, in some embodiments, the autonomous vehicle may detect one or more obstacles by capturing and processing imaging data to recognize one or more objects depicted therein, and may determine whether any of such objects is an obstacle blocking at least a portion of the route, or otherwise inhibits or impedes passage along the optimal route. In some other embodiments, the autonomous vehicle may detect the one or more obstacles by contact, e.g., by traveling over water or other ground hazards, or coming into contact with one or more objects such as walls, barriers, or the like. Any natural or artificial object may act as an obstacle to the autonomous vehicle, including but not limited to vehicles, structures, humans or other animals, plant life, water or any type or form of object that at least temporarily renders the optimal route impassable.

If the autonomous vehicle detects one or more obstacles, the process advances to box 660, where the autonomous vehicle alters the optimal route in order to avoid the obstacle, e.g., by executing one or more turns or other course changes, speed changes or the like, and to box 665, where the autonomous vehicle reports the obstacles to a fleet management system. The autonomous vehicle may execute the one or more turns or course changes, or speed changes, based on the information or data from which the obstacles were identified, or based on any other information or data, e.g., a secondary or backup optimal route. For example, in some embodiments, the autonomous vehicle may detect an access point to another building or structure, which is likely to have one or more inflows or outflows of foot or vehicle traffic therefrom, and may elect to avoid the access point, such as is shown in FIG. 1I or 1J, by turning or otherwise changing course toward an area that would likely be unaffected by any such inflows or outflows. The autonomous vehicle may also detect one or more physical obstructions, such as persons, vehicles, machines or any other objects, and may also turn or change course to avoid such objects. Upon detecting the obstacles, or while or after altering the optimal route, the autonomous vehicle may transmit one or more electronic messages including information or data regarding the obstacles, such as geotagged imaging data or any other data regarding the obstacles, e.g., text-based or digital descriptions of such obstacles and their respective locations.

After the autonomous vehicle reports the one or more obstacles to the fleet management system, or if the autonomous vehicle does not detect any obstacles, then the process advances to box 670, where whether the autonomous vehicle has received one or more instructions to modify the optimal route, e.g., from the fleet management system, is determined. For example, the autonomous vehicle may receive one or more electronic messages indicating that the optimal route is blocked or that travel along the optimal route is otherwise impeded, e.g., that the optimal route is no longer optimal. In this regard, the autonomous vehicle may receive one or more instructions or other information for causing the autonomous vehicle to travel on a different course (e.g., on a different path of the customized navigation map) or at a different speed, from the fleet management system. If the autonomous vehicle receives a modification to the optimal route, then the process advances to box 675, where the autonomous vehicle modifies the optimal route in accordance with the one or more instructions, e.g., by executing a turn or other course change, or changing speeds. At box 680, the autonomous vehicle reports its operating conditions on the modified optimal route to the fleet management system. For example, the autonomous vehicle may report its position, its course and/or its speed to the fleet management system, along with any other information regarding its travel along the modified optimal route.

After the autonomous vehicle has reported its operating conditions on the modified optimal route to the fleet management system, or if the autonomous vehicle does not receive any instructions to modify the optimal route, the process advances to box 685, where the autonomous vehicle arrives at the destination with the item, and the process ends. The autonomous vehicle may confirm its arrival at the destination based on one or more GPS signals, or based on any other indoor or outdoor positioning system. Upon arriving at the destination, the autonomous vehicle may automatically execute an attended or unattended delivery, e.g., at a selected delivery location or access point.

As is discussed above, a customized navigation map may be generated for an autonomous vehicle that operates within one or more indoor spaces (e.g., a building), beginning with a baseline building layout or other data for the indoor spaces. The baseline building layout may be augmented by information or data regarding available transportation infrastructure or features (e.g., doors, elevators, escalators, lifts, dumb waiters, moving sidewalks, ramps or other automatic features) within the indoor spaces, and information or data regarding attributes of the autonomous vehicle. When a customized indoor map is generated, an optimal route for the performance of a task within the indoor spaces (e.g., a delivery to a select destination within the indoor spaces) may be selected for the autonomous vehicle accordingly. Moreover, upon determining that it has arrived at an access point to one or more indoor spaces, the autonomous vehicle may be configured to transfer from navigation control by GPS signals or other outdoor navigation systems to navigation control by imaging data or other information or data captured from within such spaces by one or more onboard sensors, including but not limited to indoor positioning system signals.

Referring to FIGS. 7A through 7F, views of aspects of one system for utilizing customized navigation maps and routes in accordance with embodiments of the present disclosure are shown. Except where otherwise noted, reference numerals preceded by the number "7" in FIGS. 7A through 7F refer to elements that are similar to elements having reference numerals preceded by the number "5" in FIGS. 5A through 5I, by the number "4" in FIG. 4, by the number "2" in FIG. 2A or FIG. 2B or by the number "1" shown in FIGS. 1A through 1M.

Figure 7B:
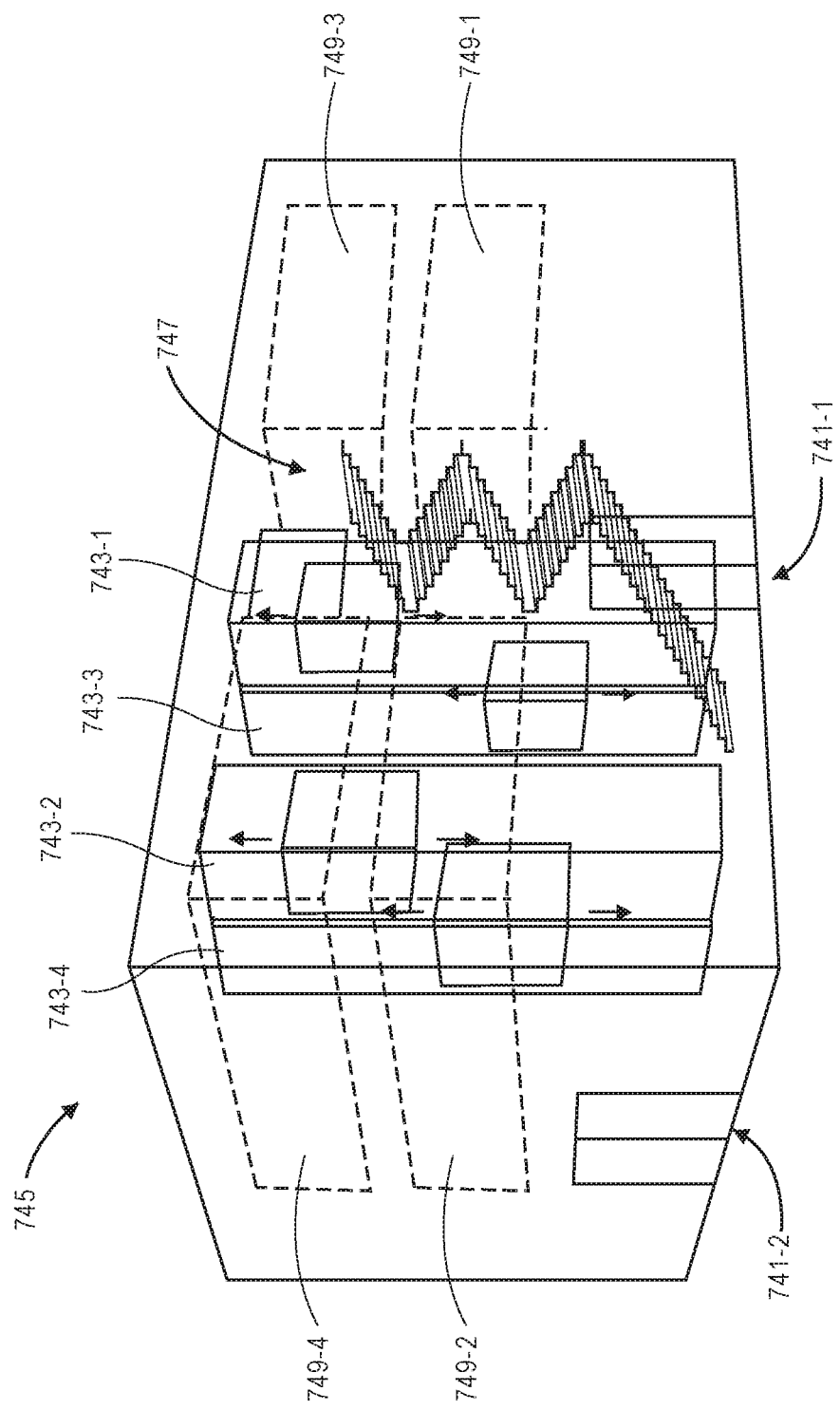

As is shown in FIGS. 7A through 7C, a building 745 includes a pair of exterior access points 741-1, 741-2 (e.g., doors, which may be manually or automatically operated) and a plurality of interior access points 741-3, 741-4, 741-5, 741-6 that are accessible to an autonomous vehicle 750. The building 745 includes a plurality of elevators 743-1, 743-2, 743-3, 743-4 and a set of stairs 747. The building 745 further includes a plurality of suites (or other indoor spaces) 749-1, 749-2, 749-3, 749-4, such as apartments, condominiums, offices, classrooms, storage rooms, retail facilities, or others. Each of the suites 749-1, 749-2, 749-3, 749-4 is accessible by one of the access points 741-3, 741-4, 741-5, 741-6, which may be accessed by one of the elevators 743-1, 743-2, 743-3, 743-4, or the set of stairs 747. The autonomous vehicle 750 includes a plurality of imaging devices 762-1, 762-2, 762-3 mounted to, embedded within or otherwise disposed on outer surfaces of the autonomous vehicle 750 configured to capture information or data in directions extending normal to such locations.

A customized navigation map of the building 745 may be generated for the autonomous vehicle 750 based on floor plans or other layouts of traveling surfaces within the building 745 and the suites 749-1, 749-2, 749-3, 749-4. The floor plans or other layouts of the building 745 may be determined based on blueprints, computer-aided design drawings, imaging data or other data captured from such spaces, and may be augmented by dimensions or operating characteristics of the access points 741-1, 741-2 (e.g., a height, a width, an arc by which one or both of the doors may swing or an extent to which one or both of the doors may slide), the set of stairs 747 (e.g., widths, numbers of stairs, rises or runs, angles, platform sizes or the like), or each of the elevators 743-1, 743-2, 743-3, 743-4 (e.g., interior floor areas or volumes, operating speeds, heights), or any other infrastructure or features within the building 745. A customized navigation map may be further generated based on attributes of the autonomous vehicle 750, including quantitative attributes or metrics such as a height, a width, a length of the autonomous vehicle 750, sizes or volumes of one or more storage compartments of the autonomous vehicle 750, or an operating speed or speed rating of the autonomous vehicle 750, or qualitative attributes or metrics such as whether the autonomous vehicle 750 is equipped to ascend or descend stairs, directions or sides to which storage compartments of the autonomous vehicle 750 are aligned to open, or the like.

In accordance with the present disclosure, a customized navigation map generated for travel by the autonomous vehicle 750 within the building 745 may include information or data regarding a plurality of routes to one or more of the suites 749-1, 749-2, 749-3, 749-4. For example, a customized navigation map may include routes from the access points 741-1, 741-2 to the suites 749-1, 749-2, 749-3, 749-4 for the performance of one or more tasks, e.g., deliveries of one or more items to one of the suites 749-1, 749-2, 749-3, 749-4. Such routes require the autonomous vehicle 750 to enter the building 745 via one of the access points 741-1, 741-2, and to travel to one of the elevators 743-1, 743-2, 743-3, 743-4 or the set of stairs 747, before ascending to a floor having the suites 749-1, 749-2 thereon, or a floor having the suites 749-3, 749-4 thereon.

Those of ordinary skill in the pertinent arts will recognize that where the autonomous vehicle 750 is not configured to ascend or descend the set of stairs 747, a customized navigation map generated for the autonomous vehicle 750 would not include routes between either of the access points 741-1, 741-2 and the access points 741-3, 741-4, 741-5, 741-6 via the stairs 747. Those of ordinary skill in the pertinent arts will further recognize that where the building 745 includes other access points, e.g., in addition to the access points 741-1, 741-2, a customized navigation map generated for the autonomous vehicle 750 may further include routes extending from such other access points to the suites 749-1, 749-2, 749-3, 749-4, by way of one or more of the elevators 743-1, 743-2, 743-3, 743-4 or the set of stairs 747.

An optimal route for the performance of a task by the autonomous vehicle 750 at one of the suites 749-1, 749-2, 749-3, 749-4, viz., the suite 749-3, e.g., a delivery of an item to the suite 749-3, may be selected from routes of a customized navigation map. When an optimal route is selected, the autonomous vehicle 750 may be programmed with one or more sets of instructions, e.g., a single instruction to travel along the optimal route to the suite 749-3, or a series of individual instructions for traveling on selected courses, at selected speeds, or to selected points on the optimal route to the suite 749-3.

As is shown in FIG. 7D, after confirming that the autonomous vehicle 750 has arrived at the access point 741-1, e.g., as determined by one or more signals received from the GPS system 785, the autonomous vehicle 750 may be programmed to enter the building 745 via the access point 741-1. In some embodiments, the autonomous vehicle 750 may be configured to transmit wireless codes, signals or other information to one or more control systems for operating the access point 741-1 to enable the autonomous vehicle 750 to enter the building 745.

Figure 7E:
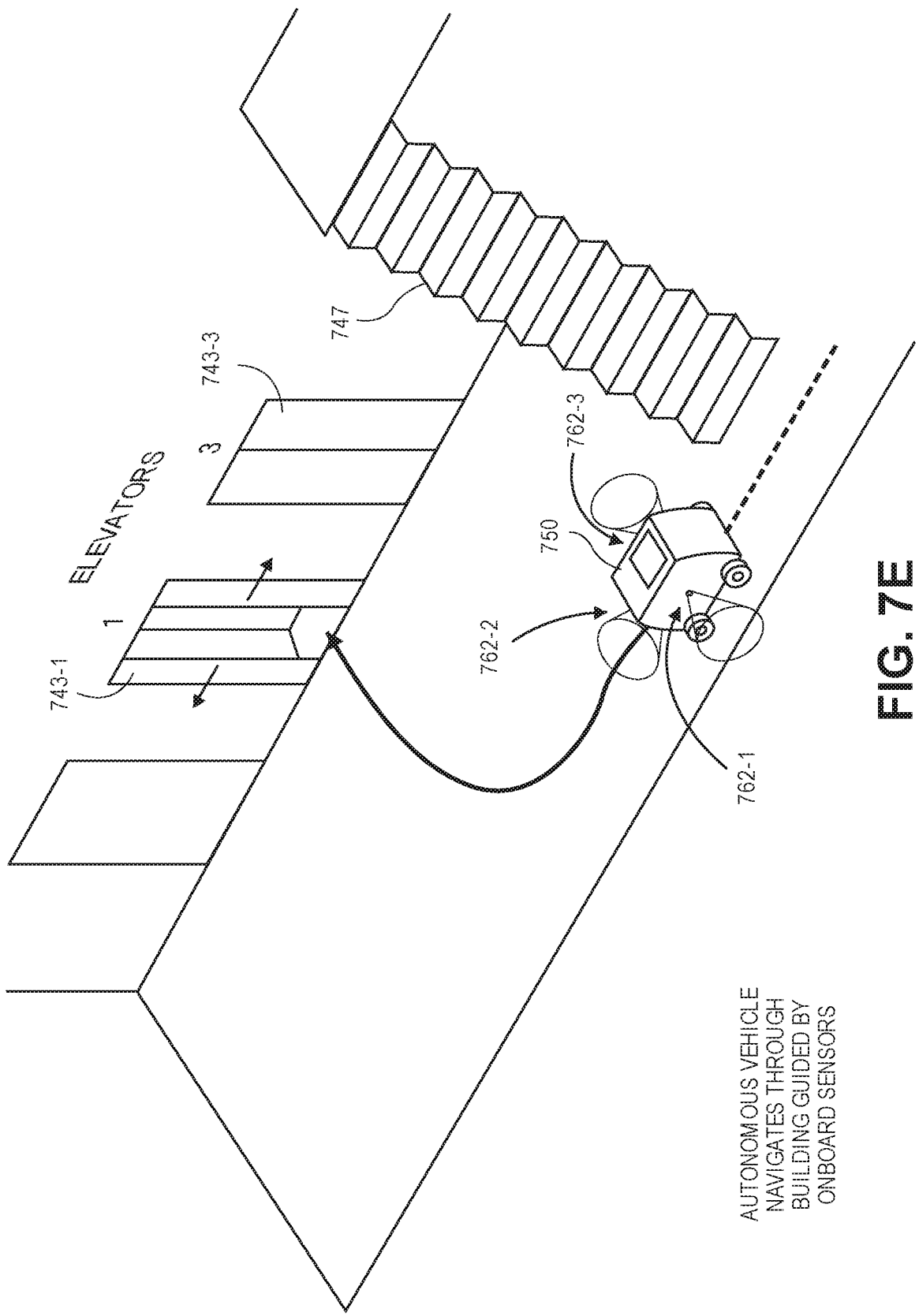

Upon entering the building 745, as is shown in FIG. 7E, the autonomous vehicle 750 may transition to navigation control based on information or data captured by the imaging devices 762-1, 762-2, 762-3 or, alternatively, signals captured from one or more indoor positioning systems. For example, as is shown in FIG. 7E, the autonomous vehicle may proceed to a selected one of the elevators 743-1, 743-3, e.g., according to an optimal route selected from a customized navigation map, based on information or data captured using the imaging devices 762-1, 762-2, 762-3 or one or more other onboard sensors. As is discussed above, the autonomous vehicle 750 may be configured to transmit wireless codes, signals or other information to cause one of the elevators 743-1, 743-3 to open or to travel to a selected one of the floors within the building 745, or to contact one or more buttons or other interactive features by one or more robotic arms or other features for operating the one of the elevators 743-1, 743-3.

Figure 7F:
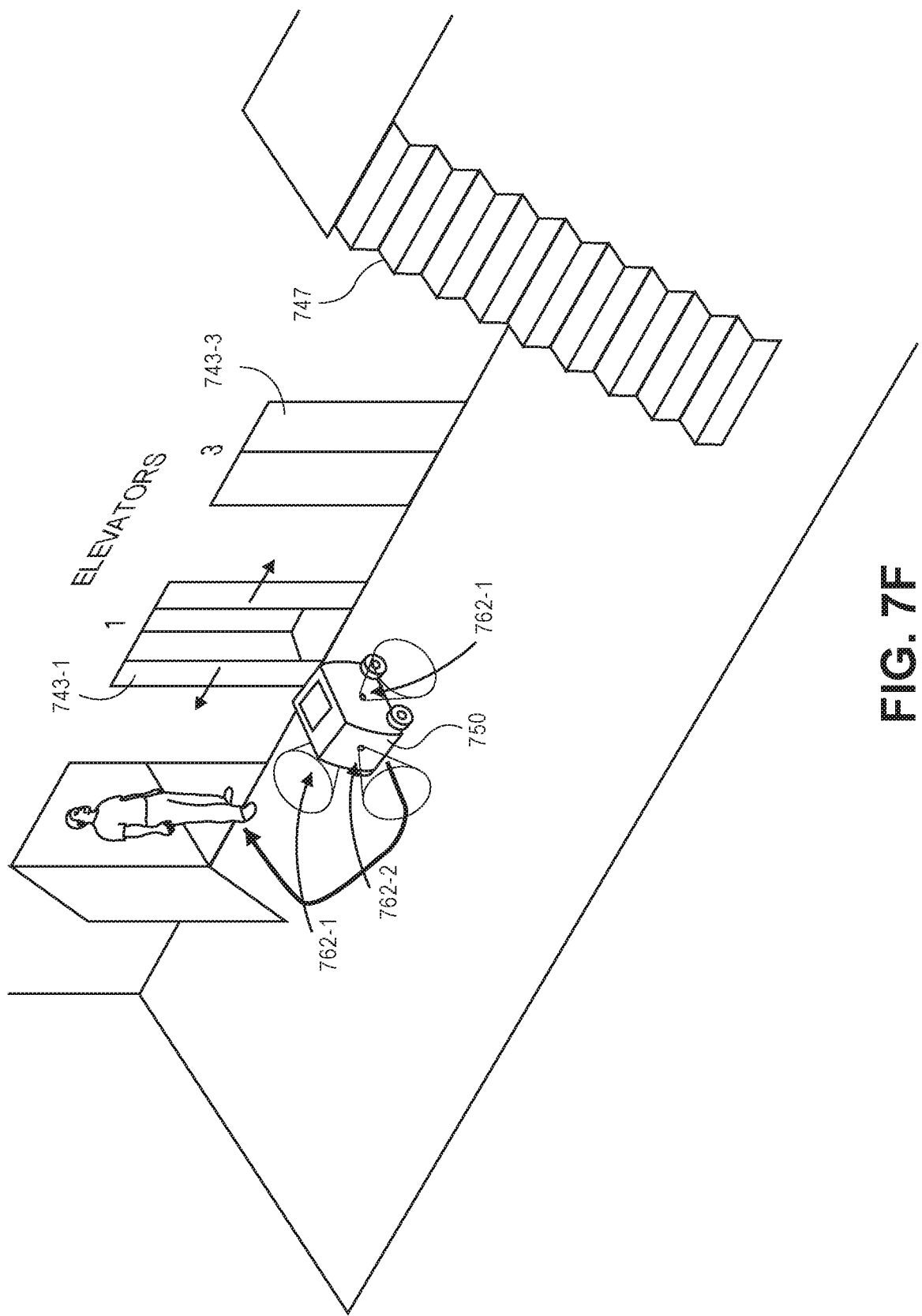

As is shown in FIG. 7F, upon arriving at a floor of the access point 741-3 to the suite 749-3, the elevator 743-1 may open automatically, or the autonomous vehicle 750 may cause the elevator 743-1 to open, and the autonomous vehicle 750 may navigate to the access point 741-3 based on information or data captured using the imaging devices 762-1, 762-2, 762-3. The autonomous vehicle 750 may be configured to complete an attended delivery, e.g., where a customer 740 or a designated recipient awaits the item, and receives the item from the autonomous vehicle 750. Alternatively, in some embodiments, the autonomous vehicle 750 may be configured to complete an unattended delivery, e.g., by depositing the item at or near the destination specified by the customer 740, such as by a robotic arm or other feature. After completing an attended or an unattended delivery, the autonomous vehicle 750 may be configured to depart the building 745, e.g., based on information or data captured using the imaging devices 762-1, 762-2, 762-3, until the autonomous vehicle 750 exits the building 745, when the autonomous vehicle 750 transitions to navigation based on signals received from the GPS system 785.

Figure 8A:
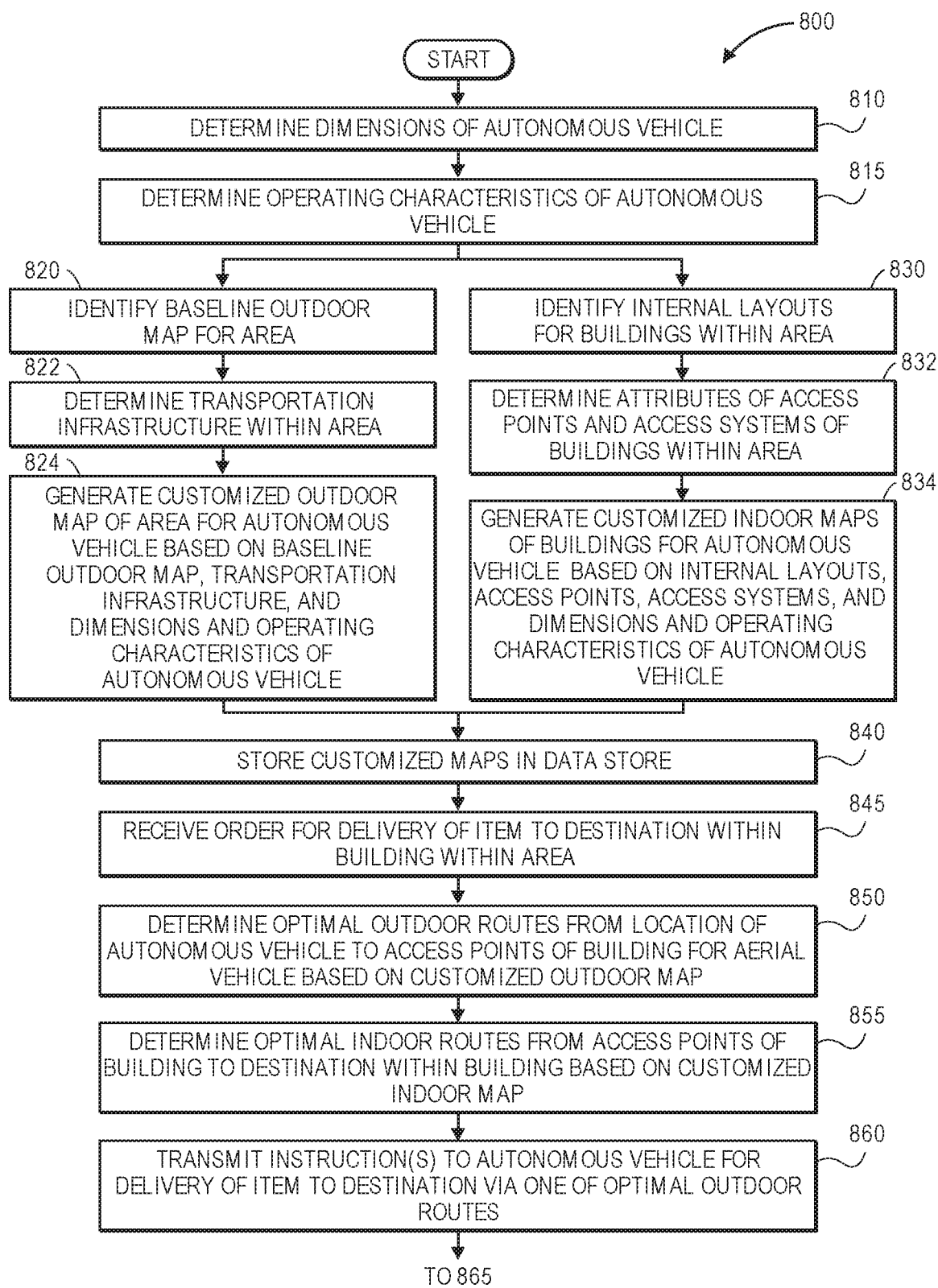
FIGS. 8A and 8B is a flow chart of one process for utilizing customized navigation maps and routes in accordance with embodiments of the present disclosure.
Figure 8B:
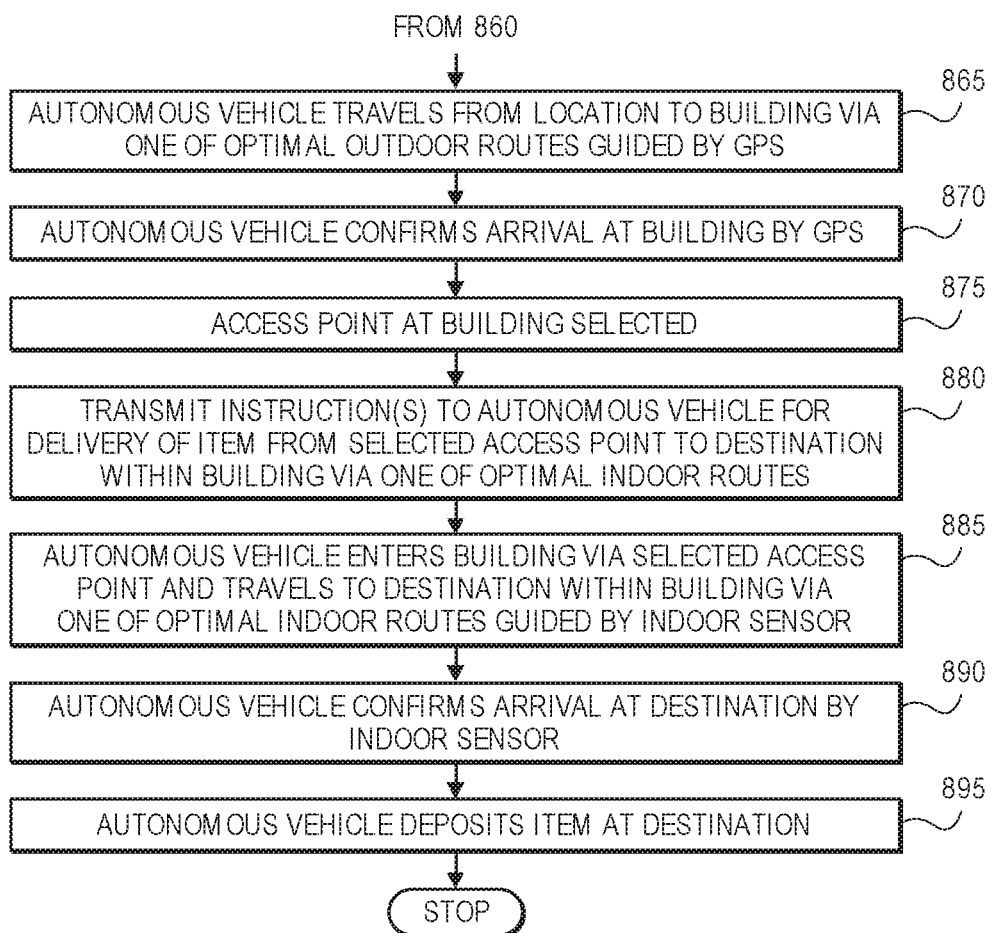

In some embodiments, an optimal indoor route may be selected in combination with an optimal outdoor route for the performance of a task, such as a delivery of an item. Referring to FIGS. 8A and 8B, a flow chart 800 of one process for utilizing customized navigation maps and routes in accordance with embodiments of the present disclosure is shown. At box 810, dimensions of an autonomous vehicle are determined, and at box 815, operating characteristics of the autonomous vehicle are also determined. For example, dimensions (e.g., heights, lengths, widths), and operating characteristics (e.g., power levels, speeds, ranges, carrying volumes or weight limits) of one or more autonomous vehicles may be identified in a look-up table or other data file or record. At box 820, an outdoor baseline map is identified for an area. The baseline map may have been previously determined or generated for the area and stored in one or more data stores, e.g., from geographic information system data, imaging data captured from the area, or any other data regarding the composition and surface features within the area, along with elevations of points within the area. At box 822, transportation infrastructure within the area is determined. Such infrastructure may include, but is not limited to, infrastructure or features such as roads, sidewalks, crosswalks, bicycle or walking trails or bridges, as well as parks, fields, forests, lots, clearings or other spaces.

At box 824, a customized outdoor map is generated for the autonomous vehicle based on the baseline outdoor map, the transportation infrastructure, and the dimensions and operating characteristics of the autonomous vehicle. The customized outdoor map may identify paths throughout the area that are appropriately sized and feature surface features that may accommodate the autonomous vehicle, and may be stored in association with position data regarding such paths, as well as data regarding times or dates at which the paths may be accessed by the autonomous vehicle, or other restrictions, such as speed limits. Such paths may extend on or over one or more different types of infrastructure of features within the area, including infrastructure or features that are open to use by autonomous vehicles along with pedestrians or any other type of vehicle or may be restricted to autonomous vehicles.

In parallel, at box 830, internal layouts for buildings within the area are identified. The internal layouts may be developed based on any information or data regarding interior spaces within such buildings, including but not limited to blueprints, computer-aided design drawings, or any other data. In some embodiments, an internal layout of a building, or of portions of the building, may be determined from imaging data captured by one or more imaging devices, including but not limited to imaging devices associated with internal security systems, imaging devices operated under the control of one or more third parties (e.g., mobile devices), or imaging devices carried aboard operating autonomous vehicles. The internal layouts may include information or data regarding floor or wall sizes, floor or wall surface textures, openings such as windows, skylights, grates or others, as well as available access points such as doors of any size or shape. At box 832, attributes of access points and access systems of the buildings within the area are determined. The access points may include one or more manually operated doors or other openings having one or more latches, knobs or other components, or one or more automatic doors or other openings having one or more rolling, swinging, rotating or other controls. The access systems may include one or more elevators, escalators, lifts, dumb waiters, moving sidewalks, ramps or other automatic features for transporting people or objects within or around a building.

At box 834, a customized indoor map is generated for the one or more buildings within the area based on the internal layouts identified at box 830 and the attributes of the access points and the access systems of the buildings within the area determined at box 832. The customized indoor map may identify paths throughout the building that are appropriately sized and feature surface features that may accommodate the autonomous vehicle, and may be stored in association with position data regarding such paths, as well as data regarding times or dates at which the paths may be accessed by the autonomous vehicle, or other restrictions, such as times or dates at which elevators or escalators are scheduled to operate, operating speeds of elevators or escalators, or access codes for operating one or more access points or access systems. Such paths may extend on or over one or more different types of infrastructure of features within the area, including infrastructure or features that are open to use by autonomous vehicles along with pedestrians or any other type of vehicle or may be restricted to autonomous vehicles.

At box 840, the customized navigation maps generated for the autonomous vehicle at box 824 and box 834 are stored in one or more data stores. For example, the data stores may be provided in a physical location associated with the autonomous vehicle such as a garage or a maintenance facility, or in one or more alternate or virtual locations, e.g., in a "cloud"-based environment. At box 845, an order for a delivery of an item to a destination within one of the buildings in the area is received. The order may be received from a customer in the area over a network, e.g., by accessing a network site or dedicated shopping application associated with the marketplace, or by communicating with the marketplace in any way, such as by telephone or in person at a bricks-and-mortar facility.

At box 850, optimal outdoor routes from a location of the autonomous vehicle to access points of the building are determined based on the customized outdoor map generated for the autonomous vehicle at box 824. Where the item is accessible to the autonomous vehicle at a time that the order is received, such as where the item is carried aboard the autonomous vehicle or where the autonomous vehicle is located at a fulfillment center or other location from which the item may be retrieved, optimal outdoor routes may extend directly from the location of the autonomous vehicle to the respective access points of the building to which the item is to be delivered. Where the item is not accessible to the autonomous vehicle at a time that the order is received, such as where the item is not carried aboard the autonomous vehicle or where the autonomous vehicle is not located at a fulfillment center or other location from which the item may be retrieved, the optimal routes may extend from the location of the autonomous vehicle to one or more of such fulfillment centers or locations, and to the respective access points of the building. Additionally, the optimal routes may be selected based on the plurality of paths between or on the transportation infrastructure or features, as well as any information or data regarding the availability of the item, e.g., elapsed times that may be required to manufacture or otherwise obtain the item, or to make the item available to be retrieved by the autonomous vehicle, or restrictions on travel on the various paths of the customized outdoor map, such as due to construction, traffic, scheduled or spontaneous events, or the like.

At box 855, optimal indoor routes from the access points of the building to the destination within the building are determined based on the customized indoor map generated for the autonomous vehicle at box 834. For example, optimal indoor routes may consider times or costs required to travel along any of the available paths or combinations of paths extending through the building from the various access points to the destination, such as up or down elevators, escalators, stairs or ramps, as well as along pathways, hallways, foyers or other open spaces within the building, such as is shown in FIGS. 7A through 7C, subject to any access restrictions or requirements.

At box 860, one or more instructions for causing the autonomous vehicle to travel along one of the optimal outdoor routes to deliver the item to the destination are transmitted to the autonomous vehicle, e.g., over a network. The instructions may identify specific courses and/or speeds at which the autonomous vehicle is to travel on individual paths of the combined optimal route, or along the combined optimal route as a whole, and may include information or data regarding specific portions of the updated customized navigation map corresponding to the combined optimal route, or portions that are adjacent to the combined optimal route. In some embodiments, the instructions may be provided to the autonomous vehicle in series. Alternatively, in other embodiments, a single instruction to travel along the combined optimal route may be provided to the autonomous vehicle.

At box 865, the autonomous vehicle travels from the location to the building via one of the optimal routes, guided by GPS signals. For example, one of the optimal routes may be selected based on any considerations of time, cost or value, any follow-on or concurrent tasking for the autonomous vehicle, or on any other factors, and the autonomous vehicle may track its position along the optimal route based on three or more GPS signals received from orbiting satellites. Alternatively, the autonomous vehicle may track its position along the optimal route based on any other outdoor navigation system. In some embodiments, the autonomous vehicle may execute one or more alterations to or deviations from the optimal route, either in response to one or more signals received from a fleet management server, or based on information or data captured by one or more onboard sensors. At box 870, the autonomous vehicle confirms its arrival at the building by GPS signals, e.g., where a geocode associated with the building corresponds to a geocode determined based on three or more of the GPS signals.

At box 875, one of the access points at the building is selected. In some embodiments, the access point may have been selected by a customer from whom the order was received at box 845, or an intended recipient of the item, who may select the access point manually by one or more interactions with a touchscreen or other input device. In some other embodiments, the access point may have been previously identified as a primary or preferred access point for the building, e.g., based on customer preferences or past experiences in performing tasks at the building. In some other embodiments, the autonomous vehicle may select the access point based on information or data (e.g., imaging data) captured thereby upon an arrival at the building, from which one or more obstacles or other impediments may be identified. An access point may be selected on any basis in accordance with the present disclosure.

At box 880, one or more instructions are transmitted to the autonomous vehicle for causing the autonomous vehicle to deliver the item from the selected access point to the destination within the building via one of the optimal indoor routes. For example, in some embodiments, the instructions may identify specific courses and/or speeds at which the autonomous vehicle is to travel on individual paths within the building via the one of the optimal indoor routes, and may include information or data regarding specific portions of an updated customized navigation map corresponding to the optimal indoor route, or portions that are adjacent to the optimal indoor route. A plurality of instructions may be provided to the autonomous vehicle in series, or, optionally, a single instruction to travel along the optimal indoor route may be provided to the autonomous vehicle.

At box 885, the autonomous vehicle enters the building via the selected access point and travels to the destination within the building via the one of the optimal indoor routes guided by an indoor sensor, e.g., one or more imaging devices disposed or mounted to external surfaces of the autonomous vehicle, or an indoor positioning system sensor configured to determine one or more positions based on light waves, radio waves, magnetic fields, acoustic signals, or other sensory information.

At box 890, the autonomous vehicle confirms its arrival at the destination within the building by the one or more indoor sensors, e.g., by recognizing one or more background features or other aspects of an area or environment within imaging data captured thereby, or based on one or more signals received by an indoor positioning system sensor. At box 895, the autonomous vehicle deposits the item at the destination, e.g., by way of an attended delivery or an unattended delivery at a delivery location associated with the destination, such as a door of a dwelling or other building or structure, and the process ends.

Although some of the autonomous vehicles disclosed herein are depicted as autonomous vehicles, those of ordinary skill in the pertinent arts will recognize that the systems and methods of the present disclosure are not so limited. Rather, the autonomous vehicles of the present disclosure may be any type of vehicle that is configured to transport items from one location (e.g., a fulfillment center or any other type of location) to another location. The autonomous vehicles of the present disclosure may further include any type of vehicles that are configured to transfer items or materials to a human, a machine or another vehicle, or to receive items or materials from a human, a machine or another vehicle, as necessary. In this regard, the autonomous vehicles of the present disclosure may include vehicles that are configured to travel by air, by sea, or across outer space, as well as on land.

Furthermore, although some of the embodiments of the present disclosure depict the distribution of inventory of items that are made available to customers through online marketplaces, those of ordinary skill in the pertinent arts will recognize that the systems and methods of the present disclosure are not so limited. Rather, autonomous vehicles may be used to distribute inventory that may be made available through traditional commercial channels, e.g., by telephone or in one or more bricks-and-mortar stores, and delivered to customers or designated locations rapidly in response to orders for such items. Moreover, although some of the embodiments of the present disclosure depict autonomous vehicles that are small in size, those of ordinary skill in the pertinent arts will recognize that the systems and methods of the present disclosure are not so limited. Rather, autonomous vehicles may be of any size or shape, and may be configured or outfitted with features that enable the distribution, delivery, retrieval or manufacture of items of any type or kind, and of any size or shape, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3A and 3B, 6A and 6B or 8A and 8B, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system for distributing items within a geographic area, the distribution system comprising:
   at least one computer system; and
   a first autonomous vehicle comprising:
      a frame;
      at least one pair of wheels joined to at least one axle;
      at least one battery;
      a motor disposed within the frame, wherein the motor is configured to cause the at least one pair of wheels to rotate at a speed within a predetermined speed range;
      at least one storage compartment having at least the item stored therein, wherein the at least one storage compartment is disposed within the frame;
      at least one power module for powering the motor;
      an imaging device having a field of view extending forward of the autonomous vehicle;
      a Global Positioning System receiver; and
      at least one computer processor,
   wherein the at least one computer system is in communication with the first autonomous vehicle, and
   wherein the at least one computer system is programmed to execute a method comprising:
      receiving information regarding an order for a delivery of an item from a fulfillment center to one of a plurality of interior spaces within a building;
      determining information regarding a prevailing weather condition in the geographic area;
      selecting a first route from the fulfillment center to at least one access point at the building based at least in part on a first navigation map of the geographic area for the first autonomous vehicle and the prevailing weather condition, wherein the first navigation map comprises a first plurality of geolocations in the geographic area and a first plurality of paths, and wherein each of the first plurality of paths extends between at least two of the first plurality of geolocations;
      selecting a second route from the at least one access point to the one of the plurality of interior spaces based at least in part on a second navigation map, wherein the second navigation map comprises a second plurality of geolocations within the building and a second plurality of paths, and wherein each of the second plurality of paths extends between at least two of the second plurality of geolocations;
      causing the item to be loaded into the storage compartment at the fulfillment center; and
      transmitting at least a first electronic message to the first autonomous vehicle, wherein the first electronic message comprises a first instruction to transport the item from the fulfillment center to the at least one access point via the first route based at least in part on information received by the Global Positioning System receiver and a second instruction to transport the item from the at least one access point to the one of the plurality of interior spaces via the second route based at least in part on imaging data captured by the imaging device.

2. The system of claim 1, wherein the method further comprises:
   generating the first navigation map of the geographic area for the first autonomous vehicle based at least in part on a baseline map of the geographic area, information regarding a plurality of transportation systems within the geographic area, and at least one dimension of the first autonomous vehicle, wherein each of the first plurality of geolocations is represented in the navigation map by a latitude, a longitude and an elevation, and wherein each of the plurality of transportation systems extends between at least two of the first plurality of geolocations; and
   generating the second navigation map of the building based at least in part on a layout of the building, information regarding a plurality of access systems within the building, and the at least one dimension of the first autonomous vehicle, wherein each of the second plurality of geolocations is represented in the second navigation map by a latitude, a longitude and an elevation, and wherein each of the plurality of access systems extends between at least two of the second plurality of geolocations.

3. The system of claim 1, wherein the method further comprises:
   generating the layout of the building based at least in part on a blueprint of at least one of the interior spaces and imaging data captured within the building,
   wherein the imaging data is captured by at least one imaging device associated with one of a security system or a second autonomous vehicle.

4. The system of claim 2, wherein the information regarding the order comprises a delivery address of the building, wherein the information regarding the order is received from a mobile device associated with a customer, and wherein the method further comprises:
   identifying a plurality of access points at the building based at least in part on the delivery address, wherein the plurality of access points includes the at least one access point;
   causing a display of at least a portion of the first navigation map on the mobile device, wherein the portion of the first navigation map comprises at least one icon corresponding to one of the plurality of access points; and
   receiving, from the mobile device, a selection of the at least one icon in the portion of the first navigation map displayed on the mobile device;
   wherein the first route extends from a geolocation associated with the fulfillment center to a geolocation associated with the one of the access points corresponding to the at least one icon.

5. A computer-implemented method comprising:
   identifying first data regarding a layout of a building within an area, wherein the first data includes geolocations of at least one surface within the building, and wherein the building comprises at least one interior space and at least one access point;
   identifying second data regarding at least one access system within the building;

determining third data regarding at least one attribute of a first autonomous vehicle within the area, wherein the first autonomous vehicle comprises an imaging device and a Global Positioning System receiver;

generating a first navigation map of the building for the first autonomous vehicle based at least in part on the first data, the second data and the third data, wherein the first navigation map comprises a first plurality of paths, wherein each of the first plurality of paths extends between two of the geolocations, and wherein the first navigation map further comprises at least a first geolocation corresponding to the at least one access point and at least a second geolocation corresponding to the at least one interior space;

storing the first navigation map in at least one data store;

identifying a task to be performed at or within the at least one interior space; and in response to identifying the task, selecting a first route to be traveled on the at least one surface by the first autonomous vehicle from the first geolocation to the second geolocation by way of the at least one access system based at least in part on the first navigation map, wherein the first route comprises at least one of the first plurality of paths;

determining at least one environmental condition within the area;

selecting a second route to be traveled by the first autonomous vehicle to the first geolocation based at least in part on a second navigation map and the at least one environmental condition within the area, wherein the second navigation map comprises a second plurality of geolocations in the area and a second plurality of paths, and wherein each of the second plurality of paths extends between at least two of the second plurality of geolocations;

transmitting at least a first electronic message to the first autonomous vehicle over a network, wherein the first electronic message comprises:

a first instruction to travel to the first geolocation; and a second instruction to travel from the first geolocation to the second geolocation over at least a portion of the first route;

capturing fourth data by the imaging device;

receiving a plurality of position signals by the Global Positioning System receiver;

processing the fourth data to recognize the at least one surface and at least one wall within the building; and causing the first autonomous vehicle to travel from the first geolocation to the second geolocation over at least the portion of the first route based at least in part on the fourth data and the plurality of position signals.

6. The computer-implemented method of claim 5, further comprising:

receiving at least a portion of the fourth data from the first autonomous vehicle;

updating the first navigation map based at least in part on the portion of the fourth data; and storing the updated first navigation map in the at least one data store.

7. The computer-implemented method of claim 6, further comprising:

determining, based at least in part on the fourth data, that the portion of the first route comprises at least one obstruction; and determining at least one geolocation associated with the at least one obstruction, wherein receiving at least the portion of the fourth data comprises:

receiving the at least one geolocation associated with the at least one obstruction, wherein the first navigation map is updated based at least in part on the at least one geolocation associated with the at least one obstruction.

8. The computer-implemented method of claim 5, wherein the at least one access system comprises at least one of:

an elevator;

an escalator;

a ramp; or a set of stairs.

9. The computer-implemented method of claim 5, wherein the first autonomous vehicle comprises:

a frame;

at least one wheel;

a motor disposed within the frame, wherein the motor is configured to cause the at least one wheel to rotate at a speed within a predetermined speed range;

at least one storage compartment disposed within the frame, wherein the at least one storage compartment comprises at least one door pivotably joined to an outer surface of the frame by at least one hinge, and wherein the at least one door is configured to pivot between an open position and a closed position;

at least one power module for powering at least the motor;

a position sensor;

at least one computer processor; and at least one memory component.

10. The computer-implemented method of claim 9, wherein the at least one attribute of the first autonomous vehicle is one of:

a height, a width or a length of the frame;

the predetermined speed range;

a height, a width, a length or a storage volume of the at least one storage compartment;

a capacity of the at least one power module; or a location or an alignment of the at least one hinge.

11. The computer-implemented method of claim 5, wherein the task is a delivery of an item from a source external to the building to the at least one interior space.

12. The computer-implemented method of claim 5, wherein identifying the task comprises:

receiving an order for a delivery of an item to the at least one interior space within the building from a computer device, wherein the task is the delivery of the item to the at least one interior space;

causing a display of information regarding at least some of the plurality of access points of the building on a display of the computer device; and receiving a selection of the at least one of the plurality of access points from the computer device over the network, wherein the first route is selected in response to receiving the selection of the at least one of the plurality of access points.

13. A computer-implemented method comprising:

identifying first data regarding a layout of a building within an area, wherein the first data includes a plurality of geolocations of at least one surface within the building, and wherein the building comprises at least one interior space and a plurality of access points;

identifying second data regarding at least one access system within the building;

determining third data regarding at least one attribute of a first autonomous vehicle within the area;

generating a first navigation map of the building for the first autonomous vehicle based at least in part on the first data, the second data and the third data, wherein the first navigation map comprises a first plurality of paths, wherein each of the first plurality of paths extends between two of the first plurality of geolocations, and wherein the first navigation map further comprises at least a first geolocation of the plurality of geolocations corresponding to a first access point of the plurality of access points and at least a second geolocation of the plurality of geolocations corresponding to the at least one interior space;

storing the first navigation map in at least one data store;

receiving an order for a delivery of an item to the at least one interior space within the building from a computer device;

in response to receiving the order,
determining fourth data regarding the order, wherein the fourth data comprises a delivery address for at least one of the building or the at least one interior space;

causing a display of information regarding at least some of the plurality of access points of the building on a display of the computer device;

receiving a selection of the first access point;

selecting a first route to be traveled on the at least one surface by the first autonomous vehicle from the first geolocation to the second geolocation by way of the at least one access system based at least in part on the first navigation map, wherein the first route comprises at least one of the first plurality of paths; and transmitting at least a first electronic message to the first autonomous vehicle over a network, wherein the first electronic message comprises:

a first instruction to travel to the first geolocation; and a second instruction to travel from the first geolocation to the second geolocation over at least a portion of the first route.

14. A computer-implemented method comprising:

identifying first data regarding a layout of a building within an area, wherein the first data includes geolocations of at least one surface within the building, and wherein the building comprises at least one interior space and at least one access point;

identifying second data regarding at least one access system within the building;

determining third data regarding at least one attribute of a first autonomous vehicle within the area;

generating a first navigation map of the building for the first autonomous vehicle based at least in part on the first data, the second data and the third data, wherein the first navigation map comprises a first plurality of paths, wherein each of the first plurality of paths extends between two of the geolocations, and wherein the first navigation map further comprises at least a first geolocation corresponding to the at least one access point and at least a second geolocation corresponding to the at least one interior space;

storing the first navigation map in at least one data store;

receiving an order for a delivery of an item to the at least one interior space within the building from a computer device; and in response to receiving the order,
calculating a plurality of routes to be traveled on the at least one surface by the first autonomous vehicle from the first geolocation to the second geolocation by way of the at least one access system based at least in part on the first navigation map, wherein each of the plurality of routes comprises at least one of the first plurality of paths;

causing a display of information regarding at least some of the plurality of routes on a display of the computer device;

receiving a selection of a first route of the plurality of routes from the computer device over the network; and transmitting at least a first electronic message to the first autonomous vehicle over a network, wherein the first electronic message comprises:

a first instruction to travel to the first geolocation; and a second instruction to travel from the first geolocation to the second geolocation over at least a portion of the first route.

15. A computer-implemented method comprising:

identifying first data regarding a layout of a building within an area, wherein the first data includes geolocations of at least one surface within the building, and wherein the building comprises at least one interior space and at least one access point;

identifying second data regarding at least one access system within the building;

determining third data regarding at least one attribute of each of a plurality of autonomous vehicles within the area;

generating a plurality of navigation maps of the building, wherein each of the navigation maps is generated for one of the plurality of autonomous vehicles based at least in part on the first data, the second data and the third data, wherein each of the plurality of navigation maps comprises a plurality of paths extending between at least some of the geolocations;

storing the plurality of navigation maps in at least one data store;

identifying a task to be performed at or within the at least one interior space; and in response to identifying the task,
calculating a plurality of routes, wherein each of the plurality of routes to be traveled on the at least one surface by one of the autonomous vehicles, wherein each of the plurality of routes is generated based at least in part on one of the plurality of maps generated for the one of the plurality of autonomous vehicles, and wherein each of the routes extends between the first geolocation and the second geolocation;

determining at least one of a cost or a time associated with each of the plurality of routes;

selecting a first autonomous vehicle of the plurality of autonomous vehicles based at least in part on at least one of the cost or the time associated with a first route to be traveled on the at least one surface by the first autonomous vehicle from the first geolocation to the second geolocation; and transmitting at least a first electronic message to the first autonomous vehicle over a network, wherein the first electronic message comprises:

a first instruction to travel to the first geolocation; and
a second instruction to travel from the first geolocation to the second geolocation over at least a portion of the first route.

16. The computer-implemented method of claim 15, wherein the task is a delivery of an item from a source external to the building to the at least one interior space.

17. A computer-implemented method comprising:
identifying first data regarding a layout of a building within an area, wherein the first data includes geolocations of at least one surface within the building, and wherein the building comprises at least one interior space and a plurality of access points;
identifying second data regarding at least one access system within the building;
determining third data regarding at least one attribute of a first autonomous vehicle within the area;
generating a first navigation map of the building for the first autonomous vehicle based at least in part on the first data, the second data and the third data, wherein the first navigation map comprises a first plurality of paths, wherein each of the first plurality of paths extends between two of the geolocations, and wherein the first navigation map further comprises at least a first geolocation corresponding to at least a first access point of the plurality of access points and at least a second geolocation corresponding to the at least one interior space;
storing the first navigation map in at least one data store;
identifying a task to be performed at or within the at least one interior space, wherein the task is to be performed at a first time; and
in response to identifying the task,
determining or predicting an environmental condition within a vicinity of the building at the first time, wherein the environmental condition relates to at least one of traffic in the vicinity of the building, weather in the vicinity of the building, congestion in the vicinity of the building or a legal restriction in effect in the vicinity of the building;
selecting one of the plurality of access points based at least in part on the environmental condition, wherein the first access point is the selected one of the plurality of access points;
selecting a first route to be traveled on the at least one surface by the first autonomous vehicle from the first geolocation to the second geolocation by way of the at least one access system based at least in part on the first navigation map, wherein the first route comprises at least one of the first plurality of paths; and
transmitting at least a first electronic message to the first autonomous vehicle over a network, wherein the first electronic message comprises:
a first instruction to travel to the first geolocation; and
a second instruction to travel from the first geolocation to the second geolocation over at least a portion of the first route.

18. A computer-implemented method comprising:
identifying a layout of a building within an area by at least one computer server, wherein the data comprises a plurality of geolocations of surfaces associated with the building;
identifying a plurality of autonomous vehicles in the area by the at least one computer server, wherein each of the autonomous vehicles comprises:
a frame;
at least one storage compartment disposed within the frame, wherein the at least one storage compartment comprises at least one door pivotably joined to an outer surface of the frame by at least one hinge, and wherein the at least one door is configured to pivot between an open position and a closed position;
at least one power module for powering one or more motors;
at least one computer processor; and
at least one memory component;
determining at least one attribute of each of the plurality of autonomous vehicles in the geographic area by the at least one computer server, wherein the at least one attribute is at least one of:
a dimension of the frame;
a location within the area;
a charge level of the at least one power module; or
a predetermined speed range;
determining information regarding a plurality of access systems within the building, wherein the plurality of access systems comprises at least one of:
an elevator;
an escalator;
a hinged door;
a ramp;
a revolving door; or
a set of stairs;
generating, for at least some of the plurality of autonomous vehicles, a navigation map of the building based at least in part on the layout, the information regarding the plurality of access systems and the at least one attribute of one of the autonomous vehicles, wherein each of the navigation maps comprises a plurality of paths accessible to one of the autonomous vehicles that extend between at least some of the geolocations;
storing each of the navigation maps in at least one data store;
receiving, over a network, an order for a purchase of an item from a customer, wherein the order specifies a destination for a delivery of the item, and wherein the destination is located within the building;
calculating routes to be traveled within the building by the at least some of the autonomous vehicles based at least in part on the navigation maps, wherein each of the routes comprises at least one of the plurality of paths including at least one of the plurality of access systems;
selecting a first autonomous vehicle to deliver the item to the destination based at least in part on the routes, wherein the first autonomous vehicle is one of the plurality of autonomous vehicles in the geographic area; and
transmitting at least one electronic message to the first autonomous vehicle over the network, wherein the at least one electronic message comprises at least one instruction to travel to the destination over a first route calculated for the first autonomous vehicle.

19. The computer-implemented method of claim 18, wherein the item is to be delivered to the destination at a first time, and
wherein the computer-implemented method further comprises:
in response to receiving the order for the purchase of the item from the customer,
identifying locations of a plurality of access points to the building based at least in part on the destination for the delivery of the item;

calculating the routes to be traveled within the building, wherein each of the routes extends from one of the plurality of access points to the destination;

determining at least one attribute of each of the plurality of access points, wherein the at least one attribute is an operating restriction at the first time; and selecting one of the plurality of access points based at least in part on the operating restriction at the first time, wherein the first route extends from the selected one of the plurality of access points to the destination.

20. The computer-implemented method of claim 18, wherein the delivery of the item is to be performed not later than a first time, and wherein the computer-implemented method further comprises:

determining or predicting an environmental condition within a vicinity of the building at the first time, wherein the environmental condition relates to at least one of traffic in the vicinity of the building, weather in the vicinity of the building, congestion in the vicinity of the building or a legal restriction in effect in the vicinity of the building; and selecting the first autonomous vehicle based at least in part on the environmental condition.

* * * * *

UNITED STATES PATENT AND TRADEMARK OFFICE
CERTIFICATE OF CORRECTION

Page 1 of 1

PATENT NO. : 11,222,299 B1
APPLICATION NO. : 16/102442
DATED : January 11, 2022
INVENTOR(S) : Uriah John Baalke et al.

It is certified that error appears in the above-identified patent and that said Letters Patent is hereby corrected as shown below:

On the Title Page

Page 2, Item (56), References Cited U.S. PATENT DOCUMENTS, 2nd Column:
"2017/0101017 A1 4/2017 Street" should read as --2017/0101017 A1 4/2017 Streett--

In the Claims

Column 54:
Line 50, Claim 15, "plurality of routes to be traveled on the at least one" should read as --plurality of routes is to be traveled on the at least one--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*